(12) United States Patent
Haga et al.

(10) Patent No.: US 11,718,758 B2
(45) Date of Patent: Aug. 8, 2023

(54) AQUEOUS DISPERSION OF COLORED PARTICLES

(71) Applicant: MITSUBISHI PENCIL COMPANY, LIMITED, Tokyo (JP)

(72) Inventors: Hisato Haga, Tokyo (JP); Tetsuji Murase, Kawagoe (JP); Sho Shibusawa, Kawagoe (JP); Tomoaki Horie, Kawagoe (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 319 days.

(21) Appl. No.: 16/772,285

(22) PCT Filed: Dec. 11, 2018

(86) PCT No.: PCT/JP2018/045477
§ 371 (c)(1),
(2) Date: Jun. 12, 2020

(87) PCT Pub. No.: WO2019/117134
PCT Pub. Date: Jun. 20, 2019

(65) Prior Publication Data
US 2021/0071006 A1     Mar. 11, 2021

(30) Foreign Application Priority Data

Dec. 14, 2017 (JP) .................. 2017-239852

(51) Int. Cl.
| | | |
|---|---|---|
| C09B 69/10 | (2006.01) | |
| C09D 11/328 | (2014.01) | |
| B41J 2/01 | (2006.01) | |
| C09D 11/17 | (2014.01) | |
| C09D 11/107 | (2014.01) | |
| C09D 133/14 | (2006.01) | |
| C09D 133/16 | (2006.01) | |
| C09B 67/20 | (2006.01) | |
| C09B 67/46 | (2006.01) | |
| C09D 7/41 | (2018.01) | |
| C09D 17/00 | (2006.01) | |

(Continued)

(52) U.S. Cl.
CPC ............ *C09B 69/10* (2013.01); *C09B 67/009* (2013.01); *C09B 67/0066* (2013.01); *C09B 69/103* (2013.01); *C09B 69/105* (2013.01); *C09B 69/109* (2013.01); *C09D 7/41* (2018.01); *C09D 11/107* (2013.01); *C09D 11/17* (2013.01); *C09D 11/328* (2013.01); *C09D 17/001* (2013.01); *C09D 133/14* (2013.01); *C09D 133/16* (2013.01); *B41J 2/01* (2013.01); *C09D 11/322* (2013.01); *C09D 201/02* (2013.01)

(58) Field of Classification Search
CPC ... C09B 69/10; C09B 67/0066; C09B 67/009; C09B 69/103; C09B 69/105; C09B 69/109; C09D 7/41; C09D 11/107; C09D 11/17; C09D 11/328; C09D 17/001; C09D 133/14; C09D 133/16; C09D 11/322; C09D 201/02; B41J 2/01

See application file for complete search history.

(56) References Cited

U.S. PATENT DOCUMENTS

| | | |
|---|---|---|
| 5,637,638 A | 6/1997 | Chandler et al. |
| 10,513,574 B2 | 12/2019 | Kimura et al. |

(Continued)

FOREIGN PATENT DOCUMENTS

| | | |
|---|---|---|
| CN | 1594441 A | 3/2005 |
| CN | 103497273 A | 1/2014 |

(Continued)

OTHER PUBLICATIONS

Extended European Search Report dated Aug. 13, 2021, issued by the European Patent Office in corresponding European Application No. 18888604.8. (8 pages).

(Continued)

*Primary Examiner* — Yaovi M Ameh
(74) *Attorney, Agent, or Firm* — Buchanan Ingersoll & Rooney PC

(57) ABSTRACT

Provided is an aqueous dispersion of colored particles suitable for colorants for writing instrument inks, inkjet inks, painting materials, aqueous coatings, and the like. The aqueous dispersion of colored particles includes a polymer having at least a unit of a monomer derived from a dye having a polymerizable unsaturated group. The monomer derived from the dye is preferably derived from the compound represented by General Formula (1) below:

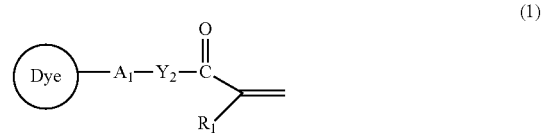

(1)

where Dye represents a dye residue, $R_1$ represents a hydrogen atom or a methyl group, $Y_2$ represents —O— or —$NR_{10}$—, where $R_{10}$ represents a hydrogen atom or an alkyl group, $A_1$ represents an alkylene group which is unsubstituted or substituted by at least one group selected from —OCO—, —COO—, —NHCONH—, and the like in the chain thereof and/or at the terminal thereof, and/or a hydroxy group.

12 Claims, No Drawings

(51) Int. Cl.
C09D 11/322 (2014.01)
C09D 201/02 (2006.01)

(56) References Cited

U.S. PATENT DOCUMENTS

| | | | |
|---|---|---|---|
| 2005/0075453 A1 | 4/2005 | Mathauer et al. | |
| 2006/0188663 A1 | 8/2006 | Peglow et al. | |
| 2008/0262154 A1 | 10/2008 | Behrens et al. | |
| 2013/0250020 A1* | 9/2013 | Kobayashi | C09D 11/107 |
| | | | 347/103 |
| 2017/0015765 A1 | 1/2017 | Shida et al. | |
| 2017/0137553 A1* | 5/2017 | Kimura | C09B 69/103 |
| 2018/0037742 A1 | 2/2018 | Wilson et al. | |
| 2019/0062561 A1 | 2/2019 | Kawano et al. | |

FOREIGN PATENT DOCUMENTS

| | | |
|---|---|---|
| CN | 106471015 A | 3/2017 |
| DE | 198 05 121 A1 | 8/1999 |
| EP | 1 801 127 A1 | 6/2007 |
| EP | 2 308 932 A1 | 4/2011 |
| JP | H07304994 A | 11/1995 |
| JP | H1077435 A | 3/1998 |
| JP | H1077436 A | 3/1998 |
| JP | H10259337 A | 9/1998 |
| JP | 2001181544 A | 7/2001 |
| JP | 2001527584 A | 12/2001 |
| JP | 2003073575 A * | 3/2003 ............ C09B 23/00 |
| JP | 2004002529 A * | 1/2004 ............ C09B 11/00 |
| JP | 2004002529 A | 1/2004 |
| JP | 2005036039 A | 2/2005 |
| JP | 2006525382 A | 11/2006 |
| JP | 2016196623 A | 11/2016 |
| JP | 2017002121 A | 1/2017 |
| JP | 2018145399 A | 9/2018 |
| JP | 2018177876 A | 11/2018 |
| JP | 2018177877 A | 11/2018 |
| KR | 2016 0011037 A | 1/2016 |
| WO | 2014126167 A1 | 8/2014 |
| WO | 2015098999 A1 | 7/2015 |
| WO | 2015133578 A1 | 9/2015 |
| WO | 2015147285 A1 | 10/2015 |
| WO | 2015182680 A1 | 12/2015 |
| WO | 2016096085 A1 | 6/2016 |
| WO | 2017170617 A1 | 10/2017 |

OTHER PUBLICATIONS

International Search Report (PCT/ISA/210) dated Mar. 5, 2019, by the Japanese Patent Office as the International Searching Authority for International Application No. PCT/JP2018/045477.

Barashkov et al., "Design of New Polymers to Improve Radiation Stability of Plastic Scintillators", ResearchGate, 1993, DOI: 10.2172/10133307. (13 pages).

* cited by examiner

AQUEOUS DISPERSION OF COLORED PARTICLES

TECHNICAL FIELD

The present invention relates to an aqueous dispersion of colored particles excellent in water resistance and light resistance, which is suitable for colorants for writing instrument inks, inkjet inks, painting materials, aqueous coatings, and the like.

BACKGROUND ART

It is known that a resin emulsion having a specific polymer composition dyed with a dye is used as a colorant that may be called as a pseudo pigment.

Examples include: 1) an aqueous dispersion of colored resin fine particles for aqueous ink prepared by emulsion polymerization of a vinyl monomer having an acidic functional group in which a water-soluble basic dye is dissolved in the presence of a polymerizable surfactant (for example, see Patent Document 1); 2) an aqueous dispersion of colored resin fine particles for ink obtained by heat-treating a solution obtained by dissolving a water-soluble dye in an emulsion polymerization solution obtained by emulsion polymerization of a vinyl monomer in the presence of a polymerizable surfactant (for example, see Patent Document 2); 3) a colored resin fine particle aqueous dispersion obtained by emulsion-copolymerization of a mixed vinyl monomer containing a vinyl monomer having an acidic functional group and a vinyl monomer having a cyano group in which a water-soluble basic dye is dissolved in the presence of a polymerizable surfactant (for example, see Patent Document 3); 4) an aqueous ink including a cyano group-containing vinyl monomer dyed with a dye and resin particles composed of a copolymer containing one or both of a vinyl monomer represented by a specific formula and a vinyl monomer as a constituent monomer (for example, see Patent Document 4); and 5) a dispersion of colored resin fine particles for aqueous ink in which at least a carboxyl group-containing vinyl monomer having solubility in water of 10% by mass or less as an acidic functional group, an ester monomer of acrylic acid or methacrylic acid and a linear or cyclic alcohol having 2 to 18 carbon atoms, and colored resin particles composed of a basic dye or an oil-soluble dye are dispersed in water (for example, see Patent Document 5).

However, in the known colored resin particles described in Patent Documents 1 to 5 and the like, resin particles and dyes, such as basic dyes and oil-soluble dyes, are physically incorporated into resin particles through ionic bonds or Van der Waals forces, so that the dyes are liberated due to changes in the external environment, resulting in a decrease in water resistance and light resistance, and further, feathering or permeation occurs in writing instrument inks and the like.

On the other hand, examples of known colorants used for colored pixel forming applications such as color filters, printing inks, and coatings include: 1) a triphenylmethane coloring composition including a cationic triphenylmethane derivative having an anion of a specific structure as a counter anion, a triphenylmethane compound represented by a specific formula having an ethylenically unsaturated bond, and a polymer having monomer units derived from the compound as dyes (for example, see Patent Document 6); 2) a Rhodamine coloring composition including a compound represented by a specific formula having a cationic Rhod- amine derivative having an anion of a specific structure as a counter anion, and a compound represented by a specific formula having an ethylenically unsaturated bond, and a polymer having monomer units derived from the compound as dyes (for example, see Patent Document 7 and Patent Document 8); 3) a cyanine coloring composition including a cyanine compound having an anion of a specific structure as a counter anion and is represented by a specific formula having an ethylenically unsaturated bond, and a polymer having monomer units derived from the compound as dyes (for example, see Patent Document 9); and 4) a triarylmethane coloring composition including a triarylmethane compound represented by a specific formula having an anion having a specific structure as a counter anion and having an ethylenically unsaturated bond, and a polymer having monomer units derived from the compound as dyes (for example, see Patent Document 10).

The technology using monomer units derived from triphenylmethane, Rhodamine, cyanine, and triarylmethane compounds having an anion having a specific structure as a counter anion described in Patent Documents 6 to 10, and represented by a specific formula having an ethylenically unsaturated bond, or polymers having the monomer units as dyes achieves, for example, high thermal resistance, and is useful as a novel colorant, coloring composition, and the like. However, at present, there is a long-awaited demand for colored particles having further functions in addition to functions such as thermal resistance.

CONVENTINAL ART DOCUMENTS

Patent Documents

Patent Document 1: Japanese Patent Application Laid-Open No. Hei 10-259337 (Claims, Examples, and others)
Patent Document 2: Japanese Patent Application Laid-Open No. Hei 10-77435 (Claims and others)
Patent Document 3: Japanese Patent Application Laid-Open No. Hei 10-77436 (Claims, Examples, and others)
Patent Document 4: Japanese Patent Application Laid-Open No. 2001-181544 (Claims, Examples, and others)
Patent Document 5: Japanese Patent Application Laid-Open No. 2016-196623 (Claims, Examples, and others)
Patent Document 6: PCT International Publication No. WO 2015/182680 (Claims, and others)
Patent Document 7: PCT International Publication No. WO 2015/147285 (Claims, and others)
Patent Document 8: PCT International Publication No. WO 2014/126167 (Claims, and others)
Patent Document 9: PCT International Publication No. WO 2015/133578 (Claims, and others)
Patent Document 10: PCT International Publication No. WO 2015/98999 (Claims, and others)

SUMMARY OF THE INVENTION

Problems to be Solved by the Invention

In view of the above-mentioned problems and the current state of the related art, the present invention is intended to solve the problems. An object of the present invention is to provide an aqueous dispersion of colored particles suitable for colorants for writing instrument inks, inkjet inks, painting materials, aqueous coatings, and the like, the aqueous dispersion of colored particles being excellent in water resistance and light resistance in addition to functions such as thermal resistance, and having a function of being excellent in resistance to feathering and permeation when used, for example, in writing instrument inks.

Means to Solve Problems

The inventors of the present invention have conducted intensive research in view of the above-described problems. As a result it is found that the above-described desired aqueous dispersion of colored particles can be obtained by, for example, obtaining an aqueous dispersion of colored particles composed of a polymer having at least a unit of a monomer derived from a dye having a specific functional group, and thus the present invention has been completed.

That is, the aqueous dispersion of colored particles of the present invention includes a polymer having at least a unit of a monomer derived from a dye having a polymerizable unsaturated group.

The monomer derived from the dye is preferably derived from a compound represented by General Formula (1) below:

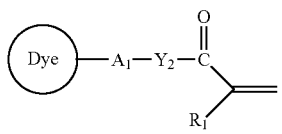

(1)

{where Dye represents a dye residue, $R_1$ represents a hydrogen atom or a methyl group, $Y_2$ represents —O— or —$NR_{10}$—, where $R_{10}$ represents a hydrogen atom or an alkyl group having 1 to 12 carbon atoms, $A_1$ represents an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and a group represented by General Formula (2-1) below:

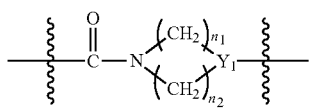

(2-1)

[where $Y_1$ represents a nitrogen atom or a group represented by General Formula (2-2) below:

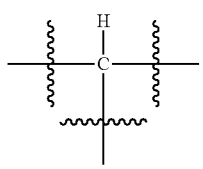

(2-2)

$n_1$ represents an integer from 0 to 2, and $n_2$ represents an integer from 2 to 4, where $n_1+n_2$ is 3 or 4];

an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1), and also has a hydroxy group as a substituent;

an alkylene group having 1 to 21 carbon atoms which has a hydroxy group as a substituent; or an alkylene group having 1 to 21 carbon atoms}.

The Dye is preferably a dye residue represented by General Formula (I), (III), (IV), (VI) or (VII) below:

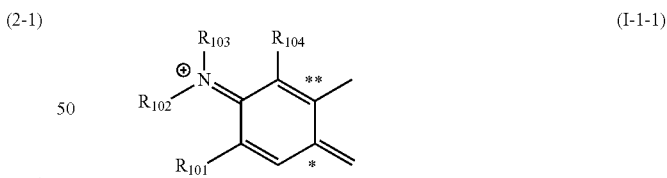

(I)

{where $n_{101}$ of $R_{105}$(s) each independently represent a halogeno group, an alkyl group having 1 to 30 carbon atoms, an alkoxy group having 1 to 20 carbon atoms, an alkylthio group having 1 to 20 carbon atoms, a substituted or unsubstituted amino group, a hydroxy group, an aryl group having 6 to 14 carbon atoms, an aryloxy group having 6 to 14 carbon atoms, or an arylalkyl group having 7 to 20 carbon atoms, $Y_{101}$ represents an oxygen atom, a sulfur atom, —$NR_{132}$— or —$Si(R_{133})_2$—, where $R_{132}$ represents an alkyl group having 1 to 6 carbon atoms, and two of $R_{133}$(s) each independently represent an alkyl group having 1 to 6 carbon atoms or an aryl group having 6 to 14 carbon atoms, $An^-$ represents an anion, and $Ar_1$ is a ring structure represented by General Formulas (I-1-1) to (I-1-7) below:

(I-1-1)

(where $R_{101}$ and $R_{104}$ each independently represent a hydrogen atom or a methyl group, $R_{102}$ and $R_{103}$ each independently represent a hydrogen atom, an alkyl group having 1 to 30 carbon atoms, or a substituted or unsubstituted aryl group having 6 to 14 carbon atoms,

* and ** represent the same positions as * and ** in General Formula (I), $R_{101}$ and $R_{102}$ together may form an alkylene group having 2 to 4 carbon atoms, and $R_{103}$ and $R_{104}$ together may form an alkylene group having 2 to 4 carbon atoms);

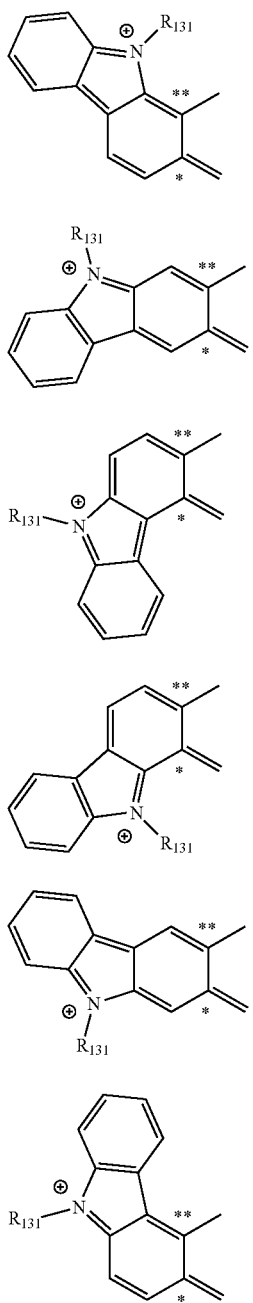

(I-1-2)
(I-1-3)
(I-1-4)
(I-1-5)
(I-1-6)
(I-1-7)

(where $R_{131}$ represents an alkyl group having 1 to 30 carbon atoms,

* and ** represent the same positions as * and ** in General Formula (I)),

* and ** represent bonding positions to the ring structures represented by General Formulas (I-1-1) to (I-1-7), $Ar_2$ represents a benzene ring, a naphthalene ring, or an anthracene ring, when $Ar_2$ is a benzene ring, $n_{101}$ represents an integer from 0 to 4, when $Ar_2$ is a naphthalene ring, $n_{101}$ represents an integer from 0 to 6, and when $Ar_2$ is an anthracene ring, $n_{101}$ represents an integer from 0 to 8}

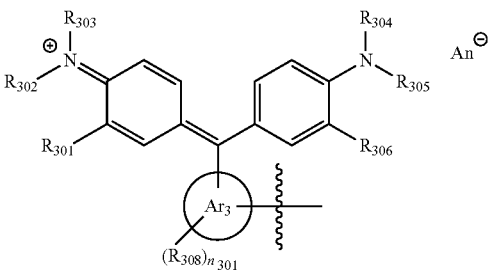

(III)

(where $An^-$ is the same as above, $R_{301}$ and $R_{306}$ each independently represent a hydrogen atom or a methyl group, $R_{302}$ to $R_{305}$ each independently represent an alkyl group having 1 to 30 carbon atoms, or a substituted or unsubstituted aryl group having 6 to 14 carbon atoms, $n_{301}$ of $R_{308}$(s) each independently represent an alkyl group having 1 to 30 carbon atoms, an alkoxy group having 1 to 6 carbon atoms, a phenyl group, a naphthyl group, a halogeno group, a hydroxy group, a nitro group, or a sulfo group, $Ar_3$ represents a benzene ring or a naphthalene ring, and when $Ar_3$ is a benzene ring, $n_{301}$ represents an integer from 0 to 4, and when $Ar_3$ is a naphthalene ring, $n_{301}$ represents an integer from 0 to 6)

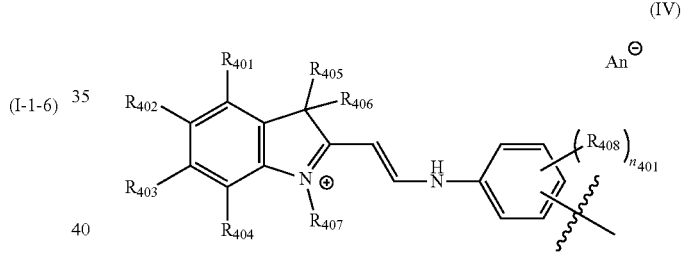

(IV)

(where $An^-$ is the same as above, $R_{401}$ to $R_{404}$ each independently represent a hydrogen atom, an alkyl group having 1 to 6 carbon atoms, an alkoxy group having 1 to 6 carbon atoms, an alkyloxycarbonyl group having 2 to 4 carbon atoms, an alkylcarbonyloxy group having 2 to 4 carbon atoms, a phenylcarbonyl group, a naphthylcarbonyl group, a halogeno group, a carboxy group, a nitro group, a cyano group, or an amino group, $R_{405}$ and $R_{406}$ each independently represent a hydrogen atom; an alkyl group having 1 to 6 carbon atoms; a phenylalkyl group having 7 to 9 carbon atoms which is unsubstituted or has an alkyl group having 1 to 6 carbon atoms, a nitro group, a halogeno group, or a cyano group; or a naphthylalkyl group having 11 to 13 carbon atoms, $R_{407}$ represents a hydrogen atom; an alkyl group having 1 to 6 carbon atoms which is unsubstituted or has an alkoxy group having 1 to 6 carbon atoms, an alkyloxycarbonyl group having 2 to 4 carbon atoms, a hydroxy group, a carboxy group, a halogeno group, a cyano group, or an amino group; a phenylalkyl group having 7 to 9 carbon atoms which is unsubstituted or has an alkoxy group having 1 to 6 carbon atoms, a halogeno group, or an amino group; or a naphthylalkyl group having 11 to 13 carbon atoms, $n_{401}$ of $R_{408}$(s) each independently represent an alkyl group having 1 to 6 carbon atoms, an alkoxy group having 1 to 6 carbon atoms, an alkyloxycarbonyl group having 2 to 4 carbon atoms, an alkylcarbonyloxy group having 2 to 4 carbon atoms, a phenylcarbonyl group, a naphthylcarbonyl group, a halogeno group, a carboxy group, a nitro group, a cyano group, or an amino group, and $n_{401}$ represents an integer from 0 to 4);

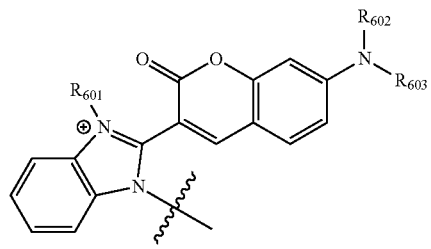
(VI)

(where An⁻ is the same as above,
$R_{601}$ represents an alkyl group having 1 to 6 carbon atoms, and
$R_{602}$ and $R_{603}$ each independently represent an alkyl group having 1 to 30 carbon atoms);

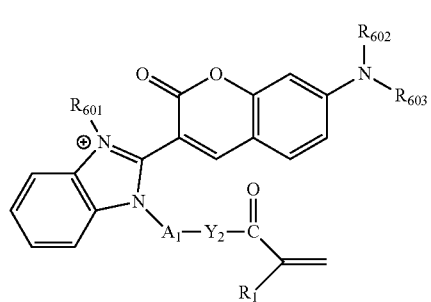
(VII)

(where $R_{701}$ represents an alkyl group having 1 to 30 carbon atoms).

The present invention is the compound represented by General Formula (2) below:

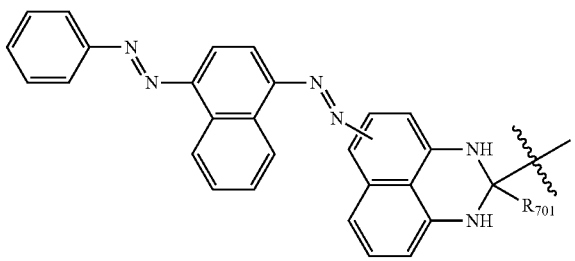
(2)

{where $R_1$ represents a hydrogen atom or a methyl group,
$R_{601}$ represents an alkyl group having 1 to 6 carbon atoms,
$R_{602}$ and $R_{603}$ each independently represent an alkyl group having 1 to 30 carbon atoms,
$Y_2$ represents —O— or —NR$_{10}$—, where $R_{10}$ represents a hydrogen atom or an alkyl group having 1 to 12 carbon atoms,
An⁻ represents an anion,
$A_1$ represents an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and a group represented by General Formula (2-1) below:

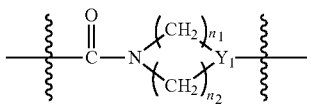
(2-1)

[where $Y_1$ represents a nitrogen atom or a group represented by General Formula (2-2) below:

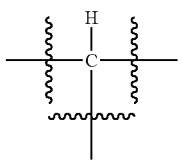
(2-2)

$n_1$ represents an integer from 0 to 2, and $n_2$ represents an integer from 2 to 4, where $n_1+n_2$ is 3 or 4];

an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1), and also has a hydroxy group as a substituent;

an alkylene group having 1 to 21 carbon atoms which has a hydroxy group as a substituent; or an alkylene group having 1 to 21 carbon atoms}.

The present invention is a compound represented by General Formula (3) below:

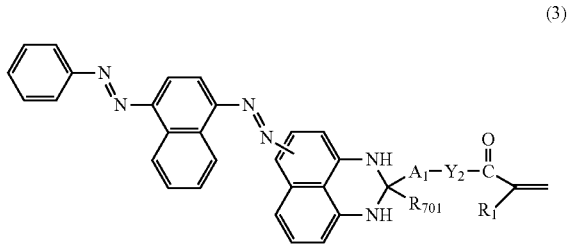
(3)

{where $R_1$ represents a hydrogen atom or a methyl group,
$R_{701}$ represents an alkyl group having 1 to 30 carbon atoms,
$Y_2$ represents —O— or —NR$_{10}$—, where $R_{10}$ represents a hydrogen atom or an alkyl group having 1 to 12 carbon atoms,
$A_1$ represents an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and a group represented by General Formula (2-1) below:

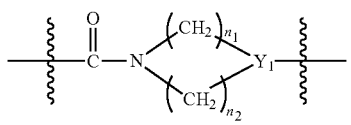

(2-1)

[where $Y_1$ represents a nitrogen atom or a group represented by General Formula (2-2) below:

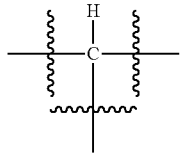

(2-2)

$n_1$ represents an integer from 0 to 2, and $n_2$ represents an integer from 2 to 4, where $n_1+n_2$ is 3 or 4];
an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1), and also has a hydroxy group as a substituent;
an alkylene group having 1 to 21 carbon atoms which has a hydroxy group as a substituent; or an alkylene group having 1 to 21 carbon atoms}.

The writing instrument ink composition of the present invention includes an aqueous dispersion of colored particles having the above-described characteristics.

In addition, the inkjet ink composition, the painting material composition, and the aqueous coating composition of the present invention each include an aqueous dispersion of colored particles having the above-described characteristics.

Effects of the Invention

The present invention provides an aqueous dispersion of colored particles suitable for colorants such as writing instrument inks, inkjet inks, painting materials, and aqueous coatings, the aqueous dispersion of colored particles being excellent in water resistance and light resistance, and also having excellent functions for feathering resistance and permeation resistance in writing inks, and also provides a writing instrument ink composition, an inkjet ink composition, a painting material composition, and an aqueous coating composition including the aqueous dispersion of colored particles.

EMBODIMENTS OF THE INVENTION

An embodiment of the present invention is described below in detail.

The aqueous dispersion of colored particles of the present invention includes a polymer having at least a unit of a monomer derived from a dye having a polymerizable unsaturated group.

<Monomer Derived from a Dye Having a Polymerizable Unsaturated Group>

In the present invention, the monomer derived from the dye having a polymerizable unsaturated group is not particularly limited as long as the monomer is a monomer derived from a dye having a polymerizable unsaturated group, but is preferably derived from the compound represented by General Formula (1) below:

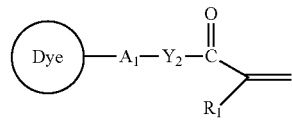

(1)

{where Dye represents a dye residue, $R_1$ represents a hydrogen atom or a methyl group,
$Y_2$ represents —O— or —$NR_{10}$—, where $R_{10}$ represents a hydrogen atom or an alkyl group having 1 to 12 carbon atoms,
$A_1$ represents an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and a group represented by General Formula (2-1) below:

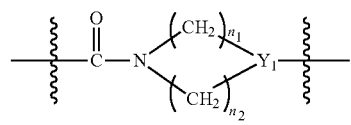

(2-1)

[where $Y_1$ represents a nitrogen atom or a group represented by General Formula (2-2) below:

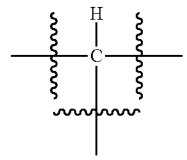

(2-2)

$n_1$ represents an integer from 0 to 2, and $n_2$ represents an integer from 2 to 4, where $n_1+n_2$ is 3 or 4];
an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1), and has also a hydroxy group as a substituent;
an alkylene group having 1 to 21 carbon atoms which has a hydroxy group as a substituent; or an alkylene group having 1 to 21 carbon atoms}.

The dye residue represented by Dye in General Formula (1) is a monovalent residue obtained by removing a group such as hydrogen in the molecule of a known dye, and may have any dye skeleton. Examples of the dye residue include residues derived from dyes such as xanthene dyes, triarylmethane dyes, cyanine dyes, coumarin dyes, stilbene dyes, naphthalimide dyes, perylene dyes, pyridine dyes, oxazine dyes, olefin dyes, azole dyes, anthracene dyes, thiazine dyes, phthalocyanine dyes, anthraquinone dyes, acridone dyes, quinacridone dyes, isoindolinone dyes, thioflavin dyes, thioindigo dyes, fluorene dyes, azo dyes, diphenylmethane dyes, terphenyl dyes, chrysene dyes, and pyrene dyes. Among dyes, residues derived from xanthene dyes, triarylmethane dyes, cyanine dyes, coumarin dyes, and azo dyes are preferable.

Examples of the xanthene dyes include Rhodamine dyes such as Rhodamine B, Rhodamine 6G, Rhodamine 3B, Rhodamine 101, Rhodamine 110, Sulforhodamine 101, basic violet 11, and Basic Red 2; Eosin dyes such as Eosin Y and Eosin B; and fluorescein dyes such as fluorescein and fluorescein isothiocyanate. Among the xhanthane dyes, Rhodamine dyes are preferable.

Examples of the triarylmethane dye include triarylmethane dyes such as triphenylmethane, Basic Violet 3, phenol red, phenolphthalein, Green S, malachite green, and thymol blue.

Examples of the cyanine dyes include 4-dicyanomethylene-2-methyl-6-(p-dimethylaminostyryl)-4H-pyran (DCM), Basic Yellow 11, Basic Yellow 13, Basic Red 12, Basic Red 13, Basic Red 14, Basic Red 15, Basic Red 37, Basic Violet 15, and Basic Violet 16.

Examples of the coumarin dye include coumarin dyes such as Coumarin 6, Coumarin 7, Coumarin 153, Coumarin 314, Coumarin 334, Coumarin 545, Coumarin 545T, Coumarin 545P, and 7-hydroxy-4-methyl coumarin.

Examples of the stilbene dye include stilbene dyes such as 1,4-bis(2-methylstyryl)benzene and trans-4,4'-diphenylstilbenzene.

Examples of the naphthalimide dye include naphthalimide dyes such as basic yellow 51, Solvent Yellow 11, Solvent Yellow 98, Solvent Yellow 116, Solvent Yellow 43, and Solvent Yellow 44.

Examples of the perylene dye include perylene dyes such as perylene, Lumogen (registered trademark) Yellow, Lumogen Green, Lumogen Orange, Lumogen Pink, Lumogen Red, Solvent Orange 5, and Solvent Green 5.

Examples of the pyridine dye include pyridine dyes such as 1-ethyl-2-[4-(p-dimethylaminophenyl)-1,3-butadienyl]-pyridinium-perchlorate (pyridine 1), and acridine dyes.

Examples of the oxazine dye include oxazine dyes such as cresyl violet acetate, and dioxazine dyes.

Examples of the olefin dye include ethene dyes, butadiene dyes, and hexatriene dyes.

Examples of the azole dye include oxazole dyes and thiazole dyes.

Examples of the azo dyes include monoazo dyes such as Solvent Yellow 14, Solvent Yellow 16, Solvent Yellow 21, Solvent Yellow 61, Solvent Yellow 81, Solvent Red 1, Solvent Red 2, Solvent Red 8, Solvent Red 19, Solvent Red 23 and Solvent Red 24, Solvent Red 27, Solvent Red 31, Solvent Red 83, Solvent Red 84, Solvent Red 121, Solvent Red 132, Solvent Violet 21, Solvent Black 3, Solvent Black 4, Solvent Black 21, Solvent Black 23, Solvent Black 27, Solvent Black 28, Solvent Black 31, Solvent Orange 7, Solvent Orange 9, Solvent Orange 37, Solvent Orange 40, and Solvent Orange 45, disazo dyes, and condensed azo dyes. Among the azo dyes, disazo dyes are preferable.

The above-described dyes can be categorized into acid dyes, basic dyes and nonionic dyes. In the present invention, an acidic dye means an ionic dye in which an anion moiety is a chromophore, a basic dye means an ionic dye in which a cation moiety is a chromophore, and a nonionic dye means a dye that does not fall into any of the above-described acid dyes and basic dyes (however, ionic dyes forming internal salts are also included in acid dyes or basic dyes).

The dye residue in Dye of the above General Formula (1) may be derived from any of an acid dye, a basic dye or a nonionic dye, and is preferably derived from an acidic dye or a basic dye, and more preferably derived from a basic dye.

Specifically, among the residues derived from the above-described dyes, residues derived from xanthene basic dyes, triarylmethane basic dyes, cyanine basic dyes, coumarin basic dyes, and residues derived from azo nonionic dyes are preferable, and residues derived from Rhodamine basic dyes, triarylmethane basic dyes, cyanine basic dyes, coumarin basic dyes, and disazo nonionic dyes are more preferable.

Specific examples of the dye residue in Dye of General Formula (1) include the dye residues represented by General Formulas (I), (III), (IV), (VI) and (VII) below:

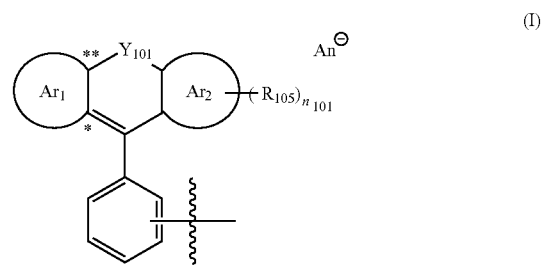

(I)

{where $n_{101}$ of $R_{105}$(s) each independently represent a halogeno group, an alkyl group having 1 to 30 carbon atoms, an alkoxy group having 1 to 20 carbon atoms, an alkylthio group having 1 to 20 carbon atoms, a substituted or unsubstituted amino group, a hydroxy group, an aryl group having 6 to 14 carbon atoms, an aryloxy group having 6 to 14 carbon atoms, or an arylalkyl group having 7 to 20 carbon atoms, $Y_{101}$ represents an oxygen atom, a sulfur atom, —$NR_{132}$— or —$Si(R_{133})_2$—, where $R_{132}$ represents an alkyl group having 1 to 6 carbon atoms, and two of $R_{133}$(s) each independently represent an alkyl group having 1 to 6 carbon atoms or an aryl group having 6 to 14 carbon atoms, An⁻ represents an anion, and $A_1$ represents a ring structure represented by General Formulas (I-1-1) to (I-1-7) below:

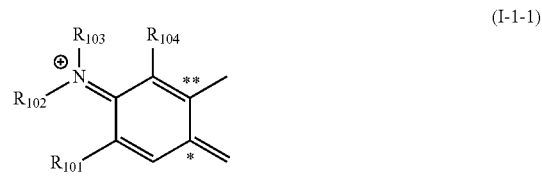

(I-1-1)

(where $R_{101}$ and $R_{104}$ each independently represent a hydrogen atom or a methyl group, $R_{102}$ and $R_{103}$ each independently represent a hydrogen atom, an alkyl group having 1 to 30 carbon atoms, or a substituted or unsubstituted aryl group having 6 to 14 carbon atoms,

* and ** represent the same positions as * and ** in General Formula (I), $R_{101}$ and $R_{102}$ together may form an alkylene group having 2 to 4 carbon atoms, and $R_{103}$ and $R_{104}$ together may form an alkylene group having 2 to 4 carbon atoms)

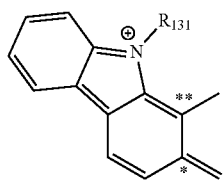
(I-1-2)

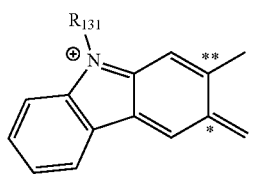
(I-1-3)

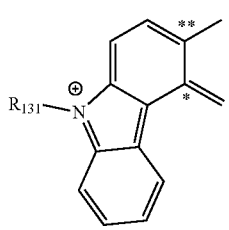
(I-1-4)

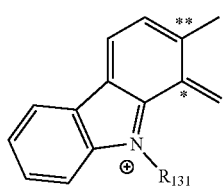
(I-1-5)

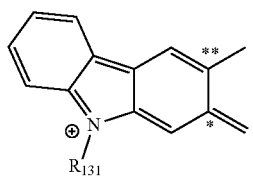
(I-1-6)

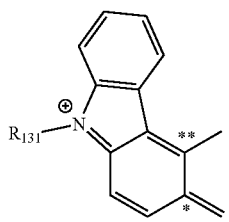
(I-1-7)

(where $R_{131}$ represents an alkyl group having 1 to 30 carbon atoms,

* and ** represent the same positions as * and ** in General Formula (I)),

* and ** represent bonding positions to the ring structures represented by General Formulas (I-1-1) to (I-1-7), $Ar_2$ represents a benzene ring, a naphthalene ring, or an anthracene ring, when $Ar_2$ is a benzene ring, $n_{101}$ represents an integer from 0 to 4, when $Ar_2$ is a naphthalene ring, $n_{101}$ represents an integer from 0 to 6, and when $Ar_2$ is an anthracene ring, $n_{101}$ represents an integer from 0 to 8}

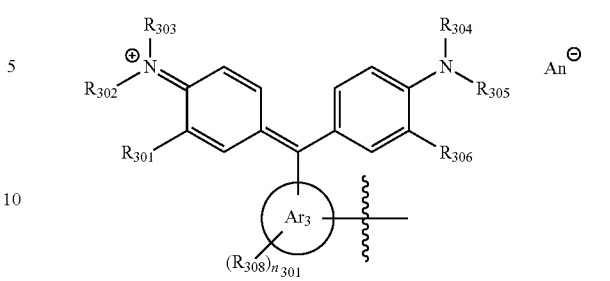
(III)

(where An⁻ is the same as above, $R_{301}$ and $R_{306}$ each independently represent a hydrogen atom or a methyl group, $R_{302}$ to $R_{305}$ each independently represent an alkyl group having 1 to 30 carbon atoms, or a substituted or unsubstituted aryl group having 6 to 14 carbon atoms, $n_{301}$ of $R_{308}$(s) each independently represent an alkyl group having 1 to 30 carbon atoms, an alkoxy group having 1 to 6 carbon atoms, a phenyl group, a naphthyl group, a halogeno group, a hydroxy group, a nitro group, or a sulfo group, $Ar_3$ represents a benzene ring or a naphthalene ring, and when $Ar_3$ is a benzene ring, $n_{301}$ represents an integer from 0 to 4, and when $Ar_3$ is a naphthalene ring, $n_{301}$ represents an integer from 0 to 6);

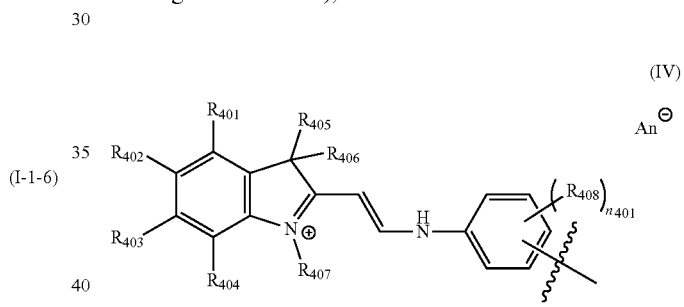
(IV)

(where An⁻ is the same as above, $R_{401}$ to $R_{404}$ each independently represent a hydrogen atom, an alkyl group having 1 to 6 carbon atoms, an alkoxy group having 1 to 6 carbon atoms, an alkyloxycarbonyl group having 2 to 4 carbon atoms, an alkylcarbonyloxy group having 2 to 4 carbon atoms, a phenylcarbonyl group, a naphthylcarbonyl group, a halogeno group, a carboxy group, a nitro group, a cyano group, or an amino group, $R_{405}$ and $R_{406}$ each independently represent a hydrogen atom; an alkyl group having 1 to 6 carbon atoms; a phenylalkyl group having 7 to 9 carbon atoms which is unsubstituted or has an alkyl group having 1 to 6 carbon atoms, a nitro group, a halogeno group, or a cyano group; or a naphthylalkyl group having 11 to 13 carbon atoms, $R_{407}$ represents a hydrogen atom; an alkyl group having 1 to 6 carbon atoms which is unsubstituted or has an alkoxy group having 1 to 6 carbon atoms, an alkyloxycarbonyl group having 2 to 4 carbon atoms, a hydroxy group, a carboxy group, a halogeno group, a cyano group, or an amino group; a phenylalkyl group having 7 to 9 carbon atoms which is unsubstituted or has an alkoxy group having 1 to 6 carbon atoms, a halogeno group, or an amino group; or a naphthylalkyl group having 11 to 13 carbon atoms, $n_{401}$ of $R_{408}$(s) each independently represent an alkyl group having 1 to 6 carbon atoms, an alkoxy group having 1 to 6 carbon atoms, an alkyloxycarbonyl group having 2 to 4 carbon atoms, an alkylcarbonyloxy group having 2 to 4 carbon atoms, a phenylcarbonyl group, a naphthylcarbonyl group, a halogeno group, a carboxy group, a nitro group, a cyano group, or an amino group, $n_{401}$ represents an integer from 0 to 4);

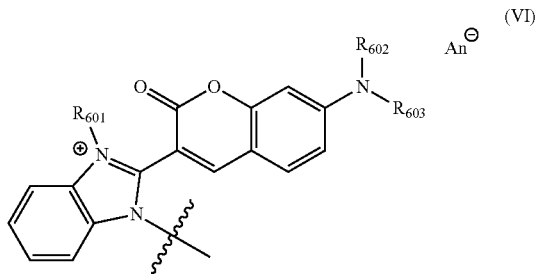

(where $An^-$ is the same as above,
$R_{601}$ represents an alkyl group having 1 to 6 carbon atoms, and
$R_{602}$ and $R_{603}$ each independently represent an alkyl group having 1 to 30 carbon atoms);

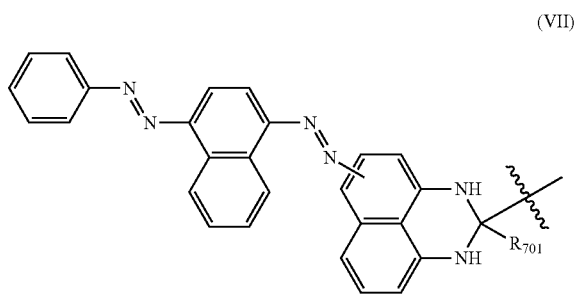

(where $R_{701}$ represents an alkyl group having 1 to 30 carbon atoms).

[Anion Represented by $An^-$]

$An^-$ in General Formulas (I), (III), (IV) and (VI) is not particularly limited as long as it is an anion usually used in this field. Specific examples include a halide ion; an aryl group having an electron-withdrawing substituent, a sulfonyl group having an electron-withdrawing substituent, an anion containing a haloalkyl or halogeno group; a halogen oxo acid anion; or a sulfonate anion (hereinafter may be abbreviated as an anion according to the present invention).

Among the anions according to the present invention, examples of the halide ion include a fluoride ion ($F^-$), a chloride ion ($Cl^-$), a bromide ion ($Br^-$), and an iodide ion ($I^-$). Among the halide ions, a chloride ion is preferable.

Among the anions according to the present invention, examples of the anion portion in the anion containing an aryl group having an electron-withdrawing substituent, a sulfonyl group having an electron-withdrawing substituent, or a haloalkyl group include a sulfonate anion, a nitrogen anion ($N^-$), a quaternary boron anion, a nitrate ion, and a phosphate ion. Among the anions, a sulfonate anion,
a nitrogen anion, and a quaternary boron anion are preferable, and a quaternary boron anion is more preferable.

Among the anions according to the present invention, examples of the anion portion in the anion containing a halogeno group include
a quaternary boron anion, a phosphorus anion, and an antimony anion. Among the anions, a phosphorus anion and an antimony anion are preferable, and a phosphorus anion is more preferable.

In the anion according to the present invention, examples of the electron-withdrawing substituent in the aryl group having an electron-withdrawing substituent or the sulfonyl group having an electron-withdrawing substituent include a haloalkyl group having 1 to 3 carbon atoms, a halogeno group, and a nitro group. Among the groups, a haloalkyl group having 1 to 3 carbon atoms and a halogeno group are preferable, and a halogeno group is particularly preferable.

Examples of the haloalkyl group having 1 to 3 carbon atoms as the electron-withdrawing substituent include: chloroalkyl groups such as a chloromethyl group, a trichloromethyl group, a 2-chloroethyl group, a 2,2,2-trichloroethyl group, a pentachloroethyl group,
a 2-chloropropyl group, a 3-chloropropyl group, a 2-chloro-2-propyl group, and a hepta chloropropyl group; bromoalkyl groups such as a bromomethyl group, a tribromomethyl group, a 2-bromoethyl group, a 2,2,2-tribromoethyl group, a pentabromoethyl group, a 2-bromopropyl group, a 3-bromopropyl group, a 2-bromo-2-propyl group, and
a heptabromopropyl group; iodoalkyl groups such as an iodomethyl group, a triiodomethyl group, a 2-iodoethyl group, a 2,2,2-triiodoethyl group, a pentaiodoethyl group, a 2-iodopropyl group, a 3-iodopropyl group, a 2-iodo-2-propyl group, and a heptaiodopropyl group; and fluoroalkyl groups such as a fluoromethyl group, a trifluoromethyl group,
a 2-fluoroethyl group, a 2,2,2-trifluoroethyl group,
a 1,1,2,2-tetrafluoroethyl group, a pentafluoroethyl group,
a 3-fluoropropyl group, a 3,3,3-trifluoropropyl group,
a 2,2,3,3-tetrafluoropropyl group, and a heptafluoropropyl group.

Among the haloalkyl groups, perhalogenoalkyl groups such as a trichloromethyl group,
a pentachloroethyl group, a heptachloropropyl group, a tribromomethyl group, a pentabromoethyl group, a heptabromopropyl group,
a triiodomethyl group, a pentaiodoethyl group, a heptaiodopropyl group, a trifluoromethyl group, a pentafluoroethyl group, and a heptafluoropropyl group are preferable, perfluoroalkyl groups such as a trifluoromethyl group, a pentafluoroethyl group and a heptafluoropropyl group are more preferable, and a trifluoromethyl group is particularly preferable.

Examples of the halogeno group as the electron-withdrawing substituent include a fluoro group, a chloro group, a bromo group, and an iodo group. Among the halogeno groups, a fluoro group is preferable.

In the anion according to the present invention, as the electron-withdrawing substituent in the aryl group having an electron-withdrawing substituent, among the above-described specific examples, the anions having a strong electron-withdrawing force are preferable; a trifluoromethyl group, a fluoro group, and a nitro group are preferable, and a fluoro group is more preferable.

In the anion according to the present invention, as the electron-withdrawing substituent in the sulfonyl group having an electron-withdrawing substituent, among the above-described specific examples, a trifluoromethyl group, a pentafluoroethyl group, a heptafluoropropyl group, and a fluoro group are preferable.

Examples of the aryl group in the aryl group having an electron-withdrawing substituent in the anion according to the present invention include a phenyl group and a naphthyl group.
Among the aryl groups,
a phenyl group is preferable.

Specific examples of the aryl group having an electron-withdrawing substituent in the anion according to the present invention include the aryl groups represented by General Formulas (20-1) and (20-2) below:

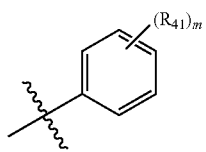
(20-1)

(where m represents an integer from 1 to 5, and m of $R_{41}$(s) each independently represent a haloalkyl group having 1 to 3 carbon atoms a halogeno group, or a nitro group);

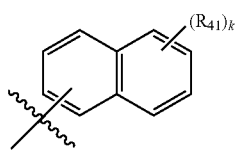
(20-2)

(where k represents an integer from 1 to 7, $R_{41}$ is the same as above, and k of $R_{41}$(s) may be the same or different)

In General Formula (20-1), m is usually an integer from 1 to 5, preferably from 2 to 5, more preferably from 3 to 5, and even more preferably 5 when $R_{41}$ is a halogeno group. When $R_{41}$ is a nitro group, m is preferably from 1 to 3, and more preferably 1. When $R_{41}$ is a haloalkyl group, m is preferably from 1 to 5, and more preferably from 1 to 3.

In General Formula (20-2). k is usually an integer from 1 to 7, and preferably from 2 to 7 when $R_{41}$ is a halogeno group. When $R_{41}$ is a nitro group, k is preferably from 1 to 3, and more preferably 1. When $R_{41}$ is a haloalkyl group, k is preferably from 1 to 7, and more preferably from 1 to 3.

Examples of the haloalkyl group having 1 to 3 carbon atoms in $R_{41}$ in General Formulas (20-1) and (20-2) include the same ones as the haloalkyl group having 1 to 3 carbon atoms as the electron-withdrawing substituent in the anion according to the present invention, and preferable examples are also the same.

Examples of the halogeno group represented by $R_{41}$ in General Formulas (20-1) and (20-2) include a fluoro group, a chloro group, a bromo group, and an iodo group. Among the halogeno groups, a fluoro group is preferable.

Preferable specific examples of $R_{41}$ in General Formulas (20-1) and (20-2) are the same as the preferable examples of the electron-withdrawing substituent in the above-described aryl group having an electron-withdrawing substituent.

Specific examples of the group represented by General Formula (20-1) include a trifluoromethylphenyl group, a di(trifluoromethyl)phenyl group, a tri (trifluoromethyl)phenyl group, a pentafluoroethylphenyl group, a di(pentafluoroeth-yl)phenyl group, a tri(pentafluoroethyl)phenyl group, a heptafluoropropylphenyl group, a di(heptafluoropropyl)phenyl group, a tri(heptafluoropropyl)phenyl group, a monofluorophenyl group, a difluorophenyl group,
a trifluorophenyl group, a perfluorophenyl group, a monochlorophenyl group, a dichlorophenyl group, a trichlorophenyl group,
a perchlorophenyl group, a monobromophenyl group, a dibromophenyl group, a tribromophenyl group, a perbromophenyl group, a monoiodophenyl group, a diiodophenyl group, a triiodophenyl group, a periodophenyl group,
a nitrophenyl group, a dinitrophenyl group, and a trinitrophenyl group. Among the groups, a difluorophenyl group, a trifluorophenyl group and
a perfluorophenyl group are preferable, and a perfluorophenyl group is more preferable.

Specific examples of the group represented by General Formula (20-2) include a trifluoromethylnaphthyl group, a di(trifluoromethyl)naphthyl group, a tri(trifluoromethyl)naphthyl group, a pentafluoroethylnaphthyl group,
a di(pentafluoroethyl)naphthyl group, a tri(pentafluoroethyl)naphthyl group, a heptafluoropropylnaphthyl group,
a di(heptafluoropropyl)naphthyl group,
a tri(heptafluoropropyl)naphthyl group, a monofluoronaphthyl group,
a difluoronaphthyl group, a trifluoronaphthyl group,
a perfluoronaphthyl group, a monochloronaphthyl group,
a dichloronaphthyl group, a trichloronaphthyl group,
a perchloronaphthyl group, a monobromonaphthyl group, a dibromonaphthyl group, a tribromonaphthyl group, a perbromonaphthyl group,
a monoiodonaphthyl group, a diiodonaphthyl group, a triiodonaphthyl group, a periodonaphthyl group, a nitronaphthyl group, a dinitronaphthyl group, and a trinitronaphthyl group.

The aryl group having an electron-withdrawing substituent in the anion according to the present invention is preferably, among the above-described specific examples, the group represented by General Formula (20-1). Specifically, a trifluoromethylphenyl group,
a pentafluoroethylphenyl group, a heptafluoropropylphenyl group, a nitrophenyl group, a dinitrophenyl group, a trinitrophenyl group, a monofluorophenyl group, a difluorophenyl group, a trifluorophenyl group, and a perfluorophenyl group is preferable, a difluorophenyl group, a trifluorophenyl group, and a perfluorophenyl group are more preferable, and a perfluorophenyl group is particularly preferable.

Examples of the sulfonyl group having an electron-withdrawing substituent in the anion according to the present invention include $—SO_2—CF_3$, $—SO_2—C_2F_5$, $—SO_2—C_3F_7$, $—SO_2—F$, $—SO_2—Cl$, $—SO_2—Br$, and $—SO_2—I$.

Examples of the haloalkyl group in the anion according to the present invention include the same ones as the haloalkyl group having 1 to 3 carbon atoms as the electron-withdrawing substituent in the anion according to the present invention, and preferable examples are also the same.

Examples of the halogeno group in the anion according to the present invention include a fluoro group, a chloro group, a bromo group, and an iodo group. Among the halogeno groups, a fluoro group is preferable.

In the anion according to the present invention, specific examples of the anion containing an aryl group having an electron-withdrawing substituent, a sulfonyl group having electron-withdrawing substituent, or a haloalkyl or halogeno group include the anions represented by General Formula (13) to (19) below:

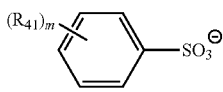
(13)

(where $R_{41}$ and m are the same as above, and m of $R_{41}$(s) may be the same or different);

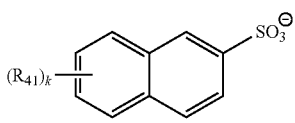
(14)

(where $R_{41}$ and k are the same as above, and k of $R_{41}$(s) may be the same or different);

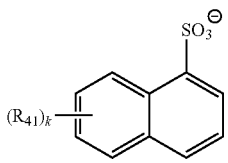
(15)

(where $R_{41}$ and k are the same as above, and k of $R_{41}$(s) may be the same or different);

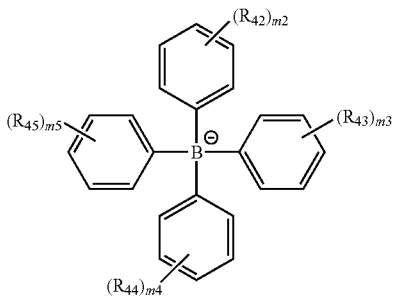
(16)

(where $R_{42}$ to $R_{45}$ each independently represent a haloalkyl group, a halogeno group, or a nitro group having 1 to 3 carbon atoms, and $m_2$ to $m_5$ each independently represent an integer from 1 to 5, $m_2$ of $R_{42}$(s), $m_3$ of $R_{43}$(s), $m_4$ of $R_{44}$, and $m_5$ of $R_{45}$ may be the same or different);

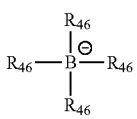
(17)

(where four of $R_{46}$(s) each independently represent a haloalkyl group or a halogeno group having 1 to 3 carbon atoms);

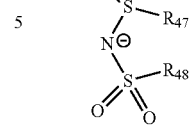
(18)

(where $R_{47}$ and $R_{48}$ each independently represent a haloalkyl group or a halogeno group having 1 to 3 carbon atoms, and $R_{47}$ and $R_{48}$ may form a haloalkylene group having 2 to 3 carbon atoms);

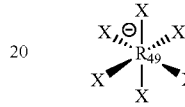
(19)

(where $R_{49}$ represents a phosphorus atom or an antimony atom, and all six Xs represent the same halogeno group).

Examples of the haloalkyl group having 1 to 3 carbon atoms in $R_{42}$ to $R_{45}$ in General Formula (16), $R_{46}$ in General Formula (17), and $R_{47}$ and $R_{48}$ in General Formula (18) include the same ones as the haloalkyl group having 1 to 3 carbon atoms as an electron-withdrawing substituent in the anion according to the present invention, and preferable examples are also the same.

Examples of $R_{42}$ to $R_{45}$ in General Formula (16), $R_{46}$ in General Formula (17), $R_{47}$ and $R_{48}$ in General Formula (18), and the halogeno group in X in General Formula (19) include a fluoro group, a chloro group, a bromo group, and an iodo group. Among the halogeno groups, a fluoro group is preferable.

Examples of the haloalkylene group having 2 to 3 carbon atoms formed by $R_{47}$ and $R_{48}$ in General Formula (18) include a tetrafluoroethylene group and a hexafluorotrimethylene group. Among the haloalkylene groups, hexafluorotrimethylene group is preferable.

For $R_{49}$ in General Formula (19), a phosphorus atom is preferable.

Examples of the combination of $R_{41}$ and m in General Formula (13) include combinations described in the following table. In addition, all the m of $R_{41}$(s) are preferably the same groups:

| $R_{41}$ | m |
| --- | --- |
| Trifluoromethyl group (—$CF_3$) | 1 to 3 |
| Pentafluoroethyl group (—$C_2F_5$) | 1 to 3 |
| Heptafluoropropyl group (—$C_3F_7$) | 1 to 3 |
| Nitro group | 1 to 3 |
| Fluorine atom | 1 to 5 |
| Chlorine atom | 1 to 5 |
| Bromine atom | 1 to 5 |
| Iodine atom | 1 to 5 |

Preferable specific examples of the anion represented by General Formula (13) include the following.

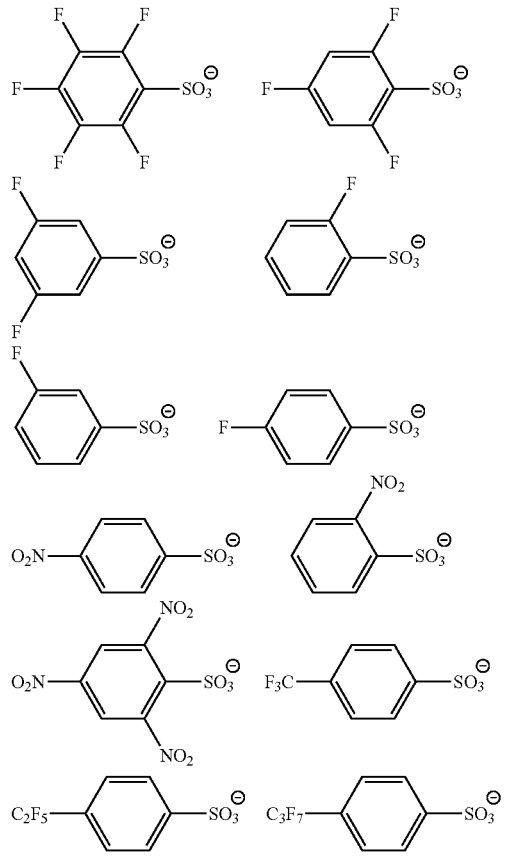

Examples of the combination of $R_{41}$ and k in General Formulas (14) and (15) include combinations described in the following table. In addition, all the k of $R_{41}$(s) are preferably the same groups.

| $R_{41}$ | k |
|---|---|
| Trifluoromethyl group (—$CF_3$) | 1 to 3 |
| Pentafluoroethyl group (—$C_2F_5$) | 1 to 3 |
| Heptafluoropropyl group (—$C_3F_7$) | 1 to 3 |
| Nitro group | 1 to 3 |
| Fluorine atom | 1 to 7 |
| Chlorine atom | 1 to 7 |
| Bromine atom | 1 to 7 |
| Iodine atom | 1 to 7 |

Preferable specific examples of the anions represented by General Formulas (14) and (15) below include the following:

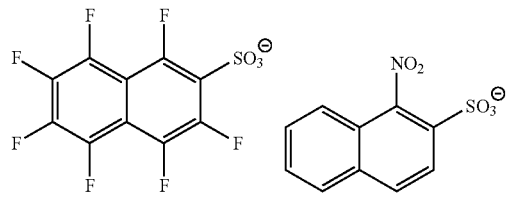

-continued

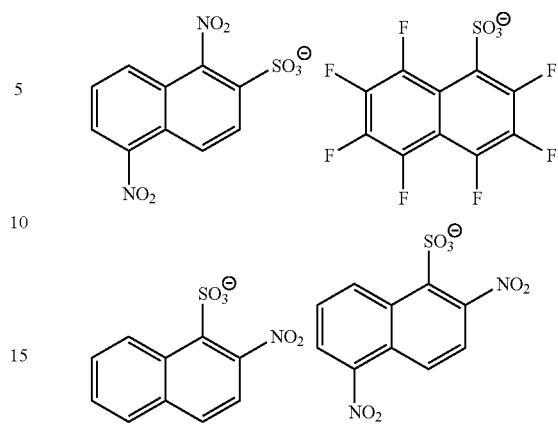

In General Formula (16), $m_2$ of $R_{42}$ (s), $m_3$ of $R_{43}$ (s), $m_4$ of $R_{44}$, and $m_5$ of $R_{45}$ are preferably the same groups in each of them. Examples of the combination of $R_{42}$ to $R_{45}$ and $m_2$ to $m_5$ in General Formula (16) include combinations described in the following table.

| $R_{42}$ | $m_2$ | $R_{43}$ | $m_3$ | $R_{44}$ | $m_4$ | $R_{45}$ | $m_5$ |
|---|---|---|---|---|---|---|---|
| —$CF_3$ | 1 to 3 | —$CF_3$ | 1 to 3 | —$CF_3$ | 1 to 3 | —$CF_3$ | 1 to 3 |
| —$C_2F_5$ | 1 to 3 | —$C_2F_5$ | 1 to 3 | —$C_2F_5$ | 1 to 3 | —$C_2F$ | 1 to 3 |
| —$C_3F_7$ | 1 to 3 | —$C_3F_7$ | 1 to 3 | —$C_3F_7$ | 1 to 3 | —$C_3F_7$ | 1 to 3 |
| Nitro group | 1 to 3 | Nitro group | 1 to 3 | Nitro group | 1 to 3 | Nitro group | 1 to 3 |
| Fluorine atom | 1 to 5 | Fluorine atom | 1 to 5 | Fluorine atom | 1 to 5 | Fluorine atom | 1 to 5 |
| Chlorine atom | 1 to 5 | Chlorine atom | 1 to 5 | Chlorine atom | 1 to 5 | Chlorine atom | 1 to 5 |
| Bromine atom | 1 to 5 | Bromine atom | 1 to 5 | Bromine atom | 1 to 5 | Bromine atom | 1 to 5 |
| Iodine atom | 1 to 5 | Iodine atom | 1 to 5 | Iodine atom | 1 to 5 | Iodine atom | 1 to 5 |
| Nitro group | 1 to 3 | Fluorine atom | 1 to 5 | Fluorine atom | 1 to 5 | Fluorine atom | 1 to 5 |
| Nitro group | 1 to 3 | Nitro group | 1 to 3 | Fluorine atom | 1 to 5 | Fluorine atom | 1 to 5 |
| Nitro group | 1 to 3 | Nitro group | 1 to 3 | Nitro group | 1 to 3 | Fluorine atom | 1 to 5 |

Preferable specific examples of the anion represented by General Formula (16) include the following:

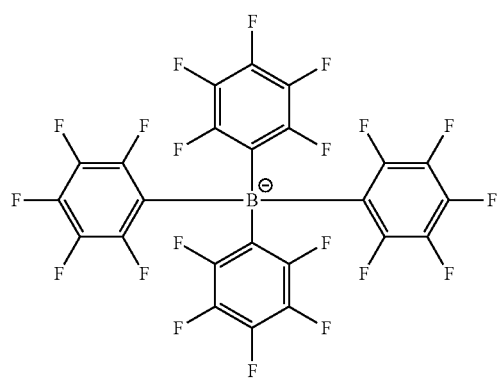

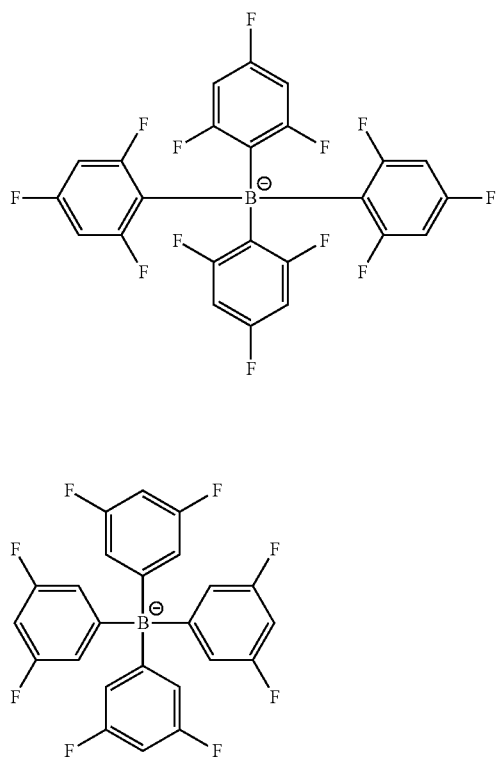
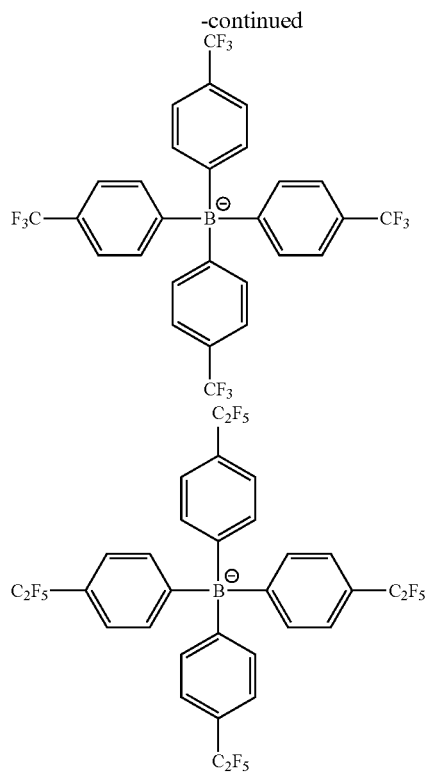
Among the above-described specific examples, the following are preferable, and tetrakis(pentafluorophenyl) boron (IV) anion is more preferable:
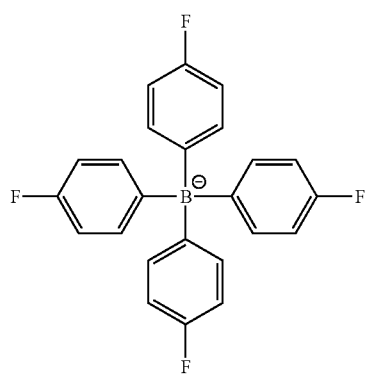
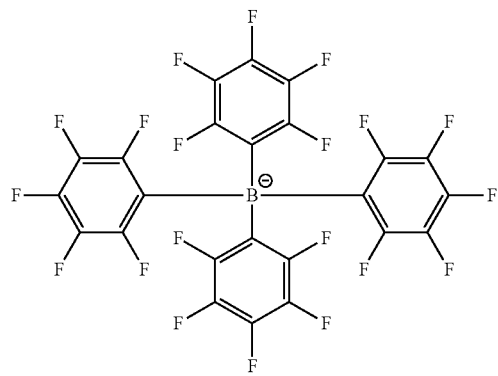
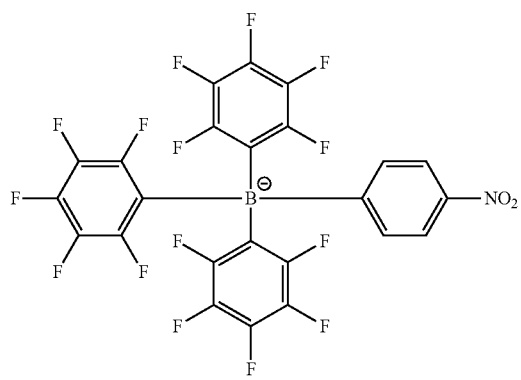
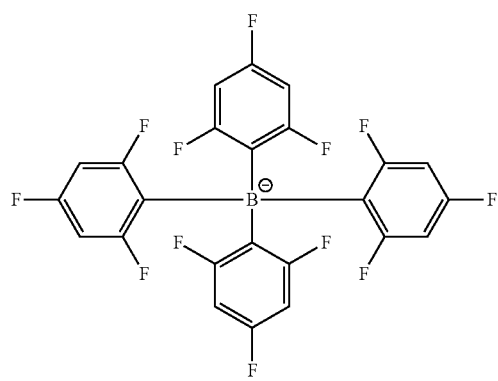

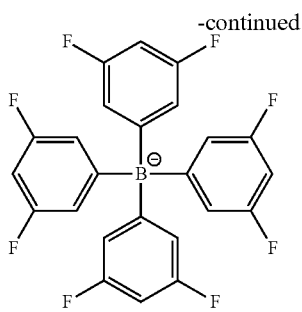

Preferable specific examples of the anion represented by General Formula (17) include $BF_4^-$, $CF_3BF_3^-$, $C_2F_5BF_3^-$, $C_3F_7BF_3^-$, $(CF_3)_4B^-$, $(C_2F_5)_4B^-$, and $(C_3F_7)_4B^-$.

Preferable specific examples of the anion represented by General Formula (18) include the following. Among the anions, a bis(trifluoromethanesulfonyl) imide anion is preferable:

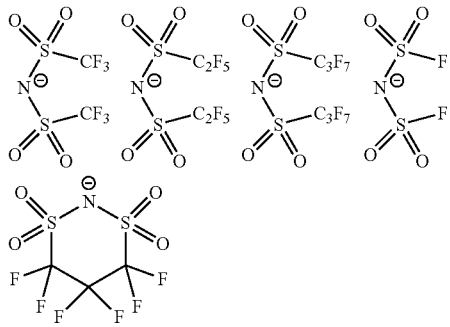

Preferable specific examples of the anion represented by General Formula (19) include $PF_6^-$ and $SbF_6^-$. Among the anions, $PF_6^-$ is preferable.

Specific examples of the halogen oxoacid anion in the anion according to the present invention include a hypochlorite anion, a chlorite anion, a chlorate anion, and a perchlorate anion. Among the oxoacid anions, a perchlorate anion is preferable.

Specific examples of the sulfonic acid anion in the anion according to the present invention include an alkylsulfonic acid anion having 1 to 20 carbon atoms such as methanesulfonic acid anion; and a haloalkylsulfonic acid having 1 to 20 carbon atoms such as trifluoromethanesulfonic acid anion; a benzenesulfonic acid anion unsubstituted or substituted with benzenesulfonic acid anion or toluenesulfonic acid anion; and a naphthalene sulfonate anion unsubstituted or substituted with a 1-naphthalene sulfonate anion.

For $An^-$ in General Formulas (I), (III), (IV), and (VI), the anion according to the present invention is preferable, and a halide ion, and an anion containing an aryl group having an electron-withdrawing substituent, a sulfonyl group having an electron-withdrawing substituent, a haloalkyl group, or a halogeno group are more preferable. Specifically, chloride ions and anions represented by General formulas (16) to (19) are preferable, chloride ions and anions represented by General Formula (16), (18) or (19) are more preferable, and chloride ions and anions represented by formula (16) or (19) are even more preferable.

For $An^-$ in General formulas (I), (III), (IV), and (VI), among the above-described specific examples, the following are preferable, and a chloride ion, tetrakis(pentafluorophenyl))boron (IV) anion, a bis(trifluoromethanesulfonyl)imide anion, and $PF_6^-$ are more preferable, and a chloride ion, tetrakis(pentafluorophenyl)boron (IV) anion, and $PF_6^-$ are even more preferable:

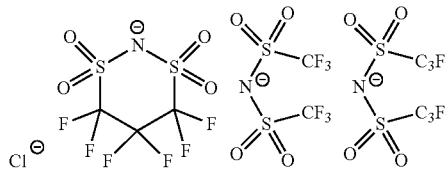

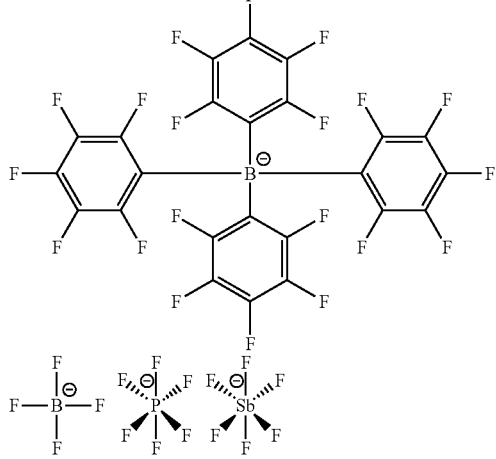

[Dye Residue Represented by General Formula (I)]

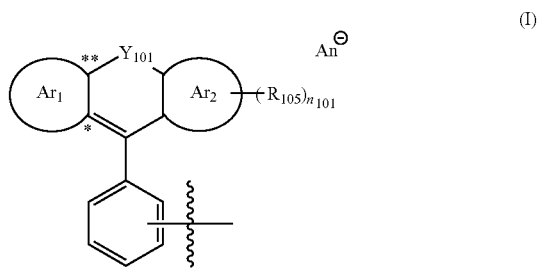

(where * and ** represent the same bonding positions to the ring structures represented by General Formulas (I-1-1) to (I-1-7), and $R_{105}$, $Y_{101}$, $Ar_1$, $Ar_2$, $An^-$, and $n_{101}$ are the same as above).

Examples of the halogeno group in $R_{105}$ in General Formula (I) include a fluoro group, a chloro group, a bromo group, and an iodo group. Among the halogeno groups, a fluoro group is preferable.

The alkyl group having 1 to 30 carbon atoms in $R_{105}$ of General Formula (I) may be any of linear, branched and cyclic, and is preferably linear or branched. Among the alkyl groups having 1 to 30 carbon atoms, the alkyl groups having 1 to 12 carbon atoms are preferable, the alkyl groups having 1 to 6 carbon atoms are more preferable, the alkyl groups having 1 to 4 carbon atoms are even more preferable, and the alkyl groups having 1 to 2 carbon atoms are particularly preferable. Specific examples include a methyl group, an ethyl group, an n-propyl group, an isopropyl group, an n-butyl group, an isobutyl group, a sec-butyl group, a tert-butyl group, a cyclobutyl group, an n-pentyl group, an isopentyl group, a sec-pentyl group, a tert-pentyl group, a neopentyl group, a 2-methylbutyl group, a 1,2-dimethylpropyl group, a 1-ethylpropyl group, a cyclopentyl group, an n-hexyl group, an isohexyl group, a sec-hexyl group, a tert-hexyl group, a neohexyl group, a 2-methylpentyl group, a 1,2-dimethylbutyl group, a 2,3-dimethylbutyl group, a 1-ethylbutyl group, a cyclohexyl group, an n-heptyl group, an isoheptyl group, a sec-heptyl group, a tert-heptyl group, a neoheptyl group, a cycloheptyl group, an n-octyl group, an isooctyl group, a sec-octyl group, a tert-octyl group, a neooctyl group, a 2-ethylhexyl group, a cyclooctyl group, an n-nonyl group, an isononyl group, a sec-nonyl group, a tert-nonyl group, a neononyl group, a cyclononyl group, an n-decyl group, an isodecyl group, a sec-decyl group, a tert-decyl group, a neodecyl group, a cyclodecyl group, an n-undecyl group, a cycloundecyl group, an n-dodecyl group, a cyclododecyl group, an n-tridecyl group, an isotridecyl group, an n-tetradecyl group, an isotetradecyl group, an n-pentadecyl group, an isopentadecyl group, an n-hexadecyl group, an isohexadecyl group, an n-heptadecyl group, an isoheptadecyl group, an n-octadecyl group, an isooctadecyl group, an n-nonadecyl group, an isononadecyl group, an n-icosyl group, an isoicosyl group, an n-henicosyl group, an isohenicosyl group, an n-docosyl group, an isodocosyl group, an n-tricosyl group, an isotricosyl group, an n-tetracosyl group, an isotetracosyl group, an n-pentacosyl group, an isopentacosyl group, an n-hexacosyl group, an isohexacosyl group, an n-heptacosyl group, an isoheptacosyl group, an n-octacosyl group, an isooctacosyl group, an n-nonacosyl group, an isononacosyl group, an n-triacontyl group, an isotriacontyl group, a cyclohexylmethyl group, a 1-cyclohexylethyl group, a 2-methylcyclohexyl group, a 3-methylcyclohexyl group, a 4-methylcyclohexyl group, a 2,6-dimethylcyclohexyl group, a 2,4-dimethylcyclohexyl group, a 3,5-dimethylcyclohexyl group, a 2,5-dimethylcyclohexyl group, a 2,3-dimethylcyclohexyl group, a 3,3,5-trimethylcyclohexyl group, a 4-tert-butylcyclohexyl group, a 1-adamantyl group, a 2-adamantyl group, an isobornyl group, a dicyclopentanyl group, a 1-methylcyclopentyl group, a 1-ethylcyclopentyl group, a 1-n-propylcyclopentyl group, a 1-methylcyclohexyl group, a 1-ethylcyclohexyl group, a 1-n-propylcyclohexyl group, a 1-n-butylcyclohexyl group, a 1-methylcycloheptyl group, a 1-ethylcycloheptyl group, a 1-n-propylcycloheptyl group, a 1-methylcyclooctyl group, and a 1-ethylcyclooctyl group. Among the alkyl groups, methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, a 2-methylbutyl group, a 1,2-dimethylpropyl group, a 1-ethylpropyl group, an n-hexyl group, an isohexyl group, a sec-hexyl group, a tert-hexyl group, a neohexyl group, a 2-methylpentyl group, a 1,2-dimethylbutyl group, a 2,3-dimethylbutyl group, a 1-ethylbutyl group, an n-heptyl group, an n-octyl group, an n-nonyl group, an n-decyl group, an n-undecyl group, and an n-dodecyl group are preferable, and a methyl group, an ethyl group, an n-propyl group, an isopropyl, n-butyl group, an isobutyl group, a sec-butyl group, a tert-butyl group, an n-pentyl group, an isopentyl group, and an n-hexyl group are more preferable, methyl group, an ethyl group, an n-propyl group, an isopropyl group, an n-butyl group, an isobutyl group, a sec-butyl group, and a tert-butyl group are more preferable, and a methyl group and an ethyl group are particularly preferable.

The alkoxy group having 1 to 20 carbon atoms in $R_{105}$ of General Formula (I) may be any of linear, branched and cyclic, and is preferably linear or branched. Among the alkoxy groups having 1 to 20 carbon atoms, the alokxy groups having 1 to 12 carbon atoms are preferable, the alokxy groups having 1 to 6 carbon atoms are more preferable, and the alkoxy groups having 1 to 4 carbon atoms are particularly preferable. Specific examples include a methoxy group, an ethoxy group, an n-propoxy group, an isopropoxy group, an n-butoxy group, an isobutoxy group, a sec-butoxy group, a tert-butoxy group, a cyclobutoxy group, an n-pentyloxy group, an isopentyloxy group, a sec-pentyloxy group, a tert-pentyloxy group, a neopentyloxy group, a 2-methylbutoxy group, a 1,2-dimethylpropoxy group, a 1-ethylpropoxy group, a cyclopentyloxy group, an n-hexyloxy group, an isohexyloxy group, a sec-hexyloxy group, a tert-hexyloxy group, a neohexyloxy group, a 2-methylpentyloxy group, a 1,2-dimethylbutoxy group, a 2,3-dimethylbutoxy group, a 1-ethylbutoxy group, a cyclohexyloxy group, an n-heptyloxy group, an isoheptyloxy group, a sec-heptyloxy group, a tert-heptyloxy group, a neoheptyloxy group, a cycloheptyloxy group, an n-octyloxy group, an isooctyloxy group, a sec-octyloxy group, a tert-octyloxy group, a neooctyloxy group, a 2-ethylhexyloxy group, a cyclooctyloxy group, an n-nonyloxy group, an isononyloxy group, a sec-nonyloxy group, a tert-nonyloxy group, a neononyloxy group, a cyclononyloxy group, an n-decyloxy group, an isodecyloxy group, a sec-decyloxy group, a tert-decyloxy group, a neodecyloxy group, a cyclodecyloxy group, an n-undecyloxy group, a cycloundecyloxy group, an n-dodecyloxy group, a cyclododecyloxy group, an n-tridecyloxy group, an isotridecyloxy group, an n-tetradecyloxy group, an isotetradecyloxy group, an n-pentadecyloxy group, an isopentadecyloxy group, an n-hexadecyloxy group, an isohexadecyloxy group, an n-heptadecyloxy group, an isoheptadecyloxy group, an n-octadecyloxy group, an isooctadecyloxy group, an n-nonadecyloxy group, an isononadecyloxy group, an n-icosyloxy group, and an isoicosyloxy group. Among the alkoxy, methoxy group, an ethoxy group, an n-propoxy group, an isopropoxy group, an n-butoxy group, an isobutoxy group, a sec-butoxy group, a tert-butoxy group, an n-pentyloxy group, an isopentyloxy group, a sec-pentyloxy group, a tert-pentyloxy group, a neopentyloxy group, a 2-methylbutoxy group, a 1,2-dimethylpropoxy group, a 1-ethylpropoxy group, an n-hexyloxy group, an isohexyloxy group, a sec-hexyloxy group, a tert-hexyloxy group, a neohexyloxy group, a 2-methylpentyloxy group, a 1,2-dimethylbutoxy group, a 2,3-dimethylbutoxy group, and a 1-ethylbutoxy group are preferable, a methoxy group, an ethoxy group, an n-propoxy group, an isopropoxy group, an n-butoxy group, an isobutoxy group, a sec-butoxy group, and a tert-butoxy group are more preferable, and a methoxy group and an ethoxy group are more preferable.

The alkylthio group having 1 to 20 carbon atoms in $R_{105}$ in General Formula (I) may be any of linear, branched and cyclic, and is preferably linear or branched. Among the alkylthio groups having 1 to 20 carbon atoms, the alkylthio groups having 1 to 12 carbon atoms are preferable, the alkylthio groups having 1 to 6 carbon atoms are more preferable, and the alkylthio groups having 1 to 4 carbon atoms are particularly preferable. Specific examples include a methylthio group, an ethylthio group, an n-propylthio group, an isopropylthio group, an n-butylthio group, an isobutylthio group, a sec-butylthio group, a tert-butylthio group, a cyclobutylthio group, an n-pentylthio group, an isopentylthio group, a sec-pentylthio group, a tert-pentylthio group, a neopentylthio group, a 2-methylbutylthio group, a 1,2-dimethylpropylthio group, a 1-ethylpropylthio group, a cyclopentylthio group, an n-hexylthio group, an isohexylthio group, a sec-hexylthio group, a tert-hexylthio group, a neohexylthio group, a 2-methylpentylthio group, a 1,2-dimethylbutylthio group, a 2,3-dimethylbutylthio group, a 1-ethylbutylthio group, a cyclohexylthio group, an n-heptylthio group, an isoheptylthio group, a sec-heptylthio group, a tert-heptylthio group, a neoheptylthio group, a cycloheptylthio group, an n-octylthio group, an isooctylthio group, a sec-octylthio group, a tert-octylthio group, a neooctylthio group, a 2-ethylhexylthio group, a cyclooctylthio group, an n-nonylthio group, an isononylthio group, a sec-nonylthio group,
a tert-nonylthio group, a neononylthio group, a cyclononylthio group, an n-decylthio group, an isodecylthio group, a sec-decylthio group,
a tert-decylthio group, a neodecylthio group, a cyclodecylthio group, an n-undecylthio group, a cycloundecylthio group, an n-dodecylthio group, a cyclododecylthio group, an n-tridecylthio group, an isotridecylthio group, an n-tetradecylthio group, an isotetradecylthio group,
an n-pentadecylthio group, an isopentadecylthio group,
an n-hexadecylthio group, an isohexadecylthio group,
an n-heptadecylthio group, an isoheptadecylthio group, an n-octadecylthio group, an isooctadecylthio group, an n-nonadecylthio group, an isononadecylthio group, an n-icosylthio group, and an isoicosylthio group. Among the alkylthio groups, a methylthio group, an ethylthio group, an n-propylthio group, an isopropylthio group, an n-butylthio group, an isobutylthio group, a sec-butylthio group, a tert-butylthio group, an n-pentylthio group, an isopentylthio group, a sec-pentylthio group, a tert-pentylthio group, a neopentylthio group,
a 2-methylbutylthio group, a 1,2-dimethylpropylthio group, a 1-ethylpropylthio group, an n-hexylthio group, an isohexylthio group, a sec-hexylthio group, a tert-hexylthio group, a neohexylthio group, a 2-methylpentylthio group, a 1,2-dimethylbutylthio group,
a 2,3-dimethylbutylthio group, and a 1-ethylbutylthio group are preferable, a methylthio group, an ethylthio group, an n-propylthio group, an isopropylthio group, an n-butylthio group, an isobutylthio group, a sec-butylthio group, and a tert-butylthio group are more preferable, and a methylthio group and an ethylthio group are more preferable.

The substituted amino group represented by $R_{105}$ in General Formula (I) has one or two substituents. Examples of the substituent include an alkyl group having 1 to 30 carbon atoms, a haloalkyl group having 1 to 20 carbon atoms, an aryl group having 6 to 10 carbon atoms, and an arylalkyl group having 7 to 13 carbon atoms.

Examples of the alkyl group having 1 to 30 carbon atoms in the substituent of the amino group having a substituent in $R_{105}$ of General Formula (I) include the same ones as the alkyl groups having 1 to 30 carbon atoms in $R_{105}$ of General Formula (I), and preferable ones are also the same.

The haloalkyl group having 1 to 20 carbon atoms in the substituent of the amino group having a substituent in $R_{105}$ of General Formula (I) may be linear, branched, or cyclic, and is preferably linear or branched. Among the haloalkyl groups having 1 to 20 carbon atoms, the haloalkyl groups having 1 to 12 carbon atoms are preferable, the haloalkyl groups having 1 to 6 carbon atoms are more preferable, and the haloalkyl groups having 1 to 3 carbon atoms are particularly preferable. Specific examples include chloroalkyl group such as a chloromethyl group, a trichloromethyl group, a 2-chloroethyl group, a 2,2,2-trichloroethyl group, a pentachloroethyl group, a 2-chloropropyl group, a 3-chloropropyl group,
a 2-chloro-2-propyl group, and a hepta chloropropyl group; bromoalkyl groups such as a bromomethyl group, a tribromomethyl group,
a 2-bromoethyl group, a 2,2,2-tribromoethyl group, a pentabromoethyl group, a 2-bromopropyl group, a 3-bromopropyl group, a 2-bromo-2-propyl group, and a heptabromopropyl group; iodoalkyl groups such as
an iodomethyl group, a triiodomethyl group, a 2-iodoethyl group, a 2,2,2-triiodoethyl group, a pentaiodoethyl group, a 2-iodopropyl group, a 3-iodopropyl group, a 2-iodo-2-propyl group, and a heptaiodopropyl group; and fluoroalkyl groups such as a fluoromethyl group,
a trifluoromethyl group, a 2-fluoroethyl group, a 2,2,2-trifluoroethyl group, a 1,1,2,2-tetrafluoroethyl group, a pentafluoroethyl group,
a 3-fluoropropyl group, a 3,3,3-trifluoropropyl group, a 2,2,3,3-tetrafluoropropyl group, and a heptafluoropropyl group. Among the haloalkyl groups, perhalogenoalkyl groups such as a trichloromethyl group,
a pentachloroethyl group, a heptachloropropyl group, a tribromomethyl group, a pentabromoethyl group, a heptabromopropyl group,
a triiodomethyl group, a pentaiodoethyl group, a heptaiodopropyl group, a trifluoromethyl group, a pentafluoroethyl group, and a heptafluoropropyl group are preferable, perfluoroalkyl groups such as a trifluoromethyl group, a pentafluoroethyl group, and a heptafluoropropyl group are more preferable, and a trifluoromethyl group is particularly preferable.

Examples of the aryl group having 6 to 10 carbon atoms in the substituent of the amino group having a substituent in $R_{105}$ of General Formula (I) include a phenyl group and a naphthyl group. Among the aryl groups, a phenyl group is preferable.

Examples of the arylalkyl group having 7 to 13 carbon atoms in the substituent of the amino group having a substituent represented by $R_{105}$ in General Formula (I) include a phenylalkyl group having 7 to 9 carbon atoms and a naphthylalkyl group having 11 to 13 carbon atoms. Among the arylalkyl g an alkyl group having 1 to 6 carbon atoms roups, a phenylalkyl group having 7 to 9 carbon atoms is preferable. Specific examples include a benzyl group, a phenethyl group (2-phenylethyl group), a 1-phenylethyl group, a hydrocinnamyl group (3-phenylpropyl group), a 2-phenylpropyl group, a 1-phenylpropyl group, a cumyl group (2-phenylpropan-2-yl group), a naphthylmethyl group, a 2-naphthylethyl group, and a 3-naphthylpropyl group. Among the arylalkyl groups, a benzyl group, a phenethyl group, a 1-phenylethyl group, a hydrocinnamyl group, a 2-phenylpropyl group, a 1-phenylpropyl group, and a cumyl group are preferable, a benzyl group, a phenethyl group, and a hydrocinnamyl group are more preferable, and a benzyl group is even more preferable.

The substituted or unsubstituted amino group in $R_{105}$ in General Formula (I) is preferably an amino group having a substituent, more preferably an amino group having an alkyl group having 1 to 30 carbon atoms, a haloalkyl group having 1 to 20 carbon atoms, an amino group having an aryl group having 6 to 10 carbon atoms or an arylalkyl group having 7 to 13 carbon atoms, even more preferably an amino group having an alkyl group having 1 to 12 carbon atoms, a phenyl group, or a phenylalkyl group having 7 to 9 carbon atoms, and particularly preferably an amino group having an alkyl group having 1 to 6 carbon atoms. Specific examples include a methylamino group,
an ethylamino group, an n-propylamino group, an isopropylamino group, an n-butylamino group, an isobutylamino group, a sec-butylamino group, a tert-butylamino group, an n-pentylamino group, an isopentylamino group, a N-hexylamino group, a phenylamino group, a benzylamino group, a phenethylamino group, a hydrocinnamylamino group, a dimethylamino group, a diethylamino group, a di-n-propylamino group,
a diisopropylamino group, a di-n-butylamino group, a diisobutylamino group, a di-sec-butylamino group, a di-tert-butylamino group,
a di-n-pentylamino group, a diisopentylamino group, a di-n-hexylamino group, a diphenylamino group, a dibenzylamino group, a diphenethylamino group, and a bis(hydrocinnamyl) amino group. Among the amino groups, a methylamino group, an ethylamino group, an n-propylamino group, an isopropylamino group, an n-butylamino group, an isobutylamino group, a sec-butylamino group, a tert-butylamino group, a phenylamino group, a benzylamino group, a dimethylamino group, a diethylamino group, a di-n-propylamino group, a diisopropylamino group, a di-n-butylamino group, a diisobutylamino group, a di-sec-butylamino group, a di-tert-butylamino group, a diphenylamino group, and a benzylamino group are preferable, a methylamino group, an ethylamino group, a phenylamino group, a benzylamino group, a dimethylamino group, a diethylamino group, a diphenylamino group, and a dibenzylamino group are more preferable, and a methylamino group, an ethylamino group, a dimethylamino group, and a diethylamino group are even more preferable.

Specific examples of the aryl group having 6 to 14 carbon atoms in $R_{105}$ of General Formula (I) include a phenyl group, a naphthyl group, and an anthracenyl group. Among the aryl groups, a phenyl group is preferable.

Specific examples of the aryloxy group having 6 to 14 carbon atoms in $R_{105}$ in General Formula (I) include a phenoxy group, a naphthyloxy group, and an anthracenyloxy group. Among the aryloxy groups, a phenoxy group is preferable.

Examples of the arylalkyl group having 7 to 20 carbon atoms in $R_{105}$ in General Formula (I) include a phenylalkyl group having 7 to 12 carbon atoms, a naphthylalkyl group having 11 to 16 carbon atoms, and an anthracenyl alkyl group having 15 to 20 carbon atoms. Among the arylalkyl groups, a phenylalkyl group having 7 to 12 carbon atoms is preferable, and a phenylalkyl group having 7 to 9 carbon atoms is more preferable. Specific examples include a benzyl group, a phenethyl(2-phenylethyl) group, a 1-phenylethyl group, a hydrocinnamyl(3-phenylpropyl) group, a 2-phenylpropyl group, a 1-phenylpropyl group,
a cumyl(2-phenylpropane-2-yl) group, a 4-phenylbutyl group, a 3-phenylbutyl group, a 2-phenylbutyl group, a 1-phenylbutyl group, a 5-phenylpentyl group, a 4-phenylpentyl group, a 3-phenylpentyl group, a 2-phenylpentyl group, a 1-phenylpentyl group, a 6-phenylhexyl group, a 5-phenylhexyl group, a 4-phenylhexyl group, a 3-phenylhexyl group, a 2-phenylhexyl group, a 1-phenylhexyl group, a naphthylmethyl group, a 2-naphthylethyl group, a 3-naphthylpropyl group, a 4-naphthylbutyl group, a 5-naphthylpentyl group, a 6-naphthylhexyl group,
an anthracenylmethyl group, a 2-anthracenylethyl group, a 3-anthracenylpropyl group, a 4-anthracenylbutyl group, a 5-anthracenylpentyl group, and a 6-anthracenylhexyl group. Among the arylalkyl groups, a benzyl group, a phenethyl group, a 1-phenylethyl group, a hydrocinnamyl group, a 2-phenylpropyl group, a 1-phenylpropyl group, a cumyl group, a 4-phenylbutyl group, a 3-phenylbutyl group, a 2-phenylbutyl group, 1-phenylbutyl group, a 5-phenylpentyl group, a 4-phenylpentyl group, a 3-phenylpentyl group, a 2-phenylpentyl group, a 1-phenylpentyl group, a 6-phenylhexyl group, a 5-phenylhexyl group, a 4-phenylhexyl group, a 3-phenylhexyl group, a 2-phenylhexyl and 1-phenylhexyl are preferable, a benzyl group, a phenethyl group, a 1-phenylethyl group, a hydrocinnamyl group, a 2-phenylpropyl group, a 1-phenylpropyl group, and a cumyl group are more preferable, and a benzyl group, a phenethyl group, a hydrocinnamyl group and a cumyl group are even more preferable.

$R_{105}$ in General Formula (I) include is preferably a halogeno group; an alkyl group having 1 to 12 carbon atoms; an alkoxy group having 1 to 12 carbon atoms; an alkylthio group having 1 to 12 carbon atoms; an alkyl group having 1 to 30 carbon atoms, a haloalkyl group having 1 to 20 carbon atoms, an amino group having an aryl group having 6 to 10 carbon atoms or an arylalkyl group having 7 to 13 carbon atoms; a hydroxy group; an aryl group having 6 to 14 carbon atoms; an aryloxy group having 6 to 14 carbon atoms; and an arylalkyl group having 7 to 20 carbon atoms, more preferably a halogeno group;
an alkyl group having 1 to 12 carbon atoms; an alkoxy group having 1 to 12 carbon atoms; an alkylthio group having 1 to 12 carbon atoms; an alkyl group having 1 to 12 carbon atoms, an amino group having a phenyl group or a phenylalkyl group having 7 to 9 carbon atoms; a hydroxy group; a phenyl group; a phenoxy group; and a phenylalkyl group having 7 to 12 carbon atoms, even more preferably a halogeno group; an alkyl group having 1 to 6 carbon atoms; an alkoxy group having 1 to 6 carbon atoms; an alkylthio group having 1 to 6 carbon atoms; an alkyl group having 1 to 12 carbon atoms, an amino group having a phenyl group or a phenylalkyl group having 7 to 9 carbon atoms; a hydroxy group; a phenyl group; a phenoxy group; and an alkyl group having 1 to 4 carbon atoms, more preferably a phenylalkyl group having 7 to 9 carbon atoms; and particularly preferably
an amino group having an alkyl group having 1 to 6 carbon atoms. Specifically, a fluorine atom, a methyl group, an ethyl group, an n-propyl group, an isopropyl group, an n-butyl group, an isobutyl group,
a sec-butyl group, a tert-butyl group, an n-pentyl group, an isopentyl group, an n-hexyl group, a methoxy group, an ethoxy group, an n-propoxy group, an isopropoxy group, an n-butoxy group, an isobutoxy group,
a sec-butoxy group, a tert-butoxy group, a methylthio group, an ethylthio, an n-propylthio group, an isopropylthio group, an n-butylthio group, an isobutylthio group, a sec-butylthio group, a tert-butylthio group, a methylamino group, an ethylamino group, an n-propylamino group,
an isopropylamino group, an n-butylamino group, an isobutylamino group, a sec-butylamino group, a tert-butylamino group, a phenylamino group, a benzylamino group, a dimethylamino group, a diethylamino group, a di-n-propylamino group, a diisopropylamino group, a di-n-butylamino group, a diisobutylamino group, a di-sec-butylamino group,
a di-tert-butylamino group, a diphenylamino group, a dibenzylamino group, a hydroxy group, a phenyl group, a phenoxy group, a benzyl group,
a phenethyl group, a 1-phenylethyl group, a hydrocinnamyl group, a 2-phenylpropyl group, a 1-phenylpropyl group, and a cumyl group are preferable, a fluorine atom, a methyl group, an ethyl group, an n-propyl group, an isopropyl group, an n-butyl group, an isobutyl group,
a sec-butyl group, a tert-butyl group, a methoxy group, an ethoxy group, a methylthio group, an ethylthio group, a methylamino group, an ethylamino group, a phenylamino group, a benzylamino group, a dimethylamino group, a diethylamino group, a diphenylamino group, a dibenzylamino group, a hydroxy group, a phenyl group, a phenoxy group, a benzyl group, a phenethyl group, a hydrocinnamyl group, a cumyl group are more preferable, and a methyl group, an ethyl group, a methylamino group, an ethylamino group, a dimethylamino group, and a diethylamino group are more preferable, and a methyl group, an ethylamino group, and a diethylamino group are particularly preferable.

The alkyl group having 1 to 6 carbon atoms in $R_{132}$ and $R_{133}$ in $Y_{101}$ in General Formula (I) may be linear, branched, or cyclic, and is preferably linear or branched. Among the alkyl groups having 1 to 6 carbon atoms, the alkyl groups having 1 to 4 carbon atoms are preferable. Specific examples include a methyl group, an ethyl group, an n-propyl group, an isopropyl group, an n-butyl group, an isobutyl group, a sec-butyl group, a tert-butyl group, a cyclobutyl group, an n-pentyl group, an isopentyl group, a secpentyl group, a tert-pentyl group,
a neopentyl group, a 2-methylbutyl group, a 1,2-dimethylpropyl group, a 1-ethylpropyl group, a cyclopentyl group, an n-hexyl group, an isohexyl group, a sec-hexyl group, a tert-hexyl group, a neohexyl group,
a 2-methylpentyl group, a 1,2-dimethylbutyl group, a 2,3-dimethylbutyl group, a 1-ethylbutyl group, and a cyclohexyl group. Among the alkyl groups, a methyl group, an ethyl group, an n-propyl group, an isopropyl group, an n-butyl group, an isobutyl group, a sec-butyl group, and a tert-butyl group are preferable, and a methyl group and an ethyl group are more preferable.

Examples of the aryl group having 6 to 14 carbon atoms in $R_{133}$ in $Y_{101}$ in General Formula (I) include a phenyl group, a naphthyl group and an anthracenyl group. Among the aryl groups, a phenyl group is preferable.

For $R_{133}$ in $Y_{101}$ in General Formula (I), two of $R_{133}$(s) are preferably the same, and a methyl group, an ethyl group and a phenyl group are preferable, a methyl group and a phenyl group are more preferable, and a methyl group is particularly preferable.

For $Y_{101}$ in General Formula (I), an oxygen atom, —$NR_{132}$—, and —$Si(R_{133})_2$— are preferable, an oxygen atom and —$NR_{132}$— are more preferable, and an oxygen atom is particularly preferable. Specific examples include an oxygen atom, a sulfur atom, —$NCH_3$—, —$NC_2H_5$—, —$NC_3H_7$—, —$NC_4H_9$—, —$Si(CH_3)_2$—, —$Si(C_2H_5)_2$—, —$Si(C_3H_7)_2$—, —$Si(C_4H_9)_2$—, and —$Si(C_6H_5)_2$. Among $Y_{101}$ in General Formula (I), an oxygen atom, a sulfur atom, —$NCH_3$—, —$Si(CH_3)_2$—, and —$Si(C_6H_5)_2$— are preferable, an oxygen atom, —$NCH_3$—, and —$Si(CH_3)_2$— are more preferable, an oxygen atom and —$NCH_3$— are more preferable, and an oxygen atom is particularly preferable.

Examples of the alkyl group having 1 to 30 carbon atoms in $R_{102}$ and $R_{103}$ in General Formula (I-1-1) include the same ones as the alkyl groups having 1 to 30 carbon atoms in $R_{105}$ in General Formula (I), and preferable examples are also the same.

Examples of the aryl group having 6 to 14 carbon atoms of the "substituted or unsubstituted aryl group having 6 to 14 carbon atoms" in $R_{102}$ and $R_{103}$ in General Formula (I-1-1) include a phenyl group, a naphthyl group, and an anthracenyl group. Among the aryl groups, a phenyl group is preferable.

The substituted aryl group having 6 to 14 carbon atoms in $R_{102}$ and $R_{103}$ in General Formula (I-1-1) usually has from 1 to 5 substituents, preferably from 1 to 3 substituents, and more preferably one substituent. Examples of the substituent include an alkyl group having 1 to 30 carbon atoms. Examples of the alkyl group having 1 to 30 carbon atoms include the same ones as the alkyl group having 1 to 30 carbon atoms in $R_{105}$ in General Formula (I), and preferable examples are also the same.

Examples of the aryl group having 6 to 14 carbon atoms having a substituent in $R_{102}$ and $R_{103}$ in General Formula (I-1-1) include an aryl group having 6 to 14 carbon atoms and an alkyl group having 1 to 30 carbon atoms. Among the aryl groups, a phenyl group having an alkyl group having 1 to 30 carbon atoms, a naphthyl group and an anthracenyl group are preferable, a phenyl group having an alkyl group with 1 to 12 carbon atoms are more preferable, a phenyl group having an alkyl group having 1 to 6 carbon atoms is even more preferable, and a phenyl group having an alkyl group with 1 to 3 carbon atoms is particularly preferable. Specific examples include
an o-tolyl group (methylphenyl group),
an m-tolyl group, a p-tolyl group, an o-ethylphenyl group, an m-ethylphenyl group, a p-ethylphenyl group, an o-propylphenyl group, an m-propylphenyl group, a p-propylphenyl group, an o-butylphenyl group, an m-butylphenyl group, a p-butylphenyl group, an o-pentylphenyl group, an m-pentylphenyl group, a p-pentylphenyl group, an o-hexylphenyl group, an m-hexylphenyl group, a p-hexylphenyl group, a 2,3-xylyl group (2,3-dimethylphenyl group) group, a 2,4-xylyl group, a 2,5-xylyl group, a 2,6-xylyl group, a 3,4-xylyl group, a 3,5-xylyl group, and a mesityl group (2,4,6-trimethylphenyl group). Among the aryl groups, a p-tolyl group, a p-ethylphenyl group, a p-propylphenyl group, a p-butylphenyl group, a p-pentylphenyl group, a p-hexylphenyl group, a 2,4-xylyl group,
a 2,6-xylyl group, a 3,5-xylyl group, and a mesityl group are preferable, and a p-tolyl group, a p-ethylphenyl group, and a p-propylphenyl group are more preferable. The alkyl group in the above-described specific examples is not limited to a normal-form, and includes all branched forms such as a sec-form, a tert-form, an iso-form, and a neo-form.

In a case where $R_{101}$ and $R_{102}$ in General Formula (I-1-1) together form an alkylene group having 2 to 4 carbon atoms, and in a case where $R_{103}$ and $R_{104}$ together form an alkylene group having 2 to 4 carbon atoms, the alkylene group having 2 to 4 carbon atoms may be linear or branched, and is preferably linear. Specific examples include an ethylene group, a trimethylene group, a propylene group,
a 1,1-dimethylmethylene group, a tetramethylene group,
a 1-methyltrimethylene group, a 2-methyltrimethylene group,
a 1,2-dimethylethylene group, a 1,1-dimethylethylene group, and an ethylethylene group. Among the alkylene groups, an ethylene group, a trimethylene group, and a tetramethylene group are preferable, and a trimethylene group is more preferable.

In General Formula (I-1-1), when $R_{101}$ and $R_{102}$ together form an alkylene group having 2 to 4 carbon atoms, and/or $R_{103}$ and $R_{104}$ together form an alkylene group having 2 to 4 carbon atoms, specific examples of the ring structure represented by General Formula (I-1-1) include ring structures represented by General Formulas (I-1-1-1) to (I-1-1-9) below. Among the ring structures, the ring structure represented by General Formulas (I-1-1-2), (I-1-1-5), or (I-1-1-8) is preferable, and the ring structure represented by General Formula (I-1-1-8) is more preferable:

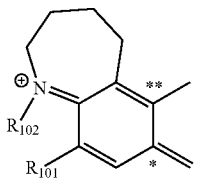
(I-1-1-1)

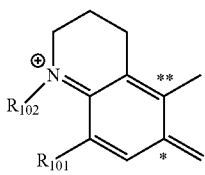
(I-1-1-2)

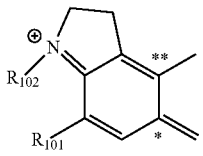
(I-1-1-3)

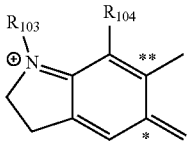
(I-1-1-4)

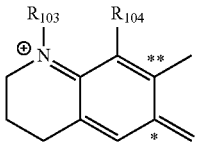
(I-1-1-5)

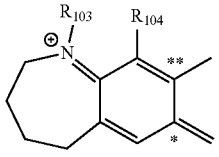
(I-1-1-6)

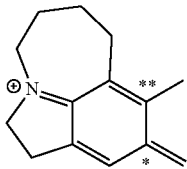
(I-1-1-7)

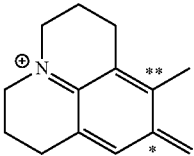
(I-1-1-8)

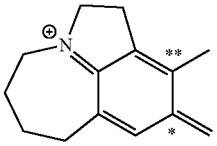
(I-1-1-9)

(where * and ** represent the same positions as * and ** in General Formula (I), and $R_{101}$ to $R_{104}$ are the same as above).

For $R_{101}$ in General Formula (I-1-1), a hydrogen atom, a methyl group, and a group in which $R_{101}$ and $R_{102}$ together form a linear alkylene group having 2 to 4 carbon atoms are preferable. Specific examples include a hydrogen atom, a methyl group, a group in which $R_{101}$ and $R_{102}$ together form an ethylene group, a group in which $R_{101}$ and $R_{102}$ together form a trimethylene group, and a group in which $R_{101}$ and $R_{102}$ together form a tetramethylene group. Among the groups, a hydrogen atom, a methyl group, and a group in which $R_{101}$ and $R_{102}$ together form a trimethylene group are preferable, and a hydrogen atom and a methyl group are more preferable.

For $R_{102}$ in General Formula (I-1-1), an alkyl group having 1 to 12 carbon atoms, a phenyl group which is unsubstituted or has an alkyl group having 1 to 6 carbon atoms, and a group in which $R_{101}$ and $R_{102}$ together form an alkylene group having 2 to 4 carbon atoms are preferable, an alkyl group having 1 to 6 carbon atoms, a phenyl group which is unsubstituted or has an alkyl group having 1 to 3 carbon atoms, and a linear alkylene group having 2 to 4 carbon atoms formed by $R_{101}$ and $R_{102}$ are more preferable, and an alkyl group having 1 to 6 carbon atoms is even more preferable. Specific examples include a methyl group, an ethyl group, a propyl group, a butyl group, a pentyl group, a hexyl group, a phenyl group, a p-tolyl group, a p-ethylphenyl group, a p-propylphenyl, a group in which $R_{101}$ and $R_{102}$ together form an ethylene group, a group in which $R_{101}$ and $R_{102}$ together form a trimethylene group, and a group in which $R_{101}$ and $R_{102}$ together form a tetramethylene group. Among the groups, a methyl group, an ethyl group, a propyl group, a butyl group, a pentyl group, a hexyl group, a phenyl group, a p-tolyl group, and a group in which $R_{101}$ and $R_{102}$ together form a trimethylene group are preferable, and a methyl group and an ethyl group are more preferable. The alkyl group in the above-described specific examples is not limited to a normal-form, and includes all branched forms such as a sec-form, a tert-form, an iso-form, and a neo-form.

For $R_{103}$ in General Formula (I-1-1), a hydrogen atom, an alkyl group having 1 to 12 carbon atoms, a phenyl group which is unsubstituted or has an alkyl group having 1 to 6 carbon atoms, and a group in which $R_{103}$ and $R_{104}$ together form an alkylene group having 2 to 4 carbon atoms are preferable, a hydrogen atom, an alkyl group having 1 to 6 carbon atoms, a phenyl group which is unsubstituted or has an alkyl group having 1 to 3 carbon atoms, and a group in which $R_{103}$ and $R_{104}$ together form a linear alkylene group having 2 to 4 carbon atoms are more preferable, and a hydrogen atom and an alkyl group having 1 to 6 carbon atoms are even more preferable. Specific examples include a hydrogen atom, a methyl group, an ethyl group, a propyl group, a butyl group, a pentyl group, a hexyl group, a phenyl group, a p-tolyl group, a p-ethylphenyl group, a p-propylphenyl group, a group in which $R_{103}$ and $R_{104}$ together form an ethylene group, a group in which $R_{103}$ and $R_{104}$ form a trimethylene group, and a group in which $R_{103}$ and $R_{104}$ together form a tetramethylene group. Among the groups, a hydrogen atom, a methyl group, an ethyl group, a propyl group, a butyl group, a pentyl group, a hexyl group, a phenyl group, a p-tolyl group, and a group in which $R_{103}$ and $R_{104}$ together form a trimethylene group are preferable, and a hydrogen atom, a methyl group, and an ethyl group are more preferable. The alkyl group in the above-described specific examples is not limited to a normal-form, and includes all branched forms such as a sec-form, a tert-form, an iso-form, and a neo-form.

For $R_{104}$ in General Formula (I-1-1), a hydrogen atom, a methyl group, and a group in which $R_{103}$ and $R_{104}$ together form a linear alkylene group having 2 to 4 carbon atoms are preferable. Specific examples include a hydrogen atom, a methyl group, a group in which $R_{103}$ and $R_{104}$ together form an ethylene group, a group in which $R_{103}$ and $R_{104}$ together form a trimethylene group, and a group in which $R_{103}$ and $R_{104}$ together form a tetramethylene group. Among the groups, a hydrogen atom, a group in which $R_{103}$ and $R_{104}$ together form a trimethylene group are preferable, and a hydrogen atom is more preferable.

Examples of the preferable combination of $R_{101}$ to $R_{104}$ in General Formula (I-1-1) include combinations described in the following table.

Examples of the alkyl group having 1 to 30 carbon atoms in $R_{131}$ in General Formulas (I-1-2) to (I-1-7) include the same ones for the alkyl group having 1 to 30 carbon atoms in $R_{105}$ in General Formula (I), and preferable examples are also the same.

For $Ar_1$ in General Formula (I), a ring structure represented by General Formula (I-1-1) is preferable.

The * and ** in General Formula (I) correspond to * and ** in General Formulas (I-1-1) to (I-1-7), respectively, indicating that the ring structure represented by General Formulas (I-1-1) to (I-1-7) binds to the positions indicated by * and ** of the dye residue represented by General Formula (I). Specifically, it is represented by the following structure:

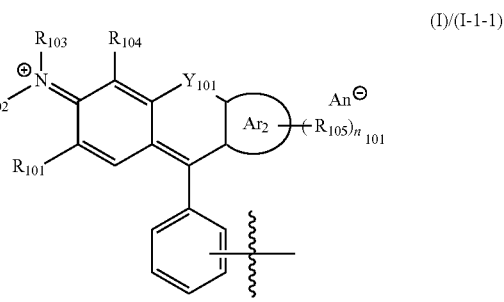

(I)/(I-1-1)

| $R_{101}$ | $R_{102}$ | $R_{103}$ | $R_{104}$ | $R_{101}$ | $R_{102}$ | $R_{103}$ | $R_{104}$ |
|---|---|---|---|---|---|---|---|
| Hydrogen atom | Methyl group | Methyl group | Hydrogen atom | Methyl group | Methyl group | Methyl group | Hydrogen atom |
| Hydrogen atom | Ethyl group | Ethyl group | Hydrogen atom | Methyl group | Ethyl group | Ethyl group | Hydrogen atom |
| Hydrogen atom | Propyl group | Propyl group | Hydrogen atom | Methyl group | Propyl group | Propyl group | Hydrogen atom |
| Hydrogen atom | Butyl group | Butyl group | Hydrogen atom | Methyl group | Butyl group | Butyl group | Hydrogen atom |
| Hydrogen atom | Pentyl group | Pentyl group | Hydrogen atom | Methyl group | Pentyl group | Pentyl group | Hydrogen atom |
| Hydrogen atom | Hexyl group | Hexyl group | Hydrogen atom | Methyl group | Hexyl group | Hexyl group | Hydrogen atom |
| Hydrogen atom | Hydrogen atom | Methyl group | Hydrogen atom | Methyl group | Hydrogen atom | Methyl group | Hydrogen atom |
| Hydrogen atom | Hydrogen atom | Ethyl group | Hydrogen atom | Methyl group | Hydrogen atom | Ethyl group | Hydrogen atom |
| Hydrogen atom | Hydrogen atom | Propyl group | Hydrogen atom | Methyl group | Hydrogen atom | Propyl group | Hydrogen atom |
| Hydrogen atom | Hydrogen atom | Butyl group | Hydrogen atom | Methyl group | Hydrogen atom | Butyl group | Hydrogen atom |
| Hydrogen atom | Hydrogen atom | Pentyl group | Hydrogen atom | Methyl group | Hydrogen atom | Pentyl group | Hydrogen atom |
| Hydrogen atom | Hydrogen atom | Hexyl group | Hydrogen atom | Methyl group | Hydrogen atom | Hexyl group | Hydrogen atom |
| Hydrogen atom | Hydrogen atom | Phenyl group | Hydrogen atom | Methyl group | Hydrogen atom | Phenyl group | Hydrogen atom |
| Hydrogen atom | Hydrogen atom | p-Tolyl group | Hydrogen atom | Methyl group | Hydrogen atom | p-Tolyl group | Hydrogen atom |
| | | Trimethylene group | | | | Trimethylene group | |

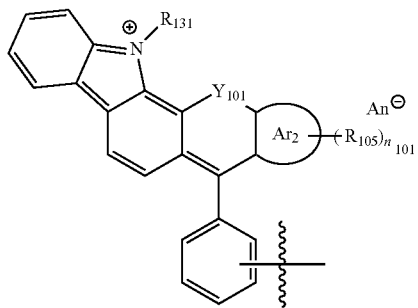

(I)/(I-1-2)

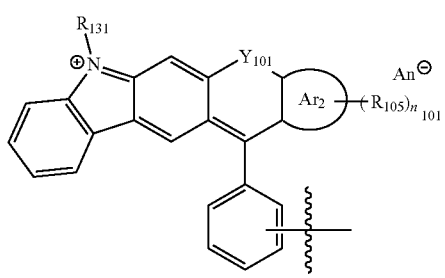

(I)/(I-1-3)

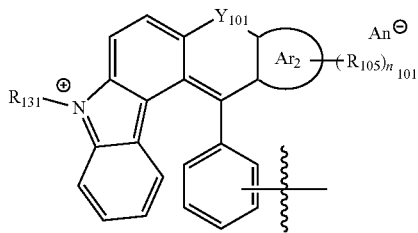

(I)/(I-1-4)

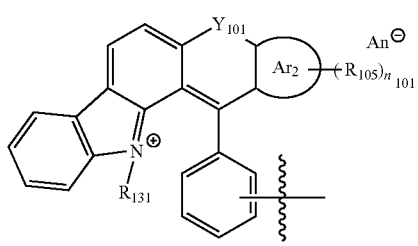

(I)/(I-1-5)

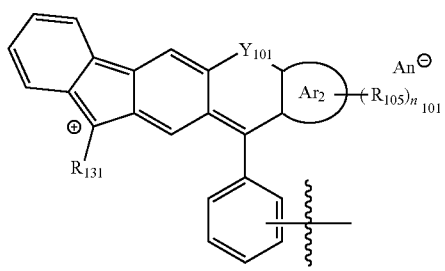

(I)/(I-1-6)

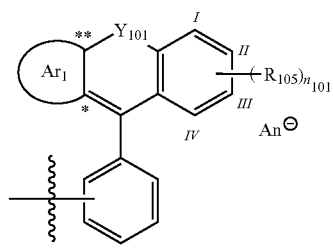

(I)/(I-1-7)

(where $R_{101}$ to $R_{105}$, $R_{131}$, $Y_{101}$, $An^-$, $Ar_2$, and $n_{101}$ are the same as above).

For $Ar_2$ in General Formula (I), a benzene ring and a naphthalene ring are preferable, and more preferably a benzene ring.

For $n_{101}$ in General Formula (I), when $Ar_2$ is a benzene ring, an integer from 0 to 3 is preferable, 1 or 2 is more preferable; when $Ar_2$ is a naphthalene ring and an anthracene ring, 0 or 1 is preferable, and 0 is more preferable.

In General Formula (I), when $Ar_2$ is a benzene ring, General Formula (I) is represented by General Formula (I-2-1) below; when $Ar_2$ is a naphthalene ring, General Formula (I) is represented by General Formulas (I-2-2) to (I-2-4) below; when $Ar_2$ is an anthracene ring, General Formula (I) is represented by General Formulas (I-2-5) to (I-2-7) below. Among the groups represented by General Formula (I), General Formulas (I-2-1), (I-2-2) and (I-2-5) are preferable, and General Formula (I-2-1) is more preferable:

(I-2-1)

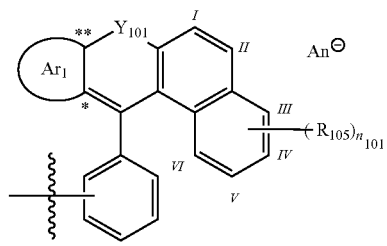

(I-2-2)

-continued

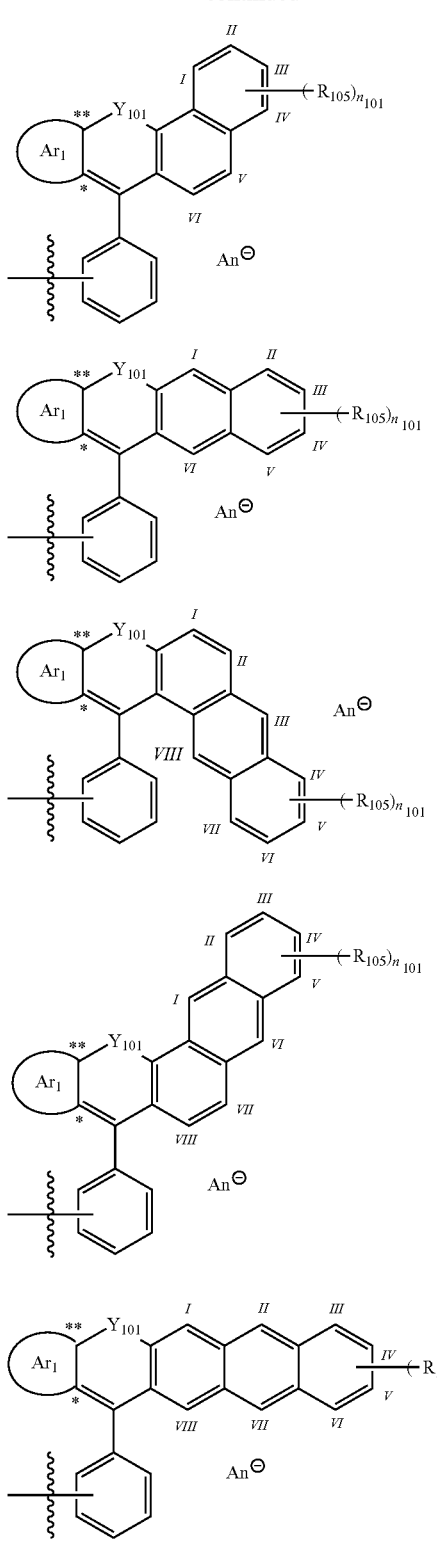

(where I to VIII represent positions that can be substituted with $R_{105}$, * and ** represent bonding positions to the ring structures represented by General Formulas (I-1-1) to (I-1-7), and $R_{105}$, $Y_{101}$, $An^-$, $Ar_1$, and $n_{101}$ are the same as above).

In General Formula (I-2-1), the position of $n_{101}$ of $R_{105}$(s) may be any of the positions I to IV of the benzene ring, and when $n_{101}$ is 1, the position is preferably the position II or III, and more preferably the position II. In a case where $n_{101}$ is 2, the position is preferably the positions II and III or II and IV positions, and more preferably the positions II and III. In a case where $n_{101}$ is 3, the position is preferably the positions I, II, and III or the positions II, III, and IV, and more preferably the positions I, II, and III.

The position of $n_{101}$ of $R_{105}$(s) in General Formula (I-2-2) may be any of the positions I to VI of the naphthalene ring, and is preferably the position IV or VI.

The position of $n_{101}$ of $R_{105}$(s) in General Formula (I-2-3) may be any of the positions I to VI of the naphthalene ring, and is preferably the position III.

The position of $n_{101}$ of $R_{105}$(s) in General Formula (I-2-4) may be any of the positions I to VI of the naphthalene ring, and is preferably the position II or IV.

The position of $n_{101}$ of $R_{105}$(s) in General Formula (I-2-5) may be any of the positions I to VIII of the anthracene ring, and is preferably the position I, V or VI.

The position of $n_{101}$ of $R_{105}$(s) in General Formula (I-2-6) may be any of the positions I to VIII of the anthracene ring, and is preferably the position II, V or VII.

The position of $n_{101}$ of $R_{105}$(s) in General Formula (I-2-7) may be any of the positions I to VIII of the anthracene ring, and is preferably the position IV or V.

In a case where Dye in General Formula (1) is a dye residue represented by General Formula (I), the site to which $A_1$ binds in the dye residue may be located at any of the ortho, meta and para positions of the phenyl group in General Formula (I), is preferably the ortho or para position, and more preferably the ortho position. Specifically, it is preferable that $A_1$ is bonded as indicated by General Formula (I'-1) below: (where * and ** represent bonding positions to the ring structures represented by General Formulas (I-1-1) to (I-1-7), and $R_1$, $R_{105}$, $Y_2$, and $Y_{101}$, $A_1$, $Ar_1$, $Ar_2$, $An^-$, and $n_{101}$ are the same as above).

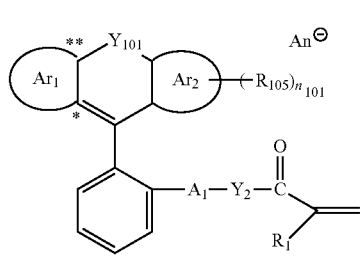

(I'-1)

Preferable specific examples of General Formula (I) include a dye residue represented by General Formula (I-3) below:

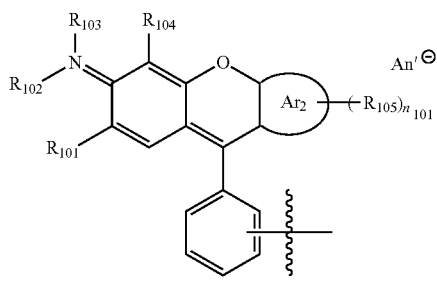

(I-3)

(where An'⁻ represents a halide ion or an anion containing an aryl group having an electron-withdrawing substituent, a sulfonyl group having an electron-withdrawing substituent, a haloalkyl group, or a halogeno group; $R_{101}$ to $R_{105}$, $Ar_2$, and $n_{101}$ are the same as above).

Examples of the halide ion and the anion containing an aryl group having an electron-withdrawing substituent, a sulfonyl group having
an electron-withdrawing substituent, a haloalkyl group, or a halogeno group in An'⁻ in General Formula (I-3) include the same ones as the anions of the anion according to the present invention, and the preferable examples are also the same.

Preferable specific examples of General Formula (I-3) include a dye residue represented by General Formula (I-4) below:

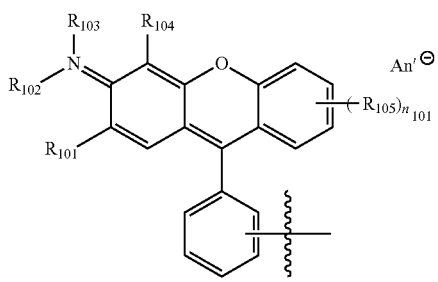

(I-4)

(where $R_{101}$ to $R_{105}$, An'⁻ and $n_{101}$ are the same as above).

Preferable specific examples of General Formula (I-4) include a dye residue represented by General Formula (I-5) below:

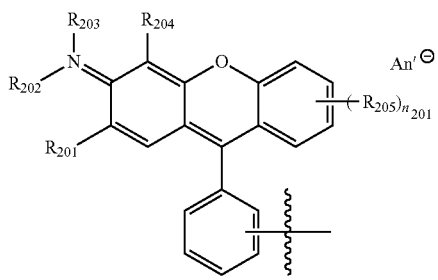

(I-5)

(where $R_{201}$ and $R_{204}$ each independently represent a hydrogen atom or a methyl group, $R_{202}$ represents a phenyl group which is unsubstituted or has an alkyl group having 1 to 12 carbon atoms or an alkyl group having 1 to 6 carbon atoms, $R_{203}$ represents a phenyl group which is unsubstituted or has a hydrogen atom, an alkyl group having 1 to 12 carbon atoms, or an alkyl group having 1 to 6 carbon atoms, $n_{201}$ of $R_{205}$(s) represent a halogeno group; an alkyl group having 1 to 12 carbon atoms; an alkoxy group having 1 to 12 carbon atoms; an alkylthio group having 1 to 12 carbon atoms; an alkyl group having 1 to 30 carbon atoms; an amino group having a haloalkyl group having 1 to 20 carbon atoms, an aryl group having 6 to 10 carbon atoms, or an arylalkyl group having 7 to 13 carbon atoms; a hydroxy group; an aryl group having 6 to 14 carbon atoms; an aryloxy group having 6 to 14 carbon atoms; or an arylalkyl group having 7 to 20 carbon atoms, $n_{201}$ represents an integer from 0 to 4, $R_{201}$ and $R_{202}$ may together form an alkylene group having 2 to 4 carbon atoms, $R_{203}$ and $R_{204}$ may together form an alkylene group having 2 to 4 carbon atoms, and An'⁻ is the same as above)

The alkyl group having 1 to 12 carbon atoms in $R_{202}$ and $R_{203}$ in General Formula (I-5) may be any of linear, branched and cyclic, and particularly preferably linear and branched. Among the alkyl groups having 1 to 12 carbon atoms, the alkyl groups having 1 to 6 carbon atoms are more preferable, the alkyl groups having 1 to 4 carbon atoms are more preferable, and the alkyl groups having 1 to 2 carbon atoms are particularly preferable. Specific examples include a methyl group, an ethyl group, an n-propyl group, an isopropyl group, an n-butyl group, an isobutyl group, a sec-butyl group, a tert-butyl group, a cyclobutyl group, an n-pentyl group, an isopentyl group, a sec-pentyl group, a tert-pentyl group, a neopentyl group, a 2-methylbutyl group, a 1,2-dimethylpropyl group, a 1-ethylpropyl group, a cyclopentyl group, an n-hexyl group, an isohexyl group, a sec-hexyl group, a tert-hexyl group, a neohexyl group, a 2-methylpentyl group, a 1,2-dimethylbutyl group, a 2,3-dimethylbutyl group, a 1-ethylbutyl group, a cyclohexyl group, an n-heptyl group, an isoheptyl group, a sec-heptyl group, a tert-heptyl group, a neoheptyl group, a cycloheptyl group, an n-octyl group, an isooctyl group, a sec-octyl group, a tert-octyl group, a neooctyl group, a 2-ethylhexyl group, a cyclooctyl group, an n-nonyl group, an isononyl group, a sec-nonyl group, a tert-nonyl group, a neononyl group, a cyclononyl group, an n-decyl group, an isodecyl group, a sec-decyl group, a tert-decyl group, a neodecyl group, a cyclodecyl group, an n-undecyl group, a cycloundecyl group, an n-dodecyl group, a cyclododecyl group, a cyclohexylmethyl group, a 1-cyclohexylethyl group, a 2-methylcyclohexyl group, a 3-methylcyclohexyl group, a 4-methylcyclohexyl group, a 2,6-dimethylcyclohexyl group, a 2,4-dimethylcyclohexyl group, a 3,5-dimethylcyclohexyl group, a 2,5-dimethylcyclohexyl group, a 2,3-dimethylcyclohexyl group, a 3,3,5-trimethylcyclohexyl group, a 4-tert-butylcyclohexyl group, a 1-adamantyl group, and 2-adamantyl group. Among the alkyl groups, a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, a 2-methylbutyl group, a 1,2-dimethylpropyl group, a 1-ethylpropyl group, an n-hexyl group, an isohexyl group, a sec-hexyl group, a tert-hexyl group, a neohexyl group, a 2-methylpentyl group, a 1,2-dimethylbutyl group, a 2,3-dimethylbutyl group, a 1-ethylbutyl group, an n-heptyl group, an n-octyl group, an n-nonyl group, an n-decyl group, an n-undecyl group, and an n-dodecyl group are preferable, a methyl group, an ethyl group, an n-propyl group, an isopropyl group, an n-butyl group, an isobutyl group, a sec-butyl group, a tert-butyl group, an n-pentyl group, an isopentyl group, and n-hexyl are more preferable, a methyl group, an ethyl group, an n-propyl group, an isopropyl group, an n-butyl group, an isobutyl group, a sec-butyl group, and a tert-butyl group are more preferable, and a methyl group and an ethyl group are particularly preferable.

The phenyl group having an alkyl group having 1 to 6 carbon atoms in $R_{202}$ and $R_{203}$ of General Formula (I-5) usually has from 1 to 5, preferably from 1 to 3, and more preferably one alkyl group. Examples of the alkyl group include the same alkyl groups having 1 to 6 carbon atoms as $R_{132}$ and $R_{133}$ in $Y_{101}$ in General Formula (I), and preferable examples are also the same.

For the phenyl group having an alkyl group having 1 to 6 carbon atoms in $R_{202}$ and $R_{203}$ in General Formula (I-5), a phenyl group having an alkyl group having 1 to 3 carbon atoms is particularly preferable. Specific examples include an o-tolyl group, an m-tolyl group, a p-tolyl group, an o-ethylphenyl group, an m-ethylphenyl group, a p-ethylphenyl group, an o-propylphenyl group, an m-propylphenyl group, a p-propylphenyl group, an o-butylphenyl group, an m-butylphenyl group, a p-butylphenyl group, an o-pentylphenyl group, an m-pentylphenyl group, a p-pentylphenyl group, an o-hexylphenyl group, an m-hexylphenyl group, a p-hexylphenyl group, a 2,3-xylyl group, a 2,4-xylyl group, a 2,5-xylyl group, a 2,6-xylyl group, a 3,4-xylyl group, a 3,5-xylyl group, and a mesityl group, more preferably a p-tolyl group, a p-ethylphenyl group, a p-propylphenyl group, a p-butylphenyl group, a p-pentylphenyl group, a p-hexylphenyl group, a 2,4-xylyl group, a 2,6-xylyl group, a 3,5-xylyl group, and a mesityl group, and even more preferably a p-tolyl group, a p-ethylphenyl group, and a p-propylphenyl group. The alkyl group in the above-described specific examples is not limited to a normal-form, and includes all branched forms such as a sec-form, a tert-form, an iso-form, and a neo-form.

In a case where $R_{201}$ and $R_{202}$ in General Formula (I-5) together form an alkylene group having 2 to 4 carbon atoms, and $R_{203}$ and $R_{204}$ together form an alkylene group having 2 to 4 carbon atoms, preferable examples of the alkylene group having 2 to 4 carbon atoms includes the same ones as the alkylene group having 2 to 4 carbon atoms in the case where $R_{101}$ and $R_{102}$ in General Formula (I-1-1) form an alkylene group having 2 to 4 carbon atoms, and $R_{103}$ and $R_{104}$ form an alkylene group having 2 to 4 carbon atoms, and preferable examples are also the same.

In General Formula (I-5), specific examples of the case where $R_{201}$ and $R_{202}$ together form an alkylene group having 2 to 4 carbon atoms and/or $R_{203}$ and $R_{204}$ together form an alkylene group having 2 to 4 carbon atoms include General Formulas (I-5-1) to (I-5-9) below. Among the groups represented by General Formula (I-5), General Formula (I-5-2), (I-5-5), or (I-5-8) is preferable, and General Formula (I-5-8) is more preferable:

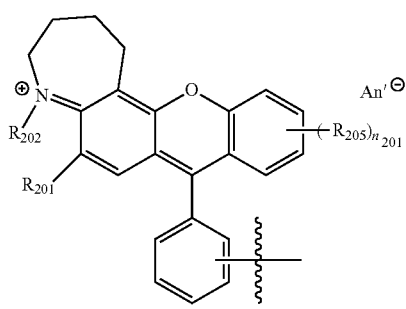
(I-5-1)

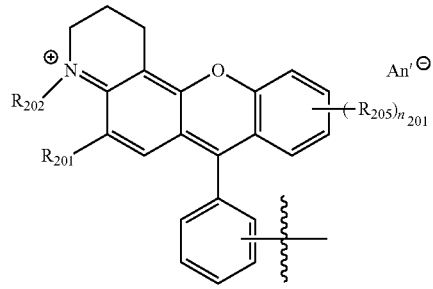
(I-5-2)

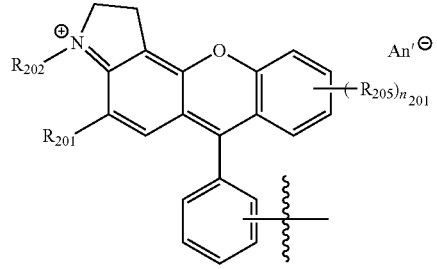
(I-5-3)

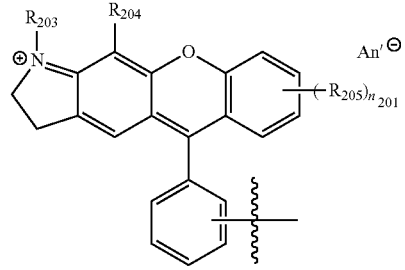
(I-5-4)

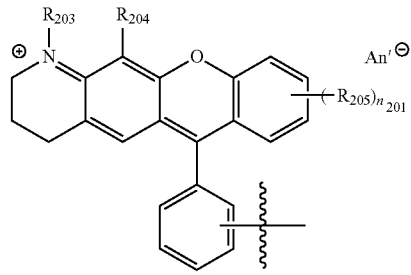
(I-5-5)

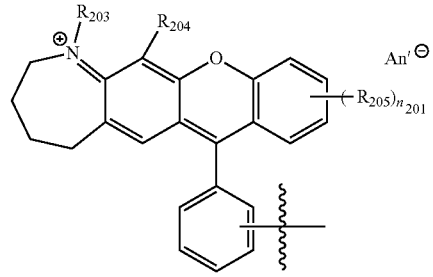
(I-5-6)

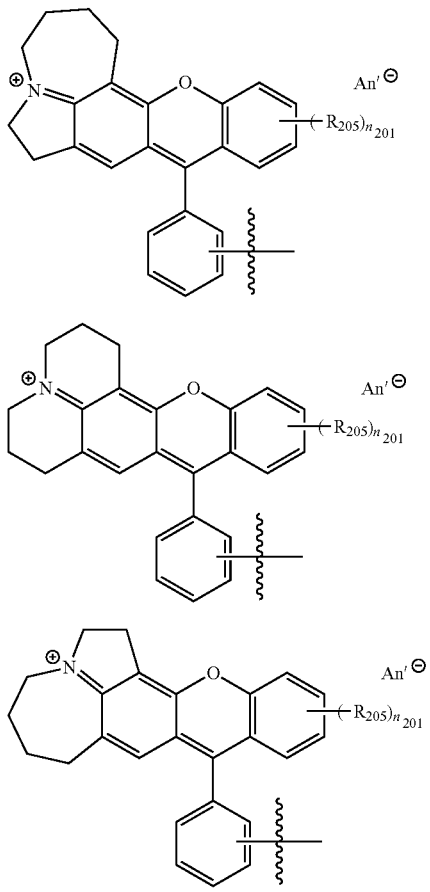

(where $R_{201}$ to $R_{205}$, $An'^-$ and $n_{201}$ are the same as above).

For $R_{201}$ in General Formula (I-5), a hydrogen atom, a methyl group, or a group in which $R_{201}$ and $R_{202}$ form a linear alkylene group having 2 to 4 carbon atoms are preferable. Specific examples include a hydrogen atom, a methyl group, a group in which $R_{21}$ and $R_{202}$ form an ethylene group, a group in which $R_{201}$ and $R_{202}$ form a trimethylene group, a group in which $R_{21}$ and $R_{202}$ form a tetramethylene group, and a group in which $R_{21}$ and $R_{202}$ form a tetramethylene group. hydrogen atoms, methyl groups, and $R_{201}$ and $R_{202}$ together form trimethylene groups are preferable, and hydrogen atoms and methyl groups are more preferable. Among the groups, a hydrogen atom, a methyl group, and a group in which $R_{201}$ and $R_{202}$ together form a trimethylene group are preferable, and a hydrogen atom and a methyl group are more preferable.

For $R_{202}$ in General Formula (I-5), an alkyl group having 1 to 6 carbon atoms, a phenyl group which is unsubstituted or has an alkyl group having 1 to 3 carbon atoms, or a group in which $R_{201}$ and $R_{202}$ together form a linear alkylene group having 2 to 4 carbon atoms are preferable, and an alkyl group having 1 to 6 carbon atoms is more preferable. Specific examples include a methyl group, an ethyl group, a propyl group, a butyl group, a pentyl group, a hexyl group, a phenyl group, a p-tolyl group, a p-ethylphenyl group, a p-propylphenyl group, a group in which $R_{201}$ and $R_{202}$ together form an ethylene group, a group in which $R_{201}$ and $R_{202}$ together form a trimethylene group, and a group in which $R_{201}$ and $R_{202}$ together form a tetramethylene group. Among the groups, a methyl group, an ethyl group, a propyl group, a butyl group, a pentyl group, a hexyl group, a phenyl group, a p-tolyl group, a group in which $R_{201}$ and $R_{202}$ together form a trimethylene group are preferable, and a methyl group and an ethyl group are more preferable. The alkyl group in the above-described specific examples is not limited to a normal-form, and includes all branched forms such as a sec-form, a tert-form, an iso-form, and a neo-form.

For $R_{203}$ in General Formula (I-5), a hydrogen atom, an alkyl group having 1 to 6 carbon atoms, a phenyl group which is unsubstituted or has an alkyl group having 1 to 3 carbon atoms, and a group in which $R_{203}$ and $R_{204}$ form a linear alkylene group having 2 to 4 carbon atoms are preferable, and a hydrogen atom and an alkyl group having 1 to 6 carbon atoms are more preferable. Specific examples include
a hydrogen atom, a methyl group, an ethyl group, propyl group, a butyl group, a pentyl group, a hexyl group, a phenyl group, a p-tolyl group, a p-ethylphenyl group, a p-propylphenyl group, a group in which $R_{203}$ and $R_{204}$ together form an ethylene group, a group in which $R_{203}$ and $R_{204}$ together form a trimethylene group, and a group in which $R_{203}$ and $R_{204}$ together form a tetramethylene group. Among the groups, a hydrogen atom, a methyl group, an ethyl group, a propyl group, a butyl group, a pentyl group, a hexyl group, a phenyl group, a p-tolyl group, and a group in which $R_{203}$ and $R_{204}$ together form a trimethylene group are preferable, and a hydrogen atom, a methyl group, and an ethyl group are more preferable. The alkyl group in the above-described specific examples is not limited to a normal-form, and includes all branched forms such as a sec-form, a tert-form, an iso-form, and a neo-form.

For $R_{204}$ in General Formula (I-5), a hydrogen atom, a methyl group, and a group in which $R_{203}$ and $R_{204}$ together form a linear alkylene group having 2 to 4 carbon atoms are preferable. Specific examples include a hydrogen atom, a methyl group, a group in which $R_{203}$ and $R_{204}$ together form an ethylene group, a group in which $R_{203}$ and $R_{204}$ together form a trimethylene group, and a group in which $R_{203}$ and $R_{204}$ together form a tetramethylene group. Among the groups, a hydrogen atom, a group in which $R_{203}$ and $R_{204}$ together form a trimethylene group is preferable, and a hydrogen atom is more preferable.

Examples of the halogeno group in $R_{205}$ in General Formula (I-5) include a fluoro group, a chloro group, a bromo group, and an iodo group. Among the halogeno groups, a fluoro group is preferable.

Examples of the alkyl group having 1 to 12 carbon atoms in $R_{205}$ in General Formula (I-5) include the same ones as the alkyl groups having 1 to 12 carbon atoms in $R_{202}$ and $R_{203}$ in General Formula (I-5), and preferable examples are also the same.

The alkoxy group having 1 to 12 carbon atoms in $R_{205}$ in General Formula (I-5) may be linear, branched, or cyclic, and is preferably linear or branched. Among the alkoxy groups having 1 to 12 carbon atoms, the alkoxy groups having 1 to 6 carbon atoms are preferable, and the alkoxy groups having 1 to 4 carbon atoms are more preferable. Specific examples include a methoxy group, an ethoxy group, an n-propoxy group, an isopropoxy group, an n-butoxy group, an isobutoxy group, a sec-butoxy group, a tert-butoxy group, a cyclobutoxy group, an n-pentyloxy group, an iso-pentyloxy group, a sec-pentyloxy group, a tert-pentyloxy group, a neopentyloxy group, a 2-methylbutoxy group, a 1,2-dimethylpropoxy group, a 1-ethylpropoxy group, a cyclopentyloxy group, an n-hexyloxy group, an isohexyloxy, a sec-hexyloxy, a tert-hexyloxy, a neohexyloxy, a 2-methylpentyloxy, a 1,2-dimethylbutoxy, a 2,3-dimethylbutoxy, a 1-ethylbutoxy group,
a cyclohexyloxy group, an n-heptyloxy group, an isoheptyloxy group, a sec-heptyloxy group, a tert-heptyloxy group, a neoheptyloxy group, a cycloheptyl group, an n-octyl group, an isooctyl group, a sec-octyloxy group, a tert-octyloxy group, a neooctyloxy group, a 2-ethylhexyloxy group, a cyclooctyloxy group, an n-nonyloxy group, an isononyloxy group, a sec-nonyloxy group, a tert-nonyloxy group, a neononyloxy group,
a cyclononyloxy group, an n-decyloxy group, an isodecyloxy group, a sec-decyloxy group, a tert-decyloxy group, a neodecyloxy group, a cyclodecyloxy group, an n-undecyloxy group, a cycloundecyloxy group, an n-dodecyloxy group, and a cyclododecyloxy group. Among the alkoxy groups,
a methoxy group, an ethoxy group, an n-propoxy group, an isopropoxy group, an n-butoxy group, an isobutoxy group, a sec-butoxy group, a tert-butoxy group, an n-pentyloxy group, an isopentyloxy group, a sec-pentyloxy group, a tert-pentyloxy group, a neopentyloxy group, a 2-methylbutoxy group, a 1,2-dimethylpropoxy group, a 1-ethylpropoxy group,
an n-hexyloxy group, an isohexyloxy group, a sec-hexyloxy group, a tert-hexyloxy group, a neohexyloxy group, a 2-methylpentyloxy group, a 1,2-dimethylbutoxy group, a 2,3-dimethylbutoxy group, and a 1-ethylbutoxy group are preferable, and a methoxy group, an ethoxy group, and an n-propoxy are preferable, an isopropoxy group, an n-butoxy group, an isobutoxy group, a sec-butoxy group, and a tert-butoxy group are more preferable, and a methoxy group and an ethoxy group more preferable.

The alkylthio group having 1 to 12 carbon atoms in $R_{205}$ in General Formula (I-5) may be a linear, branched, or cyclic form, and is preferably a linear or branched form. Among the alkylthio groups having 1 to 12 carbon atoms, the alkylthio groups having 1 to 6 carbon atoms are preferable, and the alkylthio groups having 1 to 4 carbon atoms are more preferable. Specific examples include a methylthio group, an ethylthio group,
an n-propylthio group, an isopropylthio group, an n-butylthio group, an isobutylthio group, a sec-butylthio group, a tert-butylthio group, a cyclobutylthio group, an n-pentylthio group, an iso-pentylthio group, a sec-pentylthio group, a tert-pentylthio group, a neopentylthio group, a 2-methylbutylthio group, a 1,2-dimethylpropylthio group,
a 1-ethylpropylthio group, a cyclopentylthio group, an n-hexylthio group, an isohexylthio group, a sec-hexylthio group, a tert-hexylthio group, a neohexylthio group, a 2-methylpentylthio group, a 1,2-dimethylbutylthio group, a 2,3-dimethylbutylthio group, a 1-ethylbutylthio group, a cyclohexylthio group, an n-heptylthio group, an isoheptylthio group, a sec-heptylthio group, a tert-heptylthio group, a neoheptylthio group, a cycloheptylthio group, an n-octylthio group, an isooctylthio group, a sec-octylthio group, a tert-octylthio group, a neooctylthio group, a 2-ethylhexylthio group, a cyclooctylthio group, an n-nonylthio group, an isononylthio group, a sec-nonylthio group,
a tert-nonylthio group, a neononylthio group, a cyclononylthio group, an n-decylthio group, an isodecylthio group, a sec-decylthio group,
a tert-decylthio group, a neodecylthio group, a cycloalkyldecylthio group, an n-undecylthio group, a cycloundecylthio group, an n-dodecylthio group, and a cyclododecylthio group. Among the alkylthio groups,
a methylthio group, an ethylthio group, an n-propylthio group, an isopropylthio group, an n-butylthio group, an isobutylthio group, a sec-butylthio group, a tert-butylthio group, an n-pentylthio group, an isopentylthio group, a sec-pentylthio group, a tert-pentylthio group, a neopentylthio group, a 2-methylbutylthio group,
a 1,2-dimethylpropylthio group, a 1-ethylpropylthio group, an n-hexylthio group, an isohexylthio group, a sec-hexylthio group, a tert-hexylthio group, a neohexylthio group, a 2-methylpentylthio group, a 1,2-dimethylbutylthio group, a 2,3-dimethylbutylthio group, and
a 1-ethylbutylthio group are preferable, a methylthio group, an ethylthio group, an n-propylthio group, an isopropylthio group, an n-butylthio group, an isobutylthio group, a sec-butylthio group, and a tert-butylthio are more preferable, and a methylthio group and
an ethylthio group are more preferable.

Specific examples of the alkyl group having 1 to 30 carbon atoms, a haloalkyl group having 1 to 20 carbon atoms, an aryl group having 6 to 10 carbon atoms, or an arylalkyl group having 7 to 13 carbon atoms in the "amino group having an alkyl group having 1 to 30 carbon atoms, a haloalkyl group having 1 to 20 carbon atoms, an aryl group having 6 to 10 carbon atoms, or an arylalkyl group having 7 to 13 carbon atoms" in $R_{205}$ in General Formula (I-5) include the same ones as the "amino group having a substituent" in $R_{105}$ in General Formula (I), and preferable examples are also the same.

In $R_{205}$ in General Formula (I-5), as the "amino group having an alkyl group having 1 to 30 carbon atoms, a haloalkyl group having 1 to 20 carbon atoms, an aryl group having 6 to 10 carbon atoms, or an arylalkyl group having 7 to 13 carbon atoms", an amino group having an alkyl group having 1 to 12 carbon atoms, a phenyl group, or a phenylalkyl group having 7 to 9 carbon atoms is preferable, and an amino group having an alkyl group having 1 to 6 carbon atoms is more preferable. Specific examples include a methylamino group,
an ethylamino group, an n-propylamino group, an isopropylamino group, an n-butylamino group, an isobutylamino group, a sec-butylamino group, a tert-butylamino group, an n-pentylamino group, an isopentylamino group, an n-hexylamino group, a phenylamino group, a benzylamino group, a phenethylamino group, a hydrocinnamylamino group, a dimethylamino group, a diethylamino group, a di-n-propylamino group, a diisopropylamino group, a di-n-butylamino group, a diisobutylamino group, a di-sec-butylamino group, a di-tert-butylamino group,
a di-n-pentylamino group, a diisopentylamino group, a di-n-hexylamino group, a diphenylamino group, a dibenzylamino group, a diphenethylamino group, and a bis(hydrocinnamyl) amino group. Among the amino groups, a methylamino group, an ethylamino group, an n-propylamino group, an isopropylamino group, an n-butylamino group, an isobutylamino group, a sec-butylamino group, a tert-butylamino group, a phenylamino group, a benzylamino group, a dimethylamino group, a diethylamino group, a di-n-propylamino group, a diisopropylamino group, a di-n-butylamino group, a diisobutylamino group, a di-sec-butylamino group, a di-tert-butylamino group, a diphenylamino group, and a benzylamino group are preferable, a methylamino group, an ethylamino group, a phenylamino group, a benzylamino group, a dimethylamino group, a diethylamino group, a diphenylamino group, and a dibenzylamino group are more preferable, and a methylamino group, an ethylamino group, a dimethylamino group, and a diethylamino group are even more preferable.

Specific examples of the aryl group having 6 to 14 carbon atoms, the aryloxy group having 6 to 14 carbon atoms, and the arylalkyl group having 7 to 20 carbon atoms of $R_{205}$ in General Formula (I-5) include the same ones as groups in $R_{105}$ in General Formula (I), and preferable examples are also the same.

For $R_{205}$ in General Formula (I-5), a halogeno group; an alkyl group having 1 to 12 carbon atoms; an alkoxy group having 1 to 12 carbon atoms; an alkylthio group having 1 to 12 carbon atoms; an amino group having an alkyl group having 1 to 12 carbon atoms, a phenyl group, or a phenylalkyl group having 7 to 9 carbon atoms; a hydroxy group; a phenyl group; a phenoxy group; and a phenylalkyl group having 7 to 12 carbon atoms are preferable, a halogeno group; an alkyl group having 1 to 6 carbon atoms; an alkoxy group having 1 to 6 carbon atoms; an alkylthio group having 1 to 6 carbon atoms; an amino group having an alkyl group having 1 to 12 carbon atoms, a phenyl group, or a phenylalkyl group having 7 to 9 carbon atoms; a hydroxy group; a phenyl group; a phenoxy group; and a phenylalkyl group having 7 to 9 carbon atoms are more preferable; and an alkyl group having 1 to 4 carbon atoms and an amino group having an alkyl group having 1 to 6 carbon atoms are even more preferable. Specifically, a fluorine atom, a methyl group, an ethyl group, an n-propyl group, an isopropyl group, an n-butyl group, an isobutyl group,
a sec-butyl group, a tert-butyl group, an n-pentyl group, an isopentyl group, an n-hexyl group, a methoxy group, an ethoxy group, an n-propoxy group, an isopropoxy group, an n-butoxy group, an isobutoxy group,
a sec-butoxy group, a tert-butoxy group, a methylthio group, an ethylthio group, an n-propylthio group, an isopropylthio group, an n-butylthio group, an isobutylthio group, a sec-butylthio group, a tert-butylthio group, a methylamino group, an ethylamino group, an n-propylamino group, an isopropylamino group, an n-butylamino group, an isobutylamino group, a sec-butylamino group, a tert-butylamino group, a phenylamino group, a benzylamino group, a dimethylamino group, a diethylamino group,
a di-n-propylamino group, a diisopropylamino group, a di-n-butylamino group, a diisobutylamino group, a di-sec-butylamino group,
a di-tert-butylamino group, a diphenylamino group, a dibenzylamino group, a hydroxy group, a phenyl group, a phenoxy group, a benzyl group,
a phenethyl group, a 1-phenylethyl group, a hydrocinnamyl group, a 2-phenylpropyl, a 1-phenylpropyl, and a cumyl group are preferable, a fluorine atom, a methyl group, an ethyl group, an n-propyl group,
an isopropyl group, an n-butyl group, an isobutyl group, a sec-butyl group, a tert-butyl group, a methoxy group, an ethoxy group, a methylthio group, an ethylthio group, a methylamino group, an ethylamino group, a phenylamino group, a benzylamino group, a dimethylamino group,
a diethylamino group, a diphenylamino group, a dibenzylamino group, a hydroxy group, a phenyl group, a phenoxy group, a benzyl group, a phenethyl group, a hydrocinnamyl group, and a cumyl group are more preferable, a methyl group, an ethyl group, a methylamino group,
an ethylamino group, a dimethylamino group, and a diethylamino group are even more preferable, and a methyl group, an ethylamino group, and a diethylamino group are particularly preferable.

For $n_{201}$ in General Formula (I-5), an integer from 0 to 3 is preferable, and 1 or 2 is more preferable.

The position of $n_{201}$ of $R_{205}$ (s) in General Formula (I-5) may be any of the positions I to IV of the benzene ring in General Formula (I-6) below, and when $n_{201}$ is 1, the position is preferably the position II or the position III, and more preferably the position II. In a case where $n_{201}$ is 2, the position is preferably the positions II and III, and II and IV, and more preferably the positions II and III. In a case where $n_{201}$ is 3, the position is preferably the positions I, II and III, or the positions II, III and IV, and more preferably the positions I, II and III:

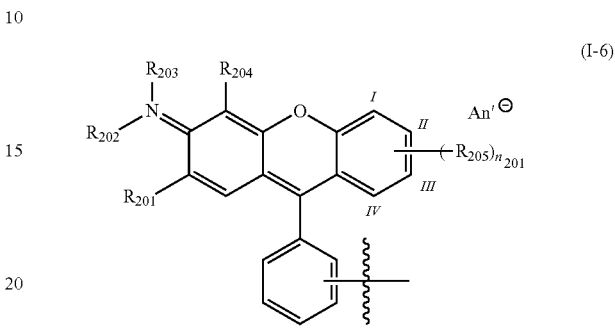

(where I to IV represent positions where $R_{205}$ can substitute, and $R_{201}$ to $R_{205}$, $An'^-$ and $n_{201}$ are the same as above).

Preferable specific examples of General Formula (I-5) include a dye residue represented by General Formula (II) below:

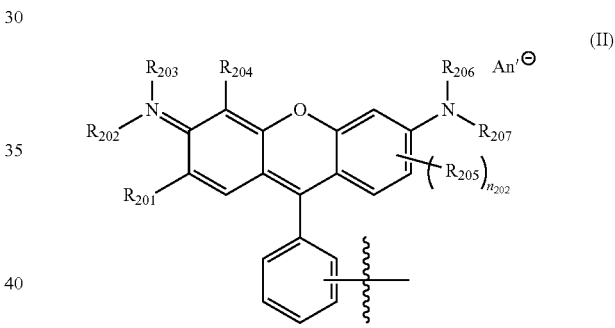

(where $R_{206}$ represents an alkyl group having 1 to 12 carbon atoms, a phenyl group or a phenylalkyl group having 7 to 9 carbon atoms, and $R_{207}$ represents a hydrogen atom, an alkyl group having 1 to 12 carbon atoms, a phenyl group, or a phenylalkyl group having 7 to 9 carbon atoms, $n_{202}$ represents an integer from 0 to 3, and $R_{201}$ to $R_{205}$ and $An'^-$ are the same as above)

Examples of the alkyl group having 1 to 12 carbon atoms for $R_{206}$ and $R_{207}$ in General Formula (II) are the same as the alkyl groups having 1 to 12 carbon atoms for $R_{202}$ and $R_{203}$ in General Formula (I-5), and preferable examples are also the same.

Examples of the phenylalkyl group having 7 to 9 carbon atoms in $R_{206}$ and $R_{207}$ in General Formula (II) include a benzyl group, a phenethyl group, a 1-phenylethyl group, a hydrocinnamyl group, a 2-phenylpropyl group, a 1-phenylpropyl group, and a cumyl group. Among the phenylalkyl groups, a benzyl group, a phenethyl group, a hydrocinnamyl group, and a cumyl group are preferable.

For $R_{206}$ in General Formula (II), an alkyl group having 1 to 6 carbon atoms, a phenyl group, and a phenylalkyl group having 7 to 9 carbon atoms are preferable, and an alkyl group having 1 to 6 carbon atoms is more preferable. Specific examples include a methyl group, an ethyl group, a propyl group, a butyl group, a pentyl group, a hexyl group, a phenyl group, a benzyl group, a phenethyl group, a hydrocinnamyl group, and a cumyl group. Among the groups, a methyl group, an ethyl group, a propyl group, a butyl group, a pentyl group, and a hexyl group are preferable, a methyl group, an ethyl group, a propyl group, and a butyl group are more preferable, and a methyl group and an ethyl group are particularly preferable. The alkyl group in the above-described specific examples is not limited to the normal-form, but includes all of the branched forms such as sec-form, tert-form, iso-form, and neo-form.

For $R_{207}$ in General Formula (II), a hydrogen atom, an alkyl group having 1 to 6 carbon atoms, a phenyl group and a phenylalkyl group having 7 to 9 carbon atoms are preferable, and a hydrogen atom and an alkyl group having 1 to 6 carbon atoms are more preferable. Specific examples include a hydrogen atom, a methyl group, an ethyl group, a propyl group, a butyl group, a pentyl group, a hexyl group, a phenyl group, a benzyl group, a phenethyl group, a hydrocinnamyl group, and a cumyl group. Among the groups, a hydrogen atom, a methyl group, an ethyl group, a propyl group, a butyl group, a pentyl group, and a hexyl group are preferable, and a hydrogen atom, a methyl group, an ethyl group, a propyl group, and a butyl group are more preferable, and a hydrogen atom, a methyl group, and an ethyl group are particularly preferable. The alkyl group in the above-described specific examples is not limited to the normal-form, but include all of the branched forms such as sec-form, tert-form, iso-form, and neo-form.

Further, $R_{203}$ and $R_{206}$ in General Formula (II) are preferably the same, and $R_{202}$ and $R_{207}$ in General Formula (II) are preferably the same.

For $n_{202}$ in General Formula (II), 0 or 1 is preferable.

The position of $n_{202}$ of $R_{205}$(s) in General Formula (II) may be any one of the position I, III, or IV of the benzene ring in General Formula (II-1) below. In a case where $n_{202}$ is 1, the position is preferably the position IV, and more preferably the position III. In a case where $n_{202}$ is 2, the position is preferably the positions I and III, or the positions III and IV, and more preferably the positions I and III:

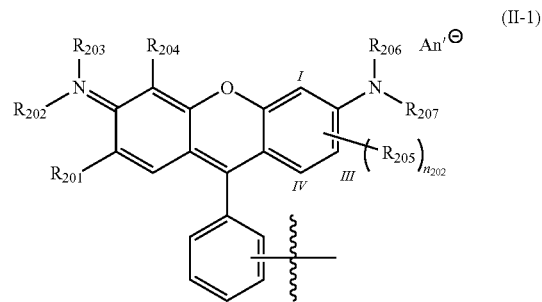

(II-1)

(where I, III and IV represent the positions where $R_{205}$ can substitute, and $R_{201}$ to $R_{207}$, $An'^{-}$ and $n_{202}$ are the same as above).

Preferable combinations of $R_{201}$ to $R_{207}$ and $n_{202}$ in General Formula (II) include, for example, combinations described in the following table:

| $R_{201}$ | $R_{202}/R_{207}$ | $R_{203}/R_{206}$ | $R_{204}$ | $R_{205}$ | $n_{202}$ |
|---|---|---|---|---|---|
| Hydrogen atom | Methyl group | Methyl group | Hydrogen atom | none | 0 |
| | Ethyl group | Ethyl group | | | |
| | Propyl group | Propyl group | | | |
| | Butyl group | Butyl group | | | |
| | Pentyl group | Pentyl group | | | |
| | Hexyl group | Hexyl group | | | |
| | Hydrogen atom | Methyl group | | | |
| | Hydrogen atom | Ethyl group | | | |
| | Hydrogen atom | Propyl group | | | |
| | Hydrogen atom | Butyl group | | | |
| | Hydrogen atom | Pentyl group | | | |
| | Hydrogen atom | Hexyl group | | | |
| | Hydrogen atom | Phenyl group | | | |
| | Hydrogen atom | p-Tolyl group | | | |
| Methyl group | Methyl group | Methyl group | Hydrogen atom | Methyl group | 1 |
| | Ethyl group | Ethyl group | | | |
| | Propyl group | Propyl group | | | |
| | Butyl group | Butyl group | | | |
| | Pentyl group | Pentyl group | | | |
| | Hexyl group | Hexyl group | | | |
| | Hydrogen atom | Methyl group | | | |
| | Hydrogen atom | Ethyl group | | | |
| | Hydrogen atom | Propyl group | | | |
| | Hydrogen atom | Butyl group | | | |
| | Hydrogen atom | Pentyl group | | | |
| | Hydrogen atom | Hexyl group | | | |
| | Hydrogen atom | Phenyl group | | | |
| | Hydrogen atom | p-Tolyl group | | | |

| $R_{201}$ | $R_{202}$ | $R_{203}$ | $R_{204}$ | $R_{207}$ | $R_{206}$ | $R_{205}$ | $n_{202}$ |
|---|---|---|---|---|---|---|---|
| Trimethylene group | Trimethylene group | | | Methyl group | Methyl group | none | 0 |
| | | | | Ethyl group | Ethyl group | | |
| | | | | Propyl group | Propyl group | | |
| | | | | Butyl group | Butyl group | | |
| | | | | Pentyl group | Pentyl group | | |
| | | | | Hexyl group | Hexyl group | | |
| | | | | Hydrogen atom | Methyl group | | |
| | | | | Hydrogen atom | Ethyl group | | |

-continued

| | | | | |
|---|---|---|---|---|
| | | Hydrogen atom | Propyl group | |
| | | Hydrogen atom | Butyl group | |
| | | Hydrogen atom | Pentyl group | |
| | | Hydrogen atom | Hexyl group | |
| | | Hydrogen atom | Phenyl group | |
| | | Hydrogen atom | p-Tolyl group | |
| Trimethylene group | Trimethylene group | Methyl group | Methyl group | methyl group 1 |
| | | Ethyl group | Ethyl group | |
| | | Propyl group | Propyl group | |
| | | Butyl group | Butyl group | |
| | | Pentyl group | Pentyl group | |
| | | Hexyl group | Hexyl group | |
| | | Hydrogen atom | Methyl group | |
| | | Hydrogen atom | Ethyl group | |
| | | Hydrogen atom | Propyl group | |
| | | Hydrogen atom | Butyl group | |
| | | Hydrogen atom | Pentyl group | |
| | | Hydrogen atom | Hexyl group | |
| | | Hydrogen atom | Phenyl group | |
| | | Hydrogen atom | p-Tolyl group | |

Examples of $An'^{-}$ used in combination with the combinations described in the above table include the followings. Among the anions, a chloride ion, a tetrakis (pentafluorophenyl)boron (IV) anion, a bis(trifluoromethanesulfonyl)imide anion, and $PF_6^-$ are preferable:

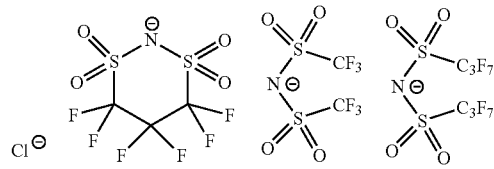

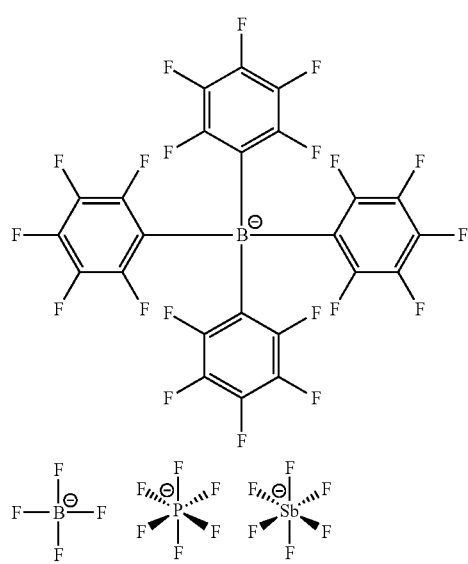

[Dye residue represented by General Formula (III)]

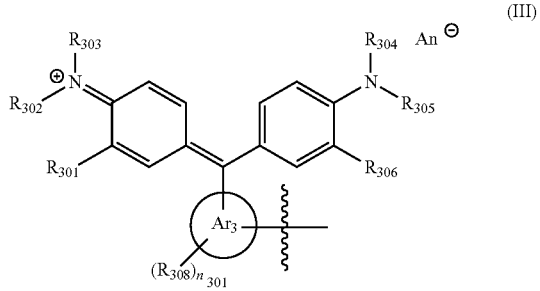

(where $R_{301}$ to $R_{306}$, $R_{308}$, $Ar_3$, $An^-$, and $n_{301}$ are the same as above).

For $R_{301}$ and $R_{306}$ in General Formula (III), a hydrogen atom is preferable, and $R_{301}$ and $R_{306}$ are preferably the same.

Examples of the alkyl group having 1 to 30 carbon atoms in $R_{302}$ to $R_{305}$ and $R_{308}$ in General Formula (III) include the same ones as the alkyl group having 1 to 30 carbon atoms in $R_{105}$ in General Formula (I), and preferable examples are also the same.

Examples of the unsubstituted aryl group having 6 to 14 carbon atoms in $R_{302}$ to $R_{305}$ in General Formula (III) include a phenyl group, a naphthyl group, and an anthracenyl group. Among the unsubstituted aryl groups, a phenyl group is preferable.

Examples of the aryl group having 6 to 14 carbon atoms having a substituent in $R_{302}$ to $R_{305}$ in General Formula (III) includes the same ones as the aryl group having 6 to 14 carbon atoms having a substituent in $R_{102}$ to $R_{103}$ in General Formula (I-1-1), and the preferable examples are also the same.

For $R_{302}$ to $R_{305}$ in General Formula (III), a hydrogen atom and an alkyl group having 1 to 30 carbon atoms are preferable, a hydrogen atom and an alkyl group having 1 to 12 carbon atoms are more preferable, and an alkyl group having 1 to 6 carbon atoms is particularly preferable. Specifically, a hydrogen atom, a methyl group, an ethyl group, an n-propyl group, an isopropyl group, an n-butyl group, an isobutyl group, a sec-butyl group, a tert-butyl group, an n-pentyl group, and an n-hexyl group are preferable, a methyl group, an ethyl group, an n-propyl group, an isopropyl group, an n-butyl group, an isobutyl group, a sec-butyl group and a tert-butyl group are more preferable, and a methyl group and an ethyl group are particularly preferable. In addition, $R_{302}$ and $R_{305}$ in General Formula (III) are preferably the same, and $R_{303}$ and $R_{304}$ in General Formula (III) are preferably the same.

Examples of the alkoxy group having 1 to 6 carbon atoms in $R_{308}$ in General Formula (III) includes a methoxy group, an ethoxy group, an n-propoxy group, an isopropoxy group, an n-butoxy group, an isobutoxy group, a sec-butoxy group, a tert-butoxy group, an n-pentyloxy group, and an n-hexyloxy group. Among the alkoxy groups, an ethoxy group, an ethoxy group, an n-propoxy group, an isopropoxy group, an n-butoxy group, an isobutoxy group, a sec-butoxy group, and a tert-butoxy group are preferable, and a methoxy group, an ethoxy group, an n-propoxy group and an n-butoxy group are more preferable.

Examples of the halogeno group in $R_{308}$ in General Formula (III) include a fluoro group, a chloro group, a bromo group, and an iodo group.

For $R_{308}$ in General Formula (III), an alkoxy group having 1 to 6 carbon atoms, a halogeno group, a hydroxy group, a nitro group and a sulfo group are preferable, and an alkoxy group having 1 to 4 carbon atoms, a halogeno group, a hydroxy group, a nitro group, and a sulfo group are more preferable. Specifically, for example, a methoxy group, an ethoxy group, an n-propoxy group, an isopropoxy group, an n-butoxy group, an isobutoxy group, a sec-butoxy group, a tert-butoxy group, a fluoro group, a chloro group, a bromo group, an iodine group, a hydroxy group, a nitro group, and a sulfo group are preferable, and a methoxy group, an ethoxy group, a fluoro group, a hydroxy group, a nitro group, and a sulfo group are more preferable.

In General Formula (III), in a case where $Ar_3$ is a benzene ring, General Formula (III) is represented by General Formula (III-1-1) below. In a case where $Ar_3$ is a naphthalene ring, General Formula (III) is represented by General Formula (III-1-2) below:

(III-1-1)

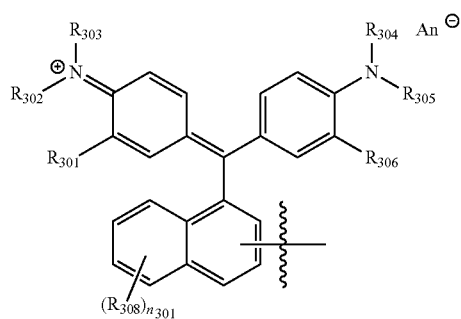

(III-1-2)

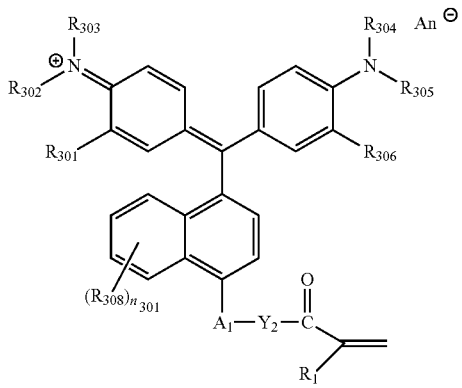

(where $R_{301}$ to $R_{306}$, $R_{308}$, $An^-$, and $n_{301}$ are the same as above).

For $n_{301}$ in General Formula (III), from 0 to 1 is preferable, and 0 is more preferable.

In a case where Dye of General Formula (1) is a dye residue represented by General Formula (III), the site to which $A_1$ binds in the dye residue when $Ar_3$ of General Formula (III) is a benzene ring may be located at any of the ortho, meta and para positions, and is preferably the para position. When $Ar_3$ in General Formula (III) is a naphthalene ring, the site to which $A_1$ is bonded may be located at any of positions 2 to 8, and is preferably at position 4. Specifically, when $Ar_3$ in General Formula (III) is a benzene ring, it is preferable that $A_1$ is bonded as shown in General Formula (III'-1-1) below. When $Ar_3$ in General Formula (III) is a naphthalene ring, it is preferable that $A_1$ is bonded as shown by General Formula (III'-2-1) below:

(III'-1-1)

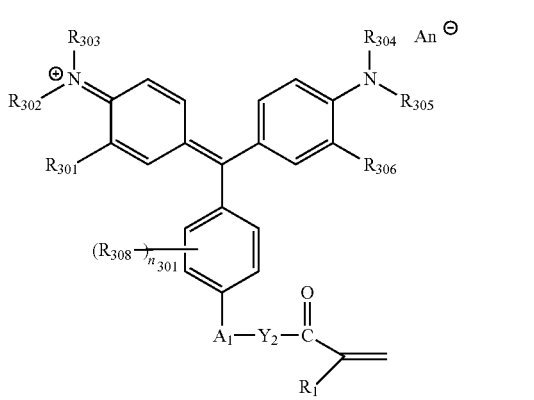

(where $R_1$, $R_{301}$ to $R_{306}$, $R_{308}$, $Y_2$, $A_1$, $An^-$, and $n_{301}$ are the same as above).

(III'-2-1)

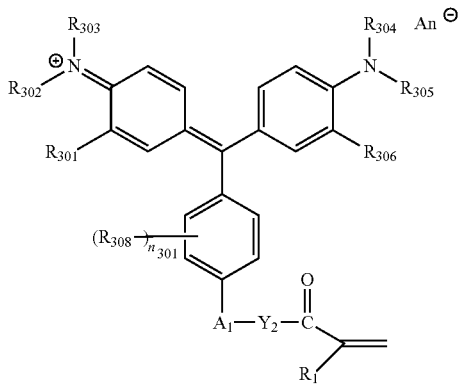

(where $R_1$, $R_{301}$ to $R_{306}$, $R_{308}$, $Y_2$, $A_1$, $An^-$, and $n_{301}$ are the same as above).

Preferable combinations of $R_{301}$ to $R_{306}$, $R_{308}$, $Ar_3$ and $n_{301}$ in General Formula (III) include, for example, combinations described in the following table:

| $R_{301}/R_{306}$ | $R_{302}/R_{305}$ | $R_{303}/R_{304}$ | $R_{308}$ | $n_{301}$ | $Ar_3$ |
|---|---|---|---|---|---|
| Hydrogen atom | Methyl group | Methyl group | none | 0 | Benzene ring or Naphthalene ring |
| Hydrogen atom | Methyl group | Ethyl group | | | |
| Hydrogen atom | Ethyl group | Methyl group | | | |
| Hydrogen atom | Ethyl group | Ethyl group | | | |
| Methyl group | Methyl group | Methyl group | | | |
| Methyl group | Methyl group | Ethyl group | | | |
| Methyl group | Ethyl group | Methyl group | | | |
| Methyl group | Ethyl group | Ethyl group | | | |
| Hydrogen atom | Methyl group | Methyl group | Methoxy group | 1 | |
| Hydrogen atom | Methyl group | Ethyl group | Ethoxy group | | |
| Hydrogen atom | Ethyl group | Methyl group | Fluoro group | | |
| Hydrogen atom | Ethyl group | Ethyl group | Hydoroxyl group | | |
| Methyl group | Methyl group | Methyl group | Nitro group | | |
| Methyl group | Methyl group | Ethyl group | or | | |
| Methyl group | Ethyl group | Methyl group | Sulfonyl group | | |
| Methyl group | Ethyl group | Ethyl group | | | |

Examples of An⁻ used in combination with the combination described in the above-described table include the followings, and preferably a chloride ion, a tetrakis(pentafluorophenyl) boron (IV) anion, a bis(trifluoromethanesulfonyl)imide anion, and $PF_6^-$:

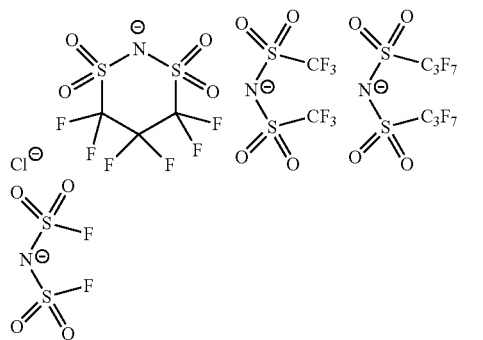

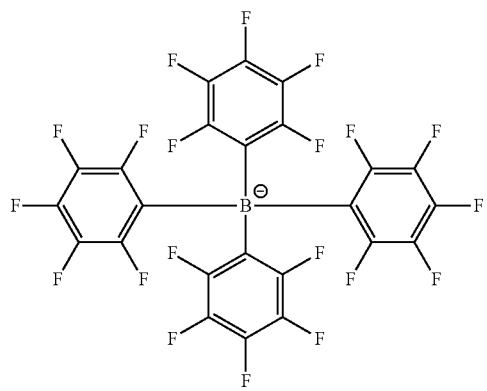

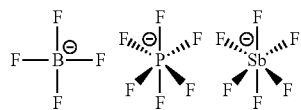

[Dye Residue Represented by General Formula (IV)]

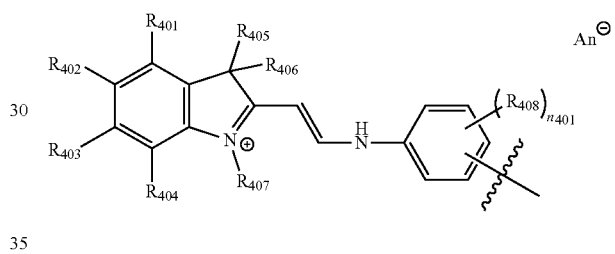

(IV)

(where $R_{401}$ to $R_{408}$, An⁻, and $n_{401}$ are the same as above)

Examples of the alkyl group having 1 to 6 carbon atoms in $R_{401}$ to $R_{406}$ and $R_{408}$ in General Formula (IV) include the same ones as the alkyl group having 1 to 6 carbon atoms in $R_{132}$ and $R_{133}$ in $Y_{101}$ in General Formula (I), and preferable examples are also the same.

Examples of the alkoxy group having 1 to 6 carbon atoms in $R_{401}$ to $R_{404}$ and $R_{408}$ in General Formula (IV) include the same ones as the alkoxy group having 1 to 6 carbon atoms in $R_{308}$ in General Formula (III), and preferable examples are also the same.

Examples of the alkyloxycarbonyl group having 2 to 4 carbon atoms in $R_{401}$ to $R_{404}$ and $R_{408}$ in General Formula (IV) include a methoxycarbonyl group, an ethoxycarbonyl group, an n-propoxycarbonyl group, and an isopropoxycarbonyl group.

Examples of the alkylcarbonyloxy groups having 2 to 4 carbon atoms in $R_{401}$ to $R_{404}$ and $R_{408}$ in General Formula (IV) include a methylcarbonyloxy group, an ethylcarbonyloxy group, an n-propylcarbonyloxy group, and an isopropylcarbonyloxy group.

Examples of the halogeno group in $R_{401}$ to $R_{404}$ and $R_{408}$ in General Formula (IV) include a fluoro group, a chloro group, a bromo group, and an iodo group.

For $R_{401}$ to $R_{404}$ in General Formula (IV), a hydrogen atom and an alkyl group having 1 to 6 carbon atoms are preferable, and a hydrogen atom is more preferable.

For $R_{408}$ in General Formula (IV), an alkyl group having 1 to 6 carbon atoms and an alkoxy group having 1 to 6 carbon atoms are preferable, an alkoxy group having 1 to 6 carbon atoms is more preferable, and an alkoxy group having 1 to 4 carbon atoms is particularly preferable. Specifically, for example, a methoxy group, an ethoxy group, an n-propoxy group, an isopropoxy group, an n-butoxy group, an isobutoxy group, a sec-butoxy group, and a tert-butoxy group are preferable, and a methoxy group and an ethoxy group are more preferable.

Examples of the phenylalkyl group having 7 to 9 carbon atoms for "a phenylalkyl group having 7 to 9 carbon atoms which is unsubstituted or has an alkyl group having 1 to 6 carbon atoms, a nitro group, a halogeno group, or a cyano group" in $R_{405}$ and $R_{406}$ in General Formula (IV) include a benzyl group, a phenethyl group, and a 3-phenylpropyl group.

The phenylalkyl group having 7 to 9 carbon atoms which has the alkyl group having 1 to 6 carbon atoms, the nitro group, the halogeno group, or the cyano group in $R_{405}$ and $R_{406}$ in General Formula (IV) has 1 to 5 of any one or more of substituents on the benzene ring of the phenylalkyl group, preferably has 1 to 3 of any one of substituents, and more preferably has one of substituents. In addition, the position of the substituent may be any of the ortho, meta and para positions, and the para position is preferable.

Examples of the he alkyl group having 1 to 6 carbon atoms in the "phenylalkyl group having 7 to 9 carbon atoms which is unsubstituted or has an alkyl group having 1 to 6 carbon atoms, a nitro group, a halogeno group, or a cyano group" in $R_{405}$ and $R_{406}$ of General Formula (IV) include the same ones as the alkyl group having 1 to 6 carbon atoms in $R_{132}$ and $R_{133}$ in $Y_{101}$ in General Formula (I), and preferable examples are also the same.

Examples of the halogeno group of "the phenylalkyl group having 7 to 9 carbon atom which is unsubstituted or has an alkyl group having 1 to 6 carbon atoms, a nitro group, a halogeno group, or a cyano group" in $R_{405}$ and $R_{406}$ in General Formula (IV) include a fluoro group, a chloro group, a bromo group, and an iodo group.

Specific examples of the phenylalkyl group having 7 to 9 carbon atoms which has an alkyl group having 1 to 6 carbon atoms, a nitro group, a halogeno group, or a cyano group in $R_{405}$ and $R_{406}$ in General Formula (IV) include a methylbenzyl group, a methylphenethyl group,
a 3-(methylphenyl)propyl group, an ethylbenzyl group, an ethylphenethyl group, a 3-(ethylphenyl)propyl group, an n-propylbenzyl group,
an n-propylphenethyl group, a 3-(n-propylphenyl)propyl group, an isopropylbenzyl group, an isopropylphenethyl group, a 3-(isopropylphenyl)propyl group, an n-butylbenzyl group, an n-butylphenethyl group, a 3-(n-butylphenyl)propyl group, an isobutylbenzyl group, an isobutylphenethyl group, a 3-(isobutylphenyl)propyl group, a sec-butylbenzyl group, a sec-butylphenethyl group, a 3-(sec-butylphenyl) propyl group, a tert-butylbenzyl group, a tert-butylphenethyl group, a 3-(tert-butyphenyl)propyl group, an n-pentylbenzyl group, an n-pentylphenethyl group, a 3-(n-pentylphenyl) propyl group, an n-hexylbenzyl group, an n-hexylphenethyl group, a 3-(n-hexylphenyl)propyl group, a fluorobenzyl group, a fluorophenethyl group, a 3-(fluorophenyl)propyl group, a chlorobenzyl group, a chlorophenethyl group, a 3-(chlorophenyl)propyl group,
a bromobenzyl group, a bromophenethyl group, a 3-(bromophenyl)propyl group, an iodobenzyl group, an iodophenethyl group,
a 3-(iodophenyl)propyl group, a nitrobenzyl group, a nitrophenethyl group, a 3-(nitrophenyl)propyl group, a cyanobenzyl group,
a cyanophenethyl group, and a 3-(cyanophenyl)propyl group. The above-described specific examples include all ortho-forms, meta-forms and para-forms.

For the phenylalkyl group having 7 to 9 carbon atoms which is unsubstituted or has an alkyl group having 1 to 6 carbon atoms, a nitro group, a halogeno group, or a cyano group in $R_{405}$ and $R_{406}$ in General Formula (IV), an unsubstituted phenylalkyl group having 7 to 9 carbon atoms is preferable.

Examples of the naphthylalkyl group having 11 to 13 carbon atoms for $R_{405}$ and $R_{406}$ in General Formula (IV) include a 1-naphthylmethyl group, a 2-naphthylmethyl group, a 2-(1-naphthyl) ethyl group,
a 2-(2-naphthyl))ethyl group, a 3-(1-naphthyl)propyl group, and a 3-(2-naphthyl)ethyl group.

For $R_{405}$ and $R_{406}$ in General Formula (IV), a hydrogen atom and an alkyl group having 1 to 6 carbon atoms are preferable, an alkyl group having 1 to 6 carbon atoms is more preferable, and an alkyl group having 1 to 4 carbon atoms is particularly preferable. Specifically, for example, a methyl group, an ethyl group, an n-propyl group, an isopropyl group, an n-butyl group, an isobutyl group,
a sec-butyl group, and a tert-butyl group are preferable, and a methyl group and an ethyl group are more preferable.

Examples of the alkyl group having 1 to 6 carbon atoms of the "alkyl group having 1 to 6 carbon atoms which is unsubstituted of has an alkoxy group having 1 to 6 carbon atoms, an alkyloxycarbonyl group having 2 to 4 carbon atoms, a hydroxy group, a carboxy group, a halogeno group, a cyano group, or an amino group" in $R_{407}$ of General Formula (IV) include the same ones as the alkyl group having 1 to 6 carbon atoms in $R_{132}$ and $R_{133}$ in $Y_{101}$ in General Formula (I), and preferable examples are also the same.

The alkyl group having 1 to 6 carbon atoms having an alkoxy group having 1 to 6 carbon atoms, an alkyloxycarbonyl group having 2 to 4 carbon atoms, a hydroxy group, a carboxy group, a halogeno group, a cyano group, or an amino group in $R_{407}$ in General Formula (IV) has one or more of any one or more substituents, and preferably has one of any one of the substituents on the alkyl group.

Examples of the phenylalkyl group having 7 to 9 carbon atoms of "a phenylalkyl group 7 to 9 carbon atoms which is unsubstituted or has an alkoxy group having 1 to 6 carbon atoms, a halogeno group, or an amino group" in $R_{407}$ in General Formula (IV) include a benzyl group, a phenethyl group, and a 3-phenylpropyl group Examples of the phenylalkyl group having 7 to 9 carbon atoms which has an alkoxy group having 1 to 6 carbon atoms, a halogeno group, or an amino group in $R_{407}$ of General Formula (IV) has from 1 to 5 of any one or more of substituents, preferably has from 1 to 3 of any one of substituents, and more preferably has one of any one of substituents on the benzene ring of the phenylalkyl group. In addition, the position of the substituent may be any of the ortho, meta, and para positions, and is preferably in the para position.

Examples of the alkoxy group having 1 to 6 carbon atoms in the "alkyl group having 1 to 6 carbon atoms which is unsubstituted or has an alkoxy group having 1 to 6 carbon atoms, an alkyloxycarbonyl group having 2 to 4 carbon atoms, a hydroxy group, a carboxy group, a halogeno group, a cyano group, or an amino group" or the "phenylalkyl group having 7 to 9 carbon atoms which is unsubstituted or has an alkoxy group having 1 to 6 carbon atoms, a halogeno group, or an amino group" in $R_{407}$ in General Formula (IV) include the same ones as the alkoxy group having 1 to 6 carbon atoms in $R_{308}$ in General Formula (III), and preferable examples are also the same.

Examples of the alkyloxycarbonyl group having 2 to 4 carbon atoms in the "alkyl group having 1 to 6 carbon atoms which is unsubstituted or has an alkoxy group having 1 to 6 carbon atoms, an alkyloxycarbonyl group having 2 to 4 carbon atoms, a hydroxy group, a carboxy group, a halogeno group, a cyano group, or an amino group" in $R_{407}$ in General Formula (IV) include a methoxycarbonyl group, an ethoxycarbonyl group, an n-propoxycarbonyl group, and an isopropoxycarbonyl group.

Examples of the halogeno group in the "alkyl group having 1 to 6 carbon atoms which is unsubstituted or has an alkoxy group having 1 to 6 carbon atoms, an alkyloxycarbonyl group having 2 to 4 carbon atoms, a hydroxy group, a carboxy group, a halogeno group, a cyano group, or an amino group" or the "phenylalkyl group having 7 to 9 carbon atoms which is unsubstituted or has an alkoxy group, a halogeno group, or an amino group having 1 to 6 carbon atoms" in $R_{407}$ in General Formula (IV) include a fluoro group, a chloro group, a bromo group, and an iodo group.

Specific examples of the alkyl group having 1 to 6 carbon atoms having an alkoxy group having 1 to 6 carbon atoms, an alkyloxycarbonyl group having 2 to 4 carbon atoms, a hydroxy group, a carboxy group, a halogeno group, a cyano group, or an amino group in $R_{407}$ in General Formula (IV) include a methoxymethyl group,
a methoxyethyl group, a 3-methoxy-n-propyl group, a 4-methoxy-n-butyl group, an ethoxymethyl group, an ethoxyethyl group, a 3-ethoxy-n-propyl group, a 4-ethoxy-n-butyl group, an n-propoxymethyl group,
an n-propoxyethyl group, a 3-n-propoxy-n-propyl group, a 4-n-propoxy-n-butyl group, an n-butoxymethyl group, an n-butoxyethyl group, a 3-n-butoxy-n-propyl group, a 4-n-butoxy-n-butyl group,
a methoxycarbonylmethyl group, a methoxycarbonylethyl group, a 3-methoxycarbonyl-n-propyl group, a 4-methoxycarbonyl-n-butyl group, an ethoxycarbonylmethyl group, an ethoxycarbonylethyl group, a 3-ethoxycarbonyl-n-propyl group, a 4-ethoxycarbonyl-n-butyl group, an n-propoxycarbonylmethyl group, an n-propoxycarbonylethyl group,
a 3-n-propoxycarbonyl-n-propyl group, a 4-n-propoxycarbonyl-n-butyl group, an isopropoxycarbonylmethyl group, an isopropoxycarbonylethyl group, a 3-isopropoxycarbonyl-n-propyl group,
a 4-isopropoxycarbonyl-n-butyl group, a hydroxymethyl group, a hydroxyethyl group, a 3-hydroxy-n-propyl group, a 4-hydroxy-n-butyl group, a carboxymethyl group, a carboxyethyl group, a 3-carboxy-n-propyl group, a 4-carboxy-n-butyl group, a fluoromethyl group, a fluoroethyl group, a 3-fluoro-n-propyl group, a 4-fluoro-n-butyl group,
a chloromethyl group, a chloroethyl group, a 3-chloro-n-propyl group, a 4-chloro-n-butyl group, a bromomethyl group, a bromoethyl group,
a 3-bromo-n-propyl group, a 4-bromo-n-butyl group, an iodomethyl group, an iodoethyl group, a 3-iodo-n-propyl group, a 4-iodo-n-butyl group, a cyanomethyl group, a cyanoethyl group, a 3-cyano-n-propyl group,
a 4-cyano-n-butyl group, an aminomethyl group, an aminoethyl group, a 3-amino-n-propyl group, and a 4-amino-n-butyl group.

Examples of the alkyl group having 1 to 6 carbon atoms which is unsubstituted or has an alkoxy group having 1 to 6 carbon atoms, an alkyloxycarbonyl group having 2 to 4 carbon atoms, a hydroxy group, a carboxy group, a halogeno group, a cyano group, or an amino group in $R_{407}$ in General Formula (IV) is preferably an unsubstituted alkyl group having 1 to 6 carbon atoms.

Specific examples of the phenylalkyl group having 7 to 9 carbon atoms which has an alkoxy group having 1 to 6 carbon atoms, a halogeno group, or an amino group in $R_{407}$ in General Formula (IV) include
a methoxybenzyl group, a methoxyphenethyl group, a 3-(methoxyphenyl) propyl group, an ethoxybenzyl group, an ethoxyphenethyl group,
a 3-(ethoxyphenyl)propyl group, an n-propoxybenzyl group, an n-propoxyphenethyl group, a 3-(n-propoxyphenyl)propyl group, an isopropoxybenzyl group, an isopropoxyphenethyl group, a 3-(isopropoxyphenyl)propyl group, an n-butoxybenzyl group, an n-butoxyphenethyl group, a 3-(n-butoxyphenyl)propyl group, an isobutoxybenzyl group, an isobutoxyphenethyl group, a 3-(isobutoxyphenyl)propyl group, a sec-butoxybenzyl group, a sec-butoxyphenethyl group, a 3-(sec-butoxyphenyl)propyl group, a tert-butoxybenzyl group, a tert-butoxy phenethyl group, a 3-(tert-butoxyphenyl)propyl, an n-pentyloxy benzyl group, an n-pentyloxyphenethyl group, a 3-(n-pentyloxyphenyl)propyl group, an n-hexyloxybenzyl group, an n-hexyloxyphenethyl group, a 3-(n-hexyloxyphenyl)propyl group, a fluorobenzyl group, a fluorobenzyl group, a phenethyl group, a 3-(fluorophenyl) propyl group, a chlorobenzyl group, a chlorophenethyl group, a 3-(chlorophenyl)propyl group, a bromobenzyl group, a bromophenethyl group,
a 3-(bromophenyl)propyl group, an iodobenzyl group, an iodophenethyl group, a 3-(iodophenyl)propyl group, an aminobenzyl group,
an aminophenethyl group, and a 3-(aminophenyl)propyl group. The above-described specific examples include all of the ortho-forms, meta-forms and para-forms.

For a phenylalkyl group having 7 to 9 carbon atoms which is unsubstituted or has an alkoxy group having 1 to 6 carbon atoms, a halogeno group or an amino group in $R_{407}$ in General Formula (IV), an unsubstituted phenylalkyl group having 7 to 9 carbon atoms is preferable.

Examples of the naphthylalkyl group having 11 to 13 carbon atoms for $R_{407}$ in General Formula (IV) are the same as the naphthylalkyl groups having 11 to 13 carbon atoms in $R_{405}$ and $R_{406}$ in General Formula (IV), and preferable examples are also the same.

For $R_{407}$ in General Formula (IV), an alkyl group having 1 to 6 carbon atoms which is unsubstituted or has an alkoxy group having 1 to 6 carbon atoms, an alkyloxycarbonyl group having 2 to 4 carbon atoms, a hydroxy group, a carboxy group, a halogeno group, a cyano group, or an amino group is preferable, an unsubstituted alkyl group having 1 to 6 carbon atoms is more preferable, and an unsubstituted alkyl group having 1 to 4 carbon atoms is particularly preferable. Specifically, for example, a methyl group, an ethyl group, an n-propyl group, an isopropyl group, an n-butyl group, an isobutyl group,
a sec-butyl group, and a tert-butyl group are preferable, and a methyl group and an ethyl group are more preferable.

For $n_{401}$ in General Formula (IV), 0 to 2 are preferable, and 0 is more preferable.

In a case where Dye in General Formula (1) is a dye residue represented by General Formula (IV), the site to which $A_1$ binds in the dye residue may be located at any of the ortho, meta and para positions of the phenyl group in General Formula (IV), preferably at the ortho and para positions, and more preferably at the para position. Specifically, $A_1$ is preferably bonded as shown in General Formulas (IV'-1) or (IV'-2) below, and $A_1$ is more preferably bonded as shown in General Formula (IV'-1):

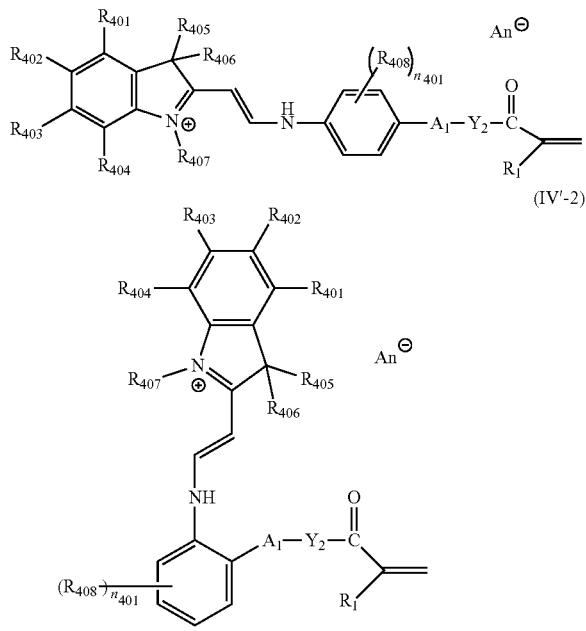

(where $R_1$, $R_{401}$ to $R_{408}$, $Y_2$, $A_1$, $An^-$, and $n_{401}$ are the same as above).

Preferable specific examples of General Formula (IV) include a dye residue represented by General Formula (V) below:

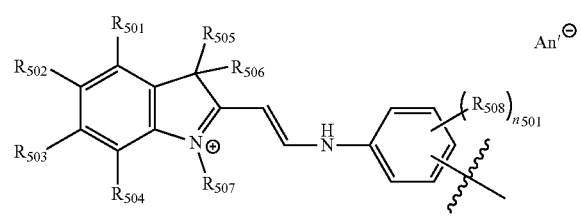

(where $An'^-$ is the same as above, $R_{501}$ to $R_{506}$ each independently represent a hydrogen atom or an alkyl group having 1 to 6 carbon atoms, $R_{507}$ represents an alkyl group having 1 to 6 carbon atoms which is unsubstituted or has an alkoxy group having 1 to 6 carbon atoms, an alkyloxycarbonyl group having 2 to 4 carbon atoms, a hydroxy group, a carboxy group, a halogeno group, a cyano group, or an amino group, $n_{501}$ of $R_{508}$(s) each independently represent an alkyl group having 1 to 6 carbon atoms or an alkoxy group having 1 to 6 carbon atoms, and $n_{501}$ represents an integer from 0 to 2).

Examples of the alkyl group having 1 to 6 carbon atoms in $R_{501}$ to $R_{506}$ and $R_{505}$ in General Formula (V); the alkyl group having 1 to 6 carbon atoms which is unsubstituted or has an alkoxy group having 1 to 6 carbon atoms, an alkyloxycarbonyl group having 2 to 4 carbon atoms, a hydroxy group, a carboxy group, a halogeno group, a cyano group, or an amino group in $R_{507}$; and the alkoxy group having 1 to 6 carbon atoms in $R_{508}$ include the same ones as groups in $R_{401}$ to $R_{408}$ in General Formula (IV), and preferable examples are also the same.

For $R_{501}$ to $R_{504}$ in General Formula (V), a hydrogen atom is preferable.

For $R_{505}$ and $R_{506}$ in General Formula (V), an alkyl group having 1 to 6 carbon atoms is preferable, and an alkyl group having 1 to 4 carbon atoms is more preferable. Specifically, for example, a methyl group, an ethyl group, an n-propyl group, an isopropyl group, an n-butyl group, an isobutyl group, a sec-butyl group, and a tert-butyl group are preferable, and a methyl group and an ethyl group are more preferable. Furthermore, $R_{505}$ and $R_{506}$ in General Formula (V) are preferably the same.

For $R_{507}$ in General Formula (V), an unsubstituted alkyl group having 1 to 6 carbon atoms is preferable, and an unsubstituted alkyl group having 1 to 4 carbon atoms is more preferable. Specifically, a methyl group, an ethyl group, an n-propyl group, an isopropyl group, an n-butyl group, an isobutyl group, a sec-butyl group, and a tert-butyl group are preferable, and a methyl group and an ethyl group are more preferable.

For $R_{508}$ in General Formula (V), an alkoxy group having 1 to 6 carbon atoms is preferable, and an alkoxy group having 1 to 4 carbon atoms is more preferable. Specifically, for example, a methoxy group, an ethoxy group, an n-propoxy group, an isopropoxy group, an n-butoxy group, an isobutoxy group, a sec-butoxy group, and a tert-butoxy group are preferable, and a methoxy group and an ethoxy group are more preferable.

For $n_{501}$ in General Formula (V), 0 is preferable.

Examples of the preferable combinations of $R_{501}$ to $R_{508}$ and $n_{501}$ in General Formula (V) include combinations described in the following table:

| $R_{501}$ to $R_{504}$ | $R_{505}$ | $R_{506}$ | $R_{507}$ | ($n_{501}$ of) $R_{508}$ | $n_{501}$ |
|---|---|---|---|---|---|
| Hydrogen atom | Methyl group | Methyl group | Methyl group | none | 0 |
| | Methyl group | Methyl group | Methyl group | Methoxy group or Ethoxy group | 1 |
| | Methyl group | Methyl group | Methyl group | Methoxy group or Ethoxy group | 2 |
| | Methyl group | Methyl group | Ethyl group | none | 0 |
| | Methyl group | Methyl group | Ethyl group | Methoxy group or Ethoxy group | 1 |
| | Methyl group | Methyl group | Ethyl group | Methoxy group or Ethoxy group | 2 |
| | Ethyl group | Ethyl group | Methyl group | none | 0 |
| | Ethyl group | Ethyl group | Methyl group | Methoxy group or Ethoxy group | 1 |
| | Ethyl group | Ethyl group | Methyl group | Methoxy group or Ethoxy group | 2 |
| | Ethyl group | Ethyl group | Ethyl group | none | 0 |

| $R_{501}$ to $R_{504}$ | $R_{505}$ | $R_{506}$ | $R_{507}$ | ($n_{501}$ of) $R_{508}$ | $n_{501}$ |
|---|---|---|---|---|---|
| | Ethyl group | Ethyl group | Ethyl group | Methoxy group or Ethoxy group | 1 |
| | Ethyl group | Ethyl group | Ethyl group | Methoxy group or Ethoxy group | 2 |

Examples of An⁻ used in combination with the combinations described in the above-described table include the following. Among anions, a chloride ion, a tetrakis(pentafluorophenyl)boron (IV) anion, a bis(trifluoromethanesulfonyl)imide anion, and $PF_6^-$ are preferable:

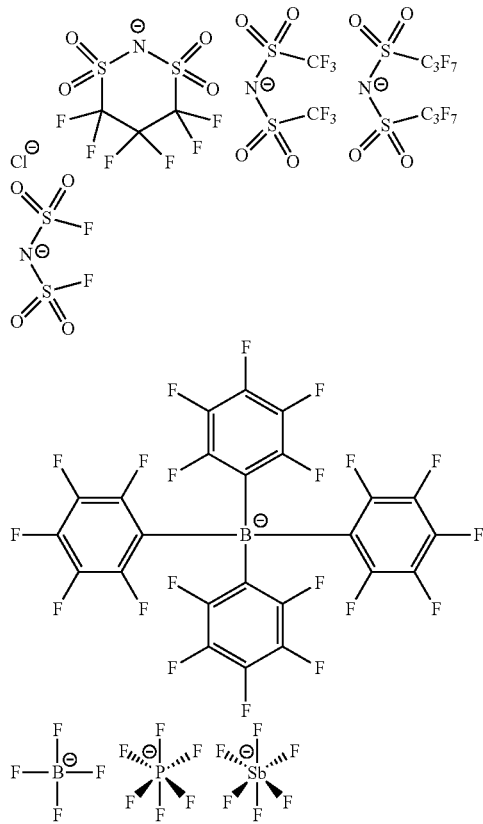

[Dye Residue Represented by General Formula (VI)]

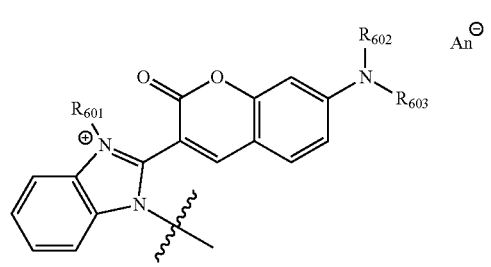

(VI)

(where $R_{601}$ to $R_{603}$ and An⁻ are the same as above).

Examples of the alkyl group having 1 to 6 carbon atoms in $R_{601}$ in General Formula (VI) are the same as the alkyl groups having 1 to 6 carbon atoms in $R_{132}$ and $R_{133}$ in $Y_{101}$ in General Formula (I), and preferable examples are also the same.

Examples of the alkyl group having 1 to 30 carbon atoms in $R_{602}$ and $R_{603}$ in General Formula (VI) are the same as the alkyl group having 1 to 30 carbon atoms in $R_{105}$ in General Formula (I), and preferable examples are also the same.

Examples of the preferable combination of $R_{601}$ to $R_{603}$ in General Formula (VI) include combinations described in the following table:

| $R_{601}$ | $R_{602}$ | $R_{603}$ | $R_{601}$ | $R_{602}$ | $R_{603}$ |
|---|---|---|---|---|---|
| Methyl group | Methyl group | Methyl group | Ethyl group | Methyl group | Methyl group |
| Methyl group | Ethyl group | Ethyl group | Ethyl group | Ethyl group | Ethyl group |
| Methyl group | n-Propyl group | n-Propyl group | Ethyl group | n-Propyl group | n-Propyl group |
| Methyl group | Isopropyl group | Isopropyl group | Ethyl group | Isopropyl group | Isopropyl group |
| Methyl group | n-Butyl group | n-Butyl group | Ethyl group | n-Butyl group | n-Butyl group |
| Methyl group | Isobutyl group | Isobutyl group | Ethyl group | Isobutyl group | Isobutyl group |
| Methyl group | sec-Butyl group | sec-Butyl group | Ethyl group | sec-Butyl group | sec-Butyl group |
| Methyl group | tert-Butyl group | tert-Butyl group | Ethyl group | tert-Butyl group | tert-Butyl group |
| Methyl group | n-Pentyl group | n-Pentyl group | Ethyl group | n-Pentyl group | n-Pentyl group |
| Methyl group | Isopentyl group | Isopentyl group | Ethyl group | Isopentyl group | Isopentyl group |
| Methyl group | n-Hexyl group | n-Hexyl group | Ethyl group | n-Hexyl group | n-Hexyl group |

Further, examples of An⁻ used in combination with the combinations described in the above-described table include the following. Among anions, a chloride ion, a tetrakis(pentafluorophenyl)boron (IV) anion, a bis(trifluoromethanesulfonyl)imide anion, and $PF_6^-$ are preferable:

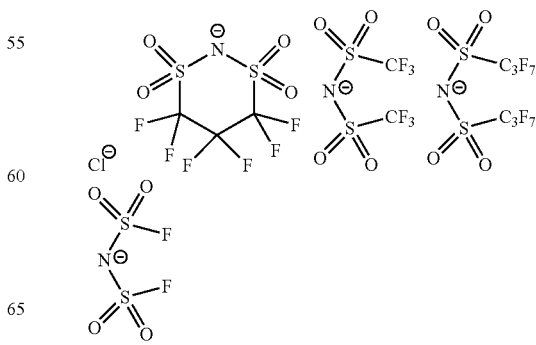

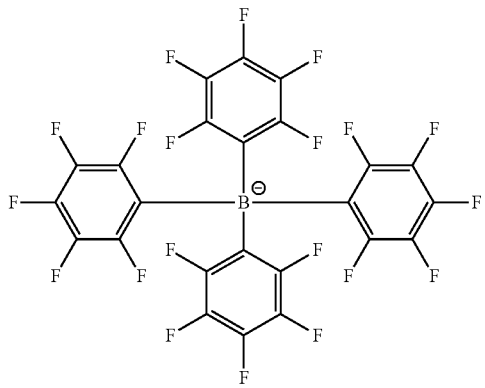

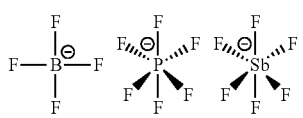

[Dye Residue Represented by General Formula (VII)]

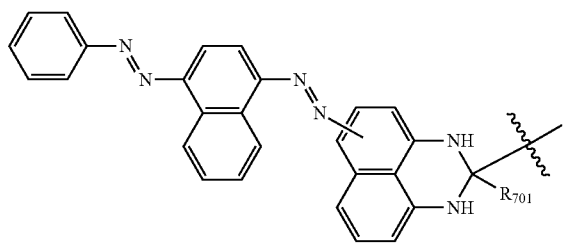

(VII)

(where $R_{701}$ is the same as above).

Examples of the alkyl group having 1 to 30 carbon atoms in $R_{701}$ in General Formula (VII) are the same as the alkyl group having 1 to 30 carbon atoms in $R_{105}$ in General Formula (I), and preferable examples are also the same.

In General Formula (VII), the position where the azo group is bonded may be any of the positions 4 to 9 of the 2,3-dihydroperimidine ring, and the positions 4 and 6 are preferable. Specifically, the azo is preferably bonded as shown in General Formula (VII-1) or (VII-2) below:

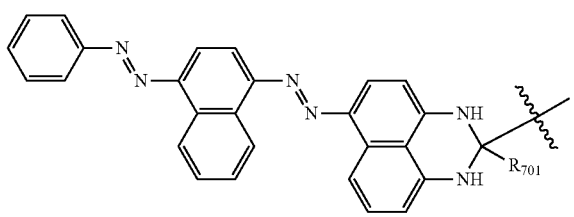

(VII-1)

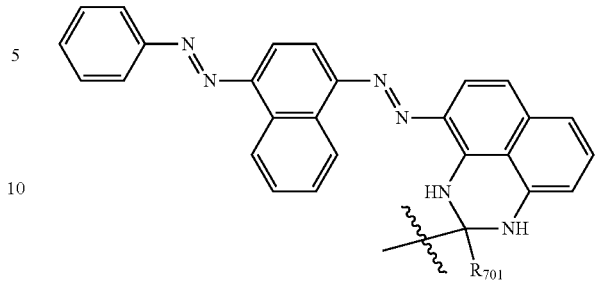

(VII-2)

(where $R_{701}$ is the same as above).

For the dye residue in Dye of General Formula (1), the dye residue represented by General Formula (I), (III), (IV), (VI) or (VII) is preferable, the dye residue represented by General Formula (II), (III), (V), (VI) or (VII) is more preferable, and the dye residue represented by General Formula (VI) or (VII) is even more preferable.

[$R_1$, $Y_2$, and $A_1$ represented by General Formula (1)]

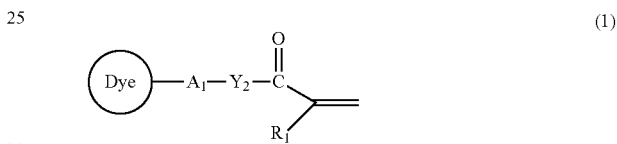

(1)

{where Dye represents a dye residue, $R_1$ represents a hydrogen atom or a methyl group, $Y_2$ represents —O— or —$NR_{10}$—, where $R_{10}$ represents a hydrogen atom or an alkyl group having 1 to 12 carbon atoms, $A_1$ represents an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1) below:

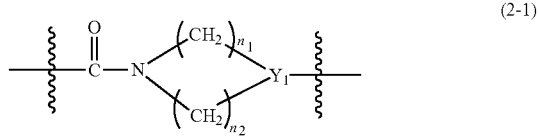

(2-1)

[where $Y_1$ represents a nitrogen atom or the group represented by General Formula (2-2) below:

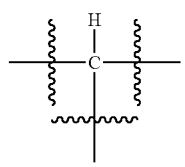

(2-2)

$n_1$ represents an integer from 0 to 2, and $n_2$ represents an integer from 2 to 4, where $n_1+n_2$ is 3 or 4];

an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1), and also has a hydroxy group as a substituent; an alkylene group having 1 to 21 carbon atoms which has a hydroxy group as a substituent; or an alkylene group having 1 to 21 carbon atoms}.

For $R_1$ in General Formula (1), a methyl group is preferable.

Examples of the alkyl group having 1 to 12 carbon atoms in $R_{10}$ in $Y_2$ in General Formula (1) are the same as the alkyl groups having 1 to 12 carbon atoms for $R_{202}$ and $R_{203}$ in General Formula (I-5), and preferable examples are also the same.

For $R_{10}$ in $Y_2$ in General Formula (1), a hydrogen atom is preferable.

For $Y_2$ in General Formula (1), —O— and —NH— are preferable, and —O— is more preferable.

The alkylene group having 1 to 21 carbon atoms in the "alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented in $A_1$ of General Formula (2-1) below", "alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1) and also has a hydroxy group as a substituent", "alkylene group having 1 to 21 carbon atoms which has a hydroxy group as a substituent", and "alkylene group having 1 to 21 carbon atoms" may be linear, branched, or cyclic, and is preferably linear. Among the alkylene groups having 1 to 21 carbon atoms, the alkylene groups having 1 to 12 carbon atoms are preferable, and the alkylene groups having 1 to 6 carbon atoms are more preferable. Specific examples include a methylene groups, an ethylene group, a trimethylene group, a propylene group, a tetramethylene group, a 1-methyltrimethylene group, a 2-methyltrimethylene group, a 1,2-dimethylethylene group, a 1,1-dimethylethylene group, an ethylethylene group, a pentamethylene group, a 1-methyltetramethylene group, a 2-methyltetramethylene group, a 1,2-dimethyltrimethylene group, a 1-ethyltrimethylene group, a hexamethylene group, a methylpentamethylene group, an n-heptylene group, an n-octylene group, an n-nonylene group, an n-decylene group, an n-undecylene group, an n-dodecylene group, an n-tridecylene group, an n-tetradecylene group, an n-pentadecylene group, an n-hexadecylene group, an n-heptadecylene group, an n-octadecylene group, an n-nonadecylene group, an n-icosylene group, an n-henicosylene group, a —$C_4H_6$—$CH_2$— group, a —$C_5H_5$—$CH_2$— group, a —$C_6H_{10}$—$CH_2$— group, a —$C_6H_{10}$—$C_2H_4$— group, a —$C_6H_{10}$—$C_3H_6$— group, and a —$C_7H_{12}$—$CH_2$— group. Among the alkylene groups, a methylene group, an ethylene group, a trimethylene group, a tetramethylene group, a pentamethylene group, a hexamethylene group, an n-heptylene group, an n-octylene group, an n-nonylene group, an n-decylene group, an n-undecylene group, an n-dodecylene group, a —$C_6H_{10}$—$CH_2$— group, a —$C_6H_{10}$—$C_2H_4$— group, and a —$C_6H_{10}$—$C_3H_6$— group are preferable, and a methylene group, an ethylene group, a trimethylene group, a tetramethylene group, a pentamethylene group, and a hexamethylene group are more preferable, and an ethylene group is particularly preferable.

Examples of the arylene group in the "alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1) below" in $A_1$ of General Formula (1) and the "alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1), and also has a hydroxy group as a substituent" include the arylene group having 6 to 10 carbon atoms, and specific examples include a phenylene group and a naphthylene group. Among the arylene groups, a phenylene group is preferable.

For $Y_1$ in General Formula (2-1), the group represented by General Formula (2-2) is preferable.

For $n_1$ in General Formula (2-1), 2 is preferable.

For $n_2$ in General Formula (2-1), 2 is preferable.

The group represented by General Formula (2-1) represents a 5- to 6-membered ring structure. Among the ring structures, a 6-membered ring is preferable. That is, $n_1+n_2$ is preferably 4.

For the group represented by General Formula (2-1), specific examples include groups represented by General Formulas (2-1-1) to (2-1-10) below. Among the groups, the group represented by (2-1-9) and the group represented by General Formula (2-1-10) are preferable, and the group represented by General Formula (2-1-10) is more preferable:

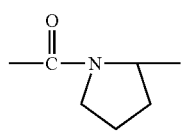
(2-1-1)

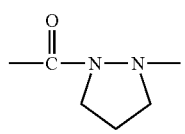
(2-1-2)

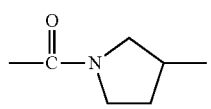
(2-1-3)

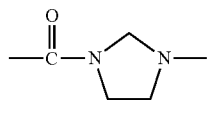
(2-1-4)

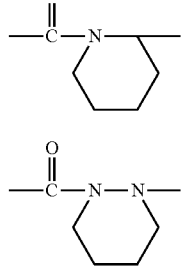
(2-1-5)

(2-1-6)

-continued

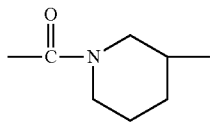
(2-1-7)

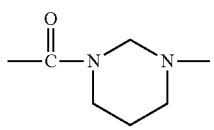
(2-1-8)

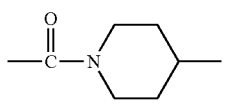
(2-1-9)

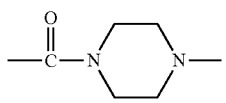
(2-1-10)

Specific examples of the "alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1) below" in $A_1$ of General Formula (1) include the groups represented by General Formulas (21-1) to (21-5) below:

$$-A_{2\text{-}1}\text{-}(CH_2)_{h1}- \quad (21\text{-}1)$$

(where $A_{2\text{-}1}$ represents —OCO—, —COO—, —NHCO—, —CONH—, —NHCONH—, or the group represented by General Formula (2-1), and $h_1$ represents an integer from 1 to 21), $$-(CH_2)_{h2}\text{-}A_{2\text{-}2}\text{-}(CH_2)_{h3}- \quad (21\text{-}2)$$

(where $A_{2\text{-}2}$ represents —O—, —OCO—, —COO—, —NHCO—, —CONH—, —NHCONH—, or —O—CONH—, and $h_2$ and $h_3$ each independently represent an integer from 1 to 10), $$-A_{2\text{-}3}\text{-}(CH_2)_{h4}\text{-}A_{2\text{-}4}\text{-}(CH_2)_{h5}- \quad (21\text{-}3)$$

(where $A_{2\text{-}3}$ represents the group represented by —OCO—, —COO—, —NHCO—, —CONH—, —NHCONH—, or a General Formula (2-1), and $A_{2\text{-}4}$ represents —O—, —OCO—, —COO—, —NHCO—, —CONH—, —NHCONH—, or —O—CONH—, and $h_4$ and $h_5$ each independently represent an integer from 1 to 10), $$-(CH_2)_{h6}\text{-}A_{2\text{-}5}\text{-}R_{51}\text{-}A_{2\text{-}6}\text{-}(CH_2)_{h7}- \quad (21\text{-}4)$$

(where $R_{51}$ represents an alkylene group having 1 to 7 carbon atoms or an arylene group having 6 to 10 carbon atoms, $A_{2\text{-}5}$ represents —OCO— or —NHCO—, and $A_{2\text{-}6}$ represents —COO— or —CONH—, and $h_6$ and $h_7$ each independently represent an integer from 1 to 7), $$-A_{2\text{-}7}\text{-}(CH_2)_{h8}\text{-}A_{2\text{-}8}\text{-}R_{52}\text{-}A_{2\text{-}9}\text{-}(CH_2)_{h9}- \quad (21\text{-}5)$$

(where $R_{52}$ represents an alkylene group having 1 to 7 carbon atoms or an arylene group having 6 to 10 carbon atoms, and $A_{2\text{-}7}$ represents —OCO—, —COO—, —NHCO—, —CONH—, —NHCONH—, or the group represented by General Formula (2-1), $A_{2\text{-}8}$ represents —OCO— or —NHCO—, $A_{2\text{-}9}$ represents —COO— or —CONH—, $h_8$ and $h_9$ each independently represent an integer from 1 to 7).

The alkylene group having 1 to 7 carbon atoms in $R_{51}$ in General Formula (21-4) and $R_{52}$ in General Formula (21-5) may be linear, branched, or cyclic, and preferably linear. Among the alkyl groups having 1 to 7 carbon atoms, the alkyl groups having 1 to 3 carbon atoms are preferable. Specific examples include a methylene group, an ethylene group,
a trimethylene group, propylene group, a tetramethylene group, a 1-methyltrimethylene group, a 2-methyltrimethylene group, a 1,2-dimethylethylene group, a 1,1-dimethylethylene Group, an ethylethylene group, a pentamethylene group, a hexamethylene group, an n-heptylene group, a cyclobutylene group, a cyclopentylene group, a cyclohexylene group, and a cycloheptylene group. Among the alkylene groups,
a methylene group, an ethylene group, a trimethylene group, a tetramethylene group, a pentamethylene group, a hexamethylene group, and an n-heptylene group are preferable, a methylene group, an ethylene group, and a trimethylene group are more preferable, and an ethylene group is particularly preferable.

Specific examples of the arylene group having 6 to 10 carbon atoms in $R_{51}$ in General Formula (21-4) and $R_{52}$ in General Formula (21-5) include a phenylene group and a naphthylene group. Among the arylene groups, a phenylene group is preferable.

For $A_{2\text{-}1}$ in General Formula (21-1), —COO—, —CONH—, —NHCONH—, the group represented by General Formula (2-1-9), and the group represented by General Formula (2-1-10) are preferable, and —COO—, —NHCONH—, and the group represented by General Formula (2-1-10) are more preferable, and —COO— and —NHCONH— are particularly preferable.

For $h_1$ in General Formula (21-1), an integer from 1 to 12 is preferable, an integer from 1 to 6 is more preferable, an integer from 1 to 4 is even more preferable, and 2 is particularly preferable.

For $A_{2\text{-}2}$ in General Formula (21-2), —O—, —COO— and —CONH— are preferable, and —COO— is more preferable.

For $h_2$ in General Formula (21-2), an integer from 1 to 3 is preferable, and 1 is more preferable.

For $h_3$ in General Formula (21-2), an integer from 1 to 3 is preferable, and 2 is more preferable.

For $A_{2\text{-}3}$ in General Formula (21-3), —COO—, —NHCO—, —CONH—, —NHCONH, the group represented by General Formula (2-1-9), and the group represented by General Formula (2-1-10) are preferable, and —COO—, —NHCO—, and —CONH— are more preferable.

For $A_{2\text{-}4}$ in General Formula (21-3), —O—, —COO—, —NHCONH— and —O—CONH— are preferable, and —COO— and —NHCONH— are more preferable.

For $h_4$ and $h_5$ in General Formula (21-3), $h_4$ and $h_5$ are preferable the same, an integer from 1 to 6 is preferable, an integer from 1 to 3 is more preferable, and 2 is even more preferable.

For $R_{51}$ in General Formula (21-4), a linear alkylene group having 1 to 7 carbon atoms and a phenylene group are preferable, and
a linear alkylene group having 1 to 3 carbon atoms is more preferable. Specifically, for example, a methylene group, an ethylene group,
a trimethylene group, a tetramethylene group, a pentamethylene group, a hexamethylene group, an n-hexylene group, and a phenylene group are preferable, a methylene group, an ethylene group, and a trimethylene group are more preferable, and an ethylene group is even more preferable.

For $A_{2-5}$ and $A_{2-6}$ in General Formula (21-4), a combination of —OCO— and —COO— and a combination of —NHCO— and —CONH— are preferable, and a combination of —OCO— and —COO— is more preferable.

For $h_6$ in General Formula (21-4), an integer from 1 to 3 is preferable, 1 or 2 is more preferable, and 2 is particularly preferable.

For $h_7$ in General Formula (21-4), an integer from 1 to 3 is preferable, and 2 is more preferable.

For $R_{52}$ in General Formula (21-5), a linear alkylene group having 1 to 7 carbon atoms and a phenylene group are preferable, and a linear alkylene group having 1 to 3 carbon atoms is more preferable. Specifically, for example, a methylene group, an ethylene group, a trimethylene group, a tetramethylene group, a pentamethylene group, a hexamethylene group, an n-heptylene group, and a phenylene group are preferable, and a methylene group, an ethylene group, and a trimethylene group are more preferable, and an ethylene group is even more preferable.

For $A_{2-7}$ in General Formula (21-5), —COO—, —CONH—, —NHCONH—, the group represented by General Formula (2-1-9) and the group represented by General Formula (2-1-10) are preferable, —COO— and —CONH— are more preferable, and —CONH— is even more preferable.

For $A_{2-5}$ and $A_{2-9}$ in General Formula (21-5), a combination of —OCO— and —COO— and a combination of —NHCO— and —CONH— are preferable, and —OCO— and —COO— is more preferable.

For $h_8$ and $h_9$ in General Formula (21-5), $h_8$ and $h_9$ are preferably the same, an integer from 1 to 3 is preferable, and 2 is more preferable.

Specific examples of the group represented by General Formula (21-1) include —COO—CH$_2$—, —COO—(CH$_2$)$_2$—, —COO—(CH$_2$)$_3$—, —COO—(CH$_2$)$_4$—, —COO—(CH$_2$)$_5$—, —COO—(CH$_2$)$_6$—, —CONH—CH$_2$—, —CONH—(CH$_2$)$_2$—, —CONH—(CH$_2$)$_3$—, —CONH—(CH$_2$)$_4$—, —CONH—(CH$_2$)$_5$—, —CONH—(CH$_2$)$_6$—, —NHCONH—CH$_2$—, —NHCONH—(CH$_2$)$_2$—, —NHCONH—(CH$_2$)$_3$—, —NHCONH—(CH$_2$)$_4$—, —NHCONH—(CH$_2$)$_5$—, —NHCONH—(CH$_2$)$_6$—

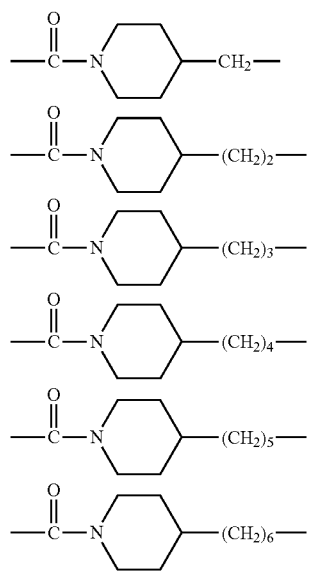

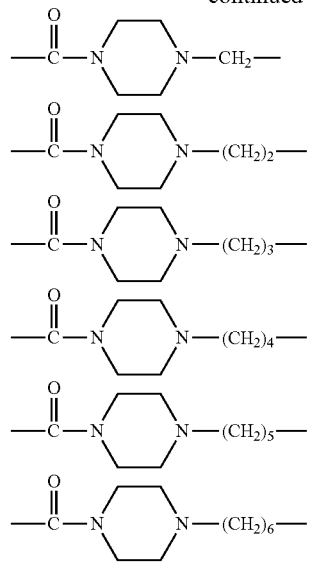

Among the groups, —COO—CH$_2$—, —COO—(CH$_2$)$_2$—, —COO—(CH$_2$)$_3$—, —COO—(CH$_2$)$_4$—, —COO—(CH$_2$)$_5$—, —COO—(CH$_2$)$_6$—, —NHCONH—CH$_2$—, —NHCONH—(CH$_2$)$_2$—, —NHCONH—(CH$_2$)$_3$—, —NHCONH—(CH$_2$)$_4$—, —NHCONH—(CH$_2$)$_5$—, —NHCONH—(CH$_2$)$_6$—,

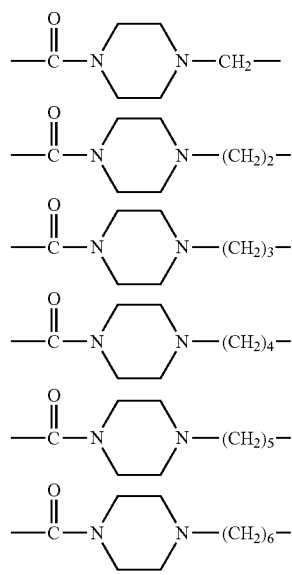

are preferable,
—COO—CH$_2$—, —COO—(CH$_2$)$_2$—, —COO—(CH$_2$)$_3$—, —COO—(CH$_2$)$_4$—, —NHCONH—CH$_2$—, —NHCONH—(CH$_2$)$_2$—, —NHCONH—(CH$_2$)$_3$—, —NHCONH—(CH$_2$)$_4$— are more preferable, and —COO—(CH$_2$)$_2$— and —NHCONH—CH$_2$— are particularly preferable.

Specific examples of the group represented by General Formula (21-2) include —CH$_2$—O—CH$_2$—, —CH$_2$—O—(CH$_2$)$_2$—, —CH$_2$—O—(CH$_2$)$_3$—, —(CH$_2$)$_2$—O—CH$_2$—, —(CH$_2$)$_2$—O—(CH$_2$)$_2$—, —(CH$_2$)$_2$—O—(CH$_2$)$_3$—, —(CH$_2$)$_3$—O—CH$_2$—, —(CH$_2$)$_3$—O—(CH$_2$)$_2$—, —(CH$_2$)$_3$—O—(CH$_2$)$_3$—, —CH$_2$—COO—CH$_2$—, —CH$_2$—COO—(CH$_2$)$_2$—, —CH$_2$—COO—(CH$_2$)$_3$—, —(CH$_2$)$_2$—COO—CH$_2$—, —(CH$_2$)$_2$—COO—(CH$_2$)$_2$—, —(CH$_2$)$_2$—COO—(CH$_2$)$_3$—, —(CH$_2$)$_3$—COO—CH$_2$—, —(CH$_2$)$_3$—COO—(CH$_2$)$_2$—, —(CH$_2$)$_3$—COO—(CH$_2$)$_3$—, —CH$_2$—CONH—CH$_2$—, —CH$_2$—CONH—(CH$_2$)$_2$—, —CH$_2$—CONH—(CH$_2$)$_3$—, —(CH$_2$)$_2$—CONH—CH$_2$—, —(CH$_2$)$_2$—CONH—(CH$_2$)$_2$—, —(CH$_2$)$_2$—CONH—(CH$_2$)$_3$—, —(CH$_2$)$_3$—CONH—CH$_2$—, —(CH$_2$)$_3$—CONH—(CH$_2$)$_2$—, and —(CH$_2$)$_3$—CONH—(CH$_2$)$_3$—.

Specific examples of the group represented by General Formula (21-3) include —COO—CH$_2$—O—CH$_2$—, —COO—(CH$_2$)$_2$—O—(CH$_2$)$_2$—, —COO—(CH$_2$)$_3$—O—(CH$_2$)$_3$—, —COO—CH$_2$—COO—CH$_2$—, —COO—(CH$_2$)$_2$—COO—(CH$_2$)$_2$—, —COO—(CH$_2$)$_3$—COO—(CH$_2$)$_3$—, —COO—CH$_2$—NHCONH—CH$_2$—, —COO—(CH$_2$)$_2$—NHCONH—(CH$_2$)$_2$—, —COO—(CH$_2$)$_3$—NHCONH—(CH$_2$)$_3$—, —COO—CH$_2$—O—CONH—CH$_2$—, —COO—(CH$_2$)$_2$—O—CONH—(CH$_2$)$_2$—, —COO—(CH$_2$)$_3$—O—CONH—(CH$_2$)$_3$—, —NHCO—CH$_2$—O—CH$_2$—, —NHCO—(CH$_2$)$_2$—O—(CH$_2$)$_2$—, —NHCO—(CH$_2$)$_3$—O—(CH$_2$)$_3$—, —NHCO—CH$_2$—COO—CH$_2$—, —NHCO—(CH$_2$)$_2$—COO—(CH$_2$)$_2$—, —NHCO—(CH$_2$)$_3$—COO—(CH$_2$)$_3$—, —NHCO—CH$_2$—NHCONH—CH$_2$—, —NHCO—(CH$_2$)$_2$—NHCONH—(CH$_2$)$_2$—, —NHCO—(CH$_2$)$_3$—NHCONH—(CH$_2$)$_3$—, —NHCO—CH$_2$—O—CONH—CH$_2$—, —NHCO—(CH$_2$)$_2$—O—CONH—(CH$_2$)$_2$—, —NHCO—(CH$_2$)$_3$—O—CONH—(CH$_2$)$_3$—, —CONH—CH$_2$—O—CH$_2$—, —CONH—(CH$_2$)$_2$—O—(CH$_2$)$_2$—, —CONH—(CH$_2$)$_3$—O—(CH$_2$)$_3$—, —CONH—CH$_2$—COO—CH$_2$—, —CONH—(CH$_2$)$_2$—COO—(CH$_2$)$_2$—, —CONH—(CH$_2$)$_3$—COO—(CH$_2$)$_3$—, —CONH—CH$_2$—NHCONH—CH$_2$—, —CONH—(CH$_2$)$_2$—NHCONH—(CH$_2$)$_2$—, —CONH—(CH$_2$)$_3$—NHCONH—(CH$_2$)$_3$—, —CONH—CH$_2$—O—CONH—CH$_2$—, —CONH—(CH$_2$)$_2$—O—CONH—(CH$_2$)$_2$—, and —CONH—(CH$_2$)$_3$—O—CONH—(CH$_2$)$_3$—.

Examples of combinations of $R_{51}$, $A_{2-5}$, $A_{2-6}$, $h_6$, and $h_7$ in General Formula (21-4) include combinations described in the following table:

| $h_6$ | $A_{2-5}$ | $R_{51}$ | $A_{2-6}$ | $h_7$ |
|---|---|---|---|---|
| 1 to 3 | —OCO— | Methylene group | —COO— | 1 to 3 |
| 1 to 3 | —OCO— | Ethylene group | —COO— | 1 to 3 |
| 1 to 3 | —OCO— | Trimethylene group | —COO— | 1 to 3 |
| 1 to 3 | —OCO— | Tetramethylene group | —COO— | 1 to 3 |
| 1 to 3 | —OCO— | Pentamaethylene group | —COO— | 1 to 3 |
| 1 to 3 | —OCO— | Hexamethylene group | —COO— | 1 to 3 |
| 1 to 3 | —OCO— | n-Heptylene group | —COO— | 1 to 3 |
| 1 to 3 | —OCO— | Phenylene group | —COO— | 1 to 3 |
| 1 to 3 | —NHCO— | Methylene group | —CONH— | 1 to 3 |
| 1 to 3 | —NHCO— | Ethylene group | —CONH— | 1 to 3 |
| 1 to 3 | —NHCO— | Trimethylene group | —CONH— | 1 to 3 |
| 1 to 3 | —NHCO— | Tetramethylene group | —CONH— | 1 to 3 |
| 1 to 3 | —NHCO— | Pentamaethylene group | —CONH— | 1 to 3 |
| 1 to 3 | —NHCO— | Hexamethylene group | —CONH— | 1 to 3 |
| 1 to 3 | —NHCO— | n-Heptylene group | —CONH— | 1 to 3 |
| 1 to 3 | —NHCO— | Phenylene group | —CONH— | 1 to 3 |

Among the above-described combinations, combinations 1 to 32 shown in the following table are preferable, combinations 1 to 16 are more preferable, combinations 1 to 3 and 9 to 11 are more preferable, and combination 2 is particularly preferable:

| Combination | $h_6$ | $A_{2-5}$ | $R_{51}$ | $A_{2-6}$ | $h_7$ |
|---|---|---|---|---|---|
| 1 | 1 | —OCO— | Methylene group | —COO— | 2 |
| 2 | 1 | —OCO— | Ethylene group | —COO— | 2 |
| 3 | 1 | —OCO— | Trimethylene group | —COO— | 2 |
| 4 | 1 | —OCO— | Tetramethylene group | —COO— | 2 |
| 5 | 1 | —OCO— | Pentamaethylene group | —COO— | 2 |
| 6 | 1 | —OCO— | Hexamethylene group | —COO— | 2 |
| 7 | 1 | —OCO— | n-Heptylene group | —COO— | 2 |
| 8 | 1 | —OCO— | Phenylene group | —COO— | 2 |
| 9 | 2 | —OCO— | Methylene group | —COO— | 2 |
| 10 | 2 | —OCO— | Ethylene group | —COO— | 2 |
| 11 | 2 | —OCO— | Trimethylene group | —COO— | 2 |
| 12 | 2 | —OCO— | Tetramethylene group | —COO— | 2 |
| 13 | 2 | —OCO— | Pentamaethylene group | —COO— | 2 |
| 14 | 2 | —OCO— | Hexamethylene group | —COO— | 2 |
| 15 | 2 | —OCO— | n-Heptylene group | —COO— | 2 |
| 16 | 2 | —OCO— | Phenylene group | —COO— | 2 |
| 17 | 1 | —NHCO— | Methylene group | —CONH— | 2 |
| 18 | 1 | —NHCO— | Ethylene group | —CONH— | 2 |
| 19 | 1 | —NHCO— | Trimethylene group | —CONH— | 2 |
| 20 | 1 | —NHCO— | Tetramethylene group | —CONH— | 2 |
| 21 | 1 | —NHCO— | Pentamaethylene group | —CONH— | 2 |
| 22 | 1 | —NHCO— | Hexamethylene group | —CONH— | 2 |
| 23 | 1 | —NHCO— | n-Heptylene group | —CONH— | 2 |
| 24 | 1 | —NHCO— | Phenylene group | —CONH— | 2 |
| 25 | 2 | —NHCO— | Methylene group | —CONH— | 2 |
| 26 | 2 | —NHCO— | Ethylene group | —CONH— | 2 |
| 27 | 2 | —NHCO— | Trimethylene group | —CONH— | 2 |
| 28 | 2 | —NHCO— | Tetramethylene group | —CONH— | 2 |
| 29 | 2 | —NHCO— | Pentamaethylene group | —CONH— | 2 |
| 30 | 2 | —NHCO— | Hexamethylene group | —CONH— | 2 |
| 31 | 2 | —NHCO— | n-Heptylene group | —CONH— | 2 |
| 32 | 2 | —NHCO— | Phenylene group | —CONH— | 2 |

Examples of combinations of $R_{52}$, $A_{2-7}$, $A_{2-8}$, $A_{2-9}$, $h_8$, and $h_9$ in General Formula (21-5) include combinations described in the following table:

| $A_{2-7}$ | $h_8$ | $A_{2-8}$ | $R_{52}$ | $A_{2-9}$ | $h_9$ |
|---|---|---|---|---|---|
| —COO—, | 1 | —OCO— | Methylene group | —COO— | 1 |
| —CONH—, | 1 | —OCO— | Ethylene group | —COO— | 1 |
| —NHCONH—, | 1 | —OCO— | Trimethylene group | —COO— | 1 |
| General Formula | 1 | —OCO— | Tetramethylene group | —COO— | 1 |
| (2-1-9), | 1 | —OCO— | Pentamaethylene group | —COO— | 1 |
| or | 1 | —OCO— | Hexamethylene group | —COO— | 1 |
| General Formula | 1 | —OCO— | n-Heptylene group | —COO— | 1 |
| (2-1-10) | 1 | —OCO— | Phenylene group | —COO— | 1 |
| —COO—, | 2 | —OCO— | Methylene group | —COO— | 2 |
| —CONH—, | 2 | —OCO— | Ethylene group | —COO— | 2 |
| —NHCONH—, | 2 | —OCO— | Trimethylene group | —COO— | 2 |
| General Formula | 2 | —OCO— | Tetramethylene group | —COO— | 2 |
| (2-1-9), | 2 | —OCO— | Pentamaethylene group | —COO— | 2 |
| or | 2 | —OCO— | Hexamethylene group | —COO— | 2 |

-continued

| $A_{2-7}$ | $h_8$ | $A_{2-8}$ | $R_{52}$ | $A_{2-9}$ | $h_9$ |
|---|---|---|---|---|---|
| General Formula (2-1-10) | 2 | —OCO— | n-Heptylene group | —COO— | 2 |
| | 2 | —OCO— | Phenylene group | —COO— | 2 |
| —COO—, | 3 | —OCO— | Methylene group | —COO— | 3 |
| —CONH—, | 3 | —OCO— | Ethylene group | —COO— | 3 |
| —NHCONH—, | 3 | —OCO— | Trimethylene group | —COO— | 3 |
| General Formula (2-1-9), | 3 | —OCO— | Tetramethylene group | —COO— | 3 |
| | 3 | —OCO— | Pentamaethylene group | —COO— | 3 |
| or | 3 | —OCO— | Hexamethylene group | —COO— | 3 |
| General Formula (2-1-10) | 3 | —OCO— | n-Heptylene group | —COO— | 3 |
| | 3 | —OCO— | Phenylene group | —COO— | 3 |
| —COO—, | 1 | —NHCO— | Methylene group | —CONH— | 1 |
| —CONH—, | 1 | —NHCO— | Ethylene group | —CONH— | 1 |
| —NHCONH—, | 1 | —NHCO— | Trimethylene group | —CONH— | 1 |
| General Formula (2-1-9), | 1 | —NHCO— | Tetramethylene group | —CONH— | 1 |
| | 1 | —NHCO— | Pentamaethylene group | —CONH— | 1 |
| or | 1 | —NHCO— | Hexamethylene group | —CONH— | 1 |
| General Formula (2-1-10) | 1 | —NHCO— | n-Heptylene group | —CONH— | 1 |
| | 1 | —NHCO— | Phenylene group | —CONH— | 1 |
| —COO—, | 2 | —NHCO— | Methylene group | —CONH— | 2 |
| —CONH—, | 2 | —NHCO— | Ethylene group | —CONH— | 2 |
| —NHCONH—, | 2 | —NHCO— | Trimethylene group | —CONH— | 2 |
| General Formula (2-1-9), | 2 | —NHCO— | Tetramethylene group | —CONH— | 2 |
| | 2 | —NHCO— | Pentamaethylene group | —CONH— | 2 |
| or | 2 | —NHCO— | Hexamethylene group | —CONH— | 2 |
| General Formula (2-1-10) | 2 | —NHCO— | n-Heptylene group | —CONH— | 2 |
| | 2 | —NHCO— | Phenylene group | —CONH— | 2 |
| —COO—, | 3 | —NHCO— | Methylene group | —CONH— | 3 |
| —CONH—, | 3 | —NHCO— | Ethylene group | —CONH— | 3 |
| —NHCONH—, | 3 | —NHCO— | Trimethylene group | —CONH— | 3 |
| General Formula (2-1-9), | 3 | —NHCO— | Tetramethylene group | —CONH— | 3 |
| | 3 | —NHCO— | Pentamaethylene group | —CONH— | 3 |
| or | 3 | —NHCO— | Hexamethylene group | —CONH— | 3 |
| General Formula (2-1-10) | 3 | —NHCO— | n-Heptylene group | —CONH— | 3 |
| | 3 | —NHCO— | Phenylene group | —CONH— | 3 |

Among the above-described combinations, combinations 1 to 32 shown in the following table are preferable, combinations 1 to 16 are more preferable, and combinations 1 to 3 and 9 to 11 are even more preferable:

| Combination | $A_{2-7}$ | $h_8$ | $A_{2-8}$ | $R_{52}$ | $A_{2-9}$ | $h_9$ |
|---|---|---|---|---|---|---|
| 1 | —COO— | 2 | —OCO— | Methylene group | —COO— | 2 |
| 2 | —COO— | 2 | —OCO— | Ethylene group | —COO— | 2 |
| 3 | —COO— | 2 | —OCO— | Trimethylene group | —COO— | 2 |
| 4 | —COO— | 2 | —OCO— | Tetramethylene group | —COO— | 2 |
| 5 | —COO— | 2 | —OCO— | Pentamaethylene group | —COO— | 2 |
| 6 | —COO— | 2 | —OCO— | Hexamethylene group | —COO— | 2 |
| 7 | —COO— | 2 | —OCO— | n-Heptylene group | —COO— | 2 |
| 8 | —COO— | 2 | —OCO— | Phenylene group | —COO— | 2 |
| 9 | —CONH— | 2 | —OCO— | Methylene group | —COO— | 2 |
| 10 | —CONH— | 2 | —OCO— | Ethylene group | —COO— | 2 |
| 11 | —CONH— | 2 | —OCO— | Trimethylene group | —COO— | 2 |
| 12 | —CONH— | 2 | —OCO— | Tetramethylene group | —COO— | 2 |
| 13 | —CONH— | 2 | —OCO— | Pentamaethylene group | —COO— | 2 |
| 14 | —CONH— | 2 | —OCO— | Hexamethylene group | —COO— | 2 |
| 15 | —CONH— | 2 | —OCO— | n-Heptylene group | —COO— | 2 |
| 16 | —CONH— | 2 | —OCO— | Phenylene group | —COO— | 2 |
| 17 | —COO— | 2 | —NHCO— | Methylene group | —CONH— | 2 |
| 18 | —COO— | 2 | —NHCO— | Ethylene group | —CONH— | 2 |
| 19 | —COO— | 2 | —NHCO— | Trimethylene group | —CONH— | 2 |
| 20 | —COO— | 2 | —NHCO— | Tetramethylene group | —CONH— | 2 |
| 21 | —COO— | 2 | —NHCO— | Pentamaethylene group | —CONH— | 2 |
| 22 | —COO— | 2 | —NHCO— | Hexamethylene group | —CONH— | 2 |
| 23 | —COO— | 2 | —NHCO— | n-Heptylene group | —CONH— | 2 |
| 24 | —COO— | 2 | —NHCO— | Phenylene group | —CONH— | 2 |
| 25 | —CONH— | 2 | —NHCO— | Methylene group | —CONH— | 2 |
| 26 | —CONH— | 2 | —NHCO— | Ethylene group | —CONH— | 2 |
| 27 | —CONH— | 2 | —NHCO— | Trimethylene group | —CONH— | 2 |
| 28 | —CONH— | 2 | —NHCO— | Tetramethylene group | —CONH— | 2 |
| 29 | —CONH— | 2 | —NHCO— | Pentamaethylene group | —CONH— | 2 |
| 30 | —CONH— | 2 | —NHCO— | Hexamethylene group | —CONH— | 2 |
| 31 | —CONH— | 2 | —NHCO— | n-Heptylene group | —CONH— | 2 |
| 32 | —CONH— | 2 | —NHCO— | Phenylene group | —CONH— | 2 |

Specific examples of the "alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1), and also has a hydroxy group as a substituent" in $A_1$ of General Formula (1) include the groups represented by General Formulas (22-1) to (22-2) below:

(where $R_{53}$ represents an arylene group having 6 to 10 carbon atoms having a hydroxy group as a substituent, and $A_{3\text{-}1}$ represents —OCO—, —COO—, —NHCO—, —CONH—, or —NHCONH, and $h_{10}$ represents an integer from 1 to 21),

(where $R_{54}$ represents an alkylene group having 1 to 7 carbon atoms having a hydroxy group as a substituent or an arylene group having 6 to 10 carbon atoms having a hydroxy group as a substituent, and $A_{3\text{-}2}$ represents —OCO—, —COO—, —NHCO—, —CONH— or —NHCONH—, and $A_{3\_3}$ represents —O—, —OCO—, —COO—, —NHCO—, —CONH—, —NHCONH—, or —O—CONH—, and $h_{11}$ represents an integer from 1 to 14)

Specific examples of the arylene group having 6 to 10 carbon atoms having a hydroxy group as a substituent in $R_3$ in General Formula (22-1) and $R_{54}$ in General Formula (22-2) include a hydroxyphenylene group, a dihydroxyphenylene group, a hydroxynaphthylene group, and a dihydroxynaphthylene group. Among the arylene groups, a hydroxyphenylene group and a dihydroxyphenylene group are preferable.

Specific examples of the alkylene group having 1 to 7 carbon atoms and a hydroxy group as a substituent in $R_{54}$ in General Formula (22-2) include a hydroxymethylene group, a hydroxyethylene group,
a hydroxytrimethylene group, a hydroxytetramethylene group,
a hydroxypentamethylene group, a hydroxyhexamethylene group,
a hydroxy-n-heptylene group, a hydroxycyclobutylene group,
a hydroxycyclopentylene group, a hydroxycycloxylene group, and
a hydroxycycloheptylene group. Among the alkylene groups, a hydroxymethylene group, a hydroxyethylene group, a hydroxytrimethylene group,
a hydroxytetramethylene group, a hydroxypentamethylene group,
a hydroxyhexamethylene group, and a hydroxy-n-heptylene group are preferable, and a hydroxyethylene group is more preferable.

For $A_{3\text{-}1}$ in General Formula (22-1), —COO—, —CONH—, and —NHCONH— are preferable.

For $h_{10}$ in General Formula (22-1), an integer from 1 to 4 is preferable.

For $R_{54}$ in General Formula (22-2), an alkylene group having 1 to 7 carbon atoms having a hydroxy group as a substituent is preferable, and a hydroxyethylene group is more preferable.

For $A_{3\text{-}2}$ in General Formula (22-2), —COO—, —CONH—, and —NHCONH— are preferable.

For $A_{3\text{-}3}$ in General Formula (22-2), —O—, —NHCONH—, or —O—CONH— is preferable.

For $h_{11}$ in General Formula (22-2), an integer from 2 to 4 is preferable.

Specific examples of the group represented by General Formula (22-1) include —COO—$C_6H_3$(OH)—$CH_2$—, —COO—$C_6H_3$(OH)—$(CH_2)_2$—, —COO—$C_6H_3$(OH)—$(CH_2)_3$—, —COO—$C_6H_3$(OH)—$(CH_2)_4$—, —CONH—$C_6H_2$(OH)$_2$—$CH_2$—, —CONH—$C_6H_2$(OH)$_2$—$(CH_2)_2$—, —CONH—$C_6H_2$(OH)$_2$—$(CH_2)_3$—, —CONH—$C_6H_2$(OH)$_2$—$(CH_2)_4$—, —NHCONH—$C_6H_3$(OH)—$CH_2$—, —NHCONH—$C_6H_3$(OH)—$(CH_2)_2$—, —NHCONH—$C_6H_3$(OH)—$(CH_2)_3$—, and —NHCONH—$C_6H_3$(OH)—$(CH_2)_4$—.

Specific examples of the group represented by General Formula (22-2) include —COO—CH(OH)$CH_2$—O—$(CH_2)_2$—, —COO—CH(OH)$CH_2$—O—$(CH_2)_3$—, —COO—CH(OH)$CH_2$—O—$(CH_2)_4$—, —CONH—CH(OH)$CH_2$—O—$(CH_2)_2$—, —CONH—CH(OH)$CH_2$—O—$(CH_2)_3$—, —CONH—CH(OH)$CH_2$—O—$(CH_2)_4$—, —NHCONH—CH(OH)$CH_2$—O—$(CH_2)_2$—, —NHCONH—CH(OH)$CH_2$—O—$(CH_2)_3$—, —NHCONH—CH(OH)$CH_2$—O—$(CH_2)_4$—, —COO—CH(OH)$CH_2$—O—CONH—$(CH_2)_2$—, —COO—CH(OH)$CH_2$—O—CONH—$(CH_2)_3$—, —COO—CH(OH)$CH_2$—O—CONH—$(CH_2)_4$—, —CONH—CH(OH)$CH_2$—O—CONH—$(CH_2)_2$—, —CONH—CH(OH)$CH_2$—O—CONH—$(CH_2)_3$—, —CONH—CH(OH)$CH_2$—O—CONH—$(CH_2)_4$—, —NHCONH—CH(OH)$CH_2$—O—CONH—$(CH_2)_2$—, —NHCONH—CH(OH)$CH_2$—O—CONH—$(CH_2)_3$—, —NHCONH—CH(OH)$CH_2$—O—CONH—$(CH_2)_4$—, —COO—CH(OH)$CH_2$—NHCONH—$(CH_2)_2$—, —COO—CH(OH)$CH_2$—NHCONH—$(CH_2)_3$—, —COO—CH(OH)$CH_2$—NHCONH—$(CH_2)_4$—, —CONH—CH(OH) $CH_2$—NHCONH—$(CH_2)_2$—, —CONH—CH(OH)$CH_2$—NHCONH—$(CH_2)_3$—, —CONH—CH(OH) $CH_2$—NHCONH—$(CH_2)_4$—, —NHCONH—CH(OH)$CH_2$—NHCONH—$(CH_2)_2$—, —NHCONH—CH(OH)$CH_2$—NHCONH—$(CH_2)_3$—, and —NHCONH—CH(OH)$CH_2$—NHCONH—$(CH_2)_4$—.

The "alkylene group having 1 to 21 carbon atoms which has a hydroxy group as a substituent" in $A_1$ in General Formula (1) is preferably an alkylene group having 2 to 11 carbon atoms and a hydroxy group as a substituent. Specific examples include —CH(OH)—$CH_2$—, —CH(OH)—$(CH_2)_2$—, —CH(OH)—$(CH_2)_3$—, —CH(OH)—$(CH_2)_4$—, —$C_5H_7$(OH)—$CH_2$—, —$C_5H_7$(OH)—$(CH_2)_2$—, —$C_5H_7$(OH)—$(CH_2)_3$—, —$C_5H_7$(OH)—$(CH_2)_4$—, —$C_6H_9$(OH)—$CH_2$—, —$C_6H_9$(OH)—$(CH_2)_2$—, —$C_6H_9$(OH)—$(CH_2)_3$—, —$C_6H_9$(OH)—$(CH_2)_4$—, —$C_7H_{11}$(OH)—$CH_2$—, —$C_7H_{11}$(OH)—$(CH_2)_2$—, —$C_7H_{11}$(OH)—$(CH_2)_3$—, and —$C_7H_{11}$(OH)—$(CH_2)_4$—.

For $A_1$ in General Formula (1), "an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1) below" and "an alkylene group having 1 to 21 carbon atoms" are preferable. Among the groups, an alkylene group having 1 to 21 carbon atoms and groups represented by General Formulas (21-1) to (21-5) are more preferable.

Further, when Dye in General Formula (1) is a dye residue represented by General Formula (I), for $A_1$ in General Formula (1), among the above-described more preferable examples of the $A_1$, the group represented by General Formula (21-1), (21-3), or (21-5) is even more preferable, and the group represented by General Formula (21-1) is particularly preferable. More specific examples include:

—COO—CH$_2$—, —COO—(CH$_2$)$_2$—, —COO—(CH$_2$)$_3$—, —COO—(CH$_2$)$_4$—, —COO—(CH$_2$)$_5$—, —COO—(CH$_2$)$_6$—, —CONH—CH$_2$—, —CONH—(CH$_2$)$_2$—, —CONH—(CH$_2$)$_3$—, —CONH—(CH$_2$)$_4$—, —CONH—(CH$_2$)$_5$—, —CONH—(CH$_2$)$_6$—,

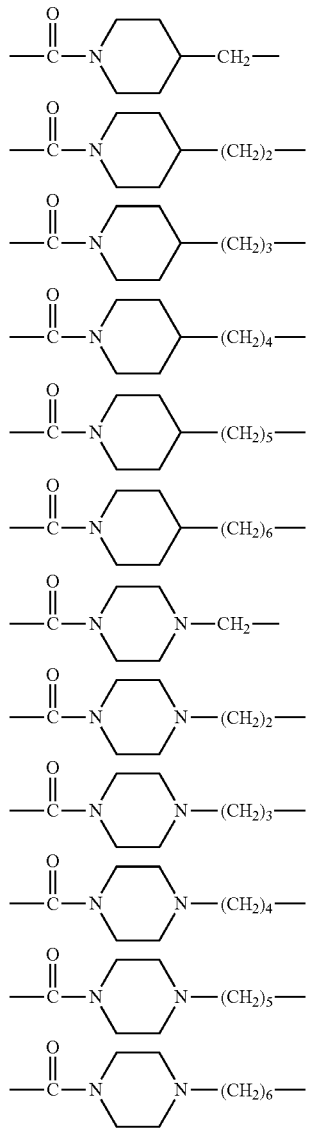

—COO—CH$_2$—O—CH$_2$—, —COO—(CH$_2$)$_2$—(CH$_2$)$_2$—, —COO—(CH$_2$)$_3$—O—(CH$_2$)$_3$—, —COO—CH$_2$—COO—CH$_2$—, —COO—(CH$_2$)$_2$—COO—(CH$_2$)$_2$—, —COO—(CH$_2$)$_3$—COO—(CH$_2$)$_3$—, —COO—CH$_2$—NHCONH—CH$_2$—, —COO—(CH$_2$)$_2$—NHCONH—(CH$_2$)$_2$—, —COO—(CH$_2$)$_3$—NHCONH—(CH$_2$)$_3$—, —COO—CH$_2$—O—CONH—CH$_2$—, —COO—(CH$_2$)$_2$—O—CONH—(CH$_2$)$_2$—, —COO—(CH$_2$)$_3$—O—CONH—(CH$_2$)$_3$—, —CONH—CH$_2$—O—CH$_2$—, —CONH—(CH$_2$)$_2$—O—(CH$_2$)$_2$—, —CONH—(CH$_2$)$_3$—O—(CH$_2$)$_3$—, —CONH—CH$_2$—COO—CH$_2$—, —CONH—(CH$_2$)$_2$—COO—(CH$_2$)$_2$—, —CONH—(CH$_2$)$_3$—COO—(CH$_2$)$_3$—, —CONH—CH$_2$—NHCONH—CH$_2$—, —CONH—(CH$_2$)$_2$—NHCONH—(CH$_2$)$_2$—, —CONH—(CH$_2$)$_3$—NHCONH—(CH$_2$)$_3$—, —CONH—CH$_2$—O—CONH—CH$_2$—, —CONH—(CH$_2$)$_2$—O—CONH—(CH$_2$)$_2$—, —CONH—(CH$_2$)$_3$—O—CONH—(CH$_2$)$_3$—, —COO—(CH$_2$)$_2$—OCO—CH$_2$—COO—(CH$_2$)$_2$—, —COO—(CH$_2$)$_2$—OCO—(CH$_2$)$_2$—COO—(CH$_2$)$_2$—, —COO—(CH$_2$)$_2$—OCO—(CH$_2$)$_3$—COO—(CH$_2$)$_2$—, —CONH—(CH$_2$)$_2$—OCO—CH$_2$—COO—(CH$_2$)$_2$—, —CONH—(CH$_2$)$_2$—OCO—(CH$_2$)$_2$—COO—(CH$_2$)$_2$—, and —CONH—(CH$_2$)$_2$—OCO—(CH$_2$)$_3$—COO—(CH$_2$)$_2$—.

Among the groups,
—COO—CH$_2$—, —COO—(CH$_2$)$_2$—, —COO—(CH$_2$)$_3$—, —COO—(CH$_2$)$_4$—, —COO—(CH$_2$)$_5$—, —COO—(CH$_2$)$_6$—,

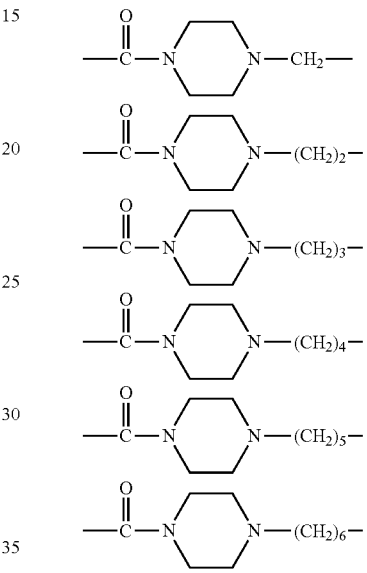

—CONH—CH$_2$—NHCONH—CH$_2$—, —CONH—(CH$_2$)$_2$—NHCONH—(CH$_2$)$_2$—, —CONH—(CH$_2$)$_3$—NHCONH—(CH$_2$)$_3$—, —CONH—(CH$_2$)$_2$—OCO—CH$_2$—COO—(CH$_2$)$_2$—, —CONH—(CH$_2$)$_2$—OCO—(CH$_2$)$_2$—COO—(CH$_2$)$_2$—, and —CONH—(CH$_2$)$_2$—OCO—(CH$_2$)$_3$—COO—(CH$_2$)$_2$— are preferable, —COO—CH$_2$—, —COO—(CH$_2$)$_2$—, —COO—(CH$_2$)$_3$—, and —COO—(CH$_2$)$_4$— are more preferable, and —COO—(CH$_2$)$_2$— is particularly preferable.

When Dye in General Formula (1) is a dye residue represented by General Formula (II), preferable examples of the A$_1$ in General Formula (1) are the same as examples for A$_1$ in "a case where Dye in General Formula (1) is a dye residue represented by General Formula (II)".

When Dye in General Formula (1) is a dye residue represented by General Formula (III), and Ar$_3$ in General Formula (III) is a benzene ring, as A$_1$ in General Formula (1), among the above-described more preferable examples of A$_1$, the group represented by General Formula (21-1), (21-3) or (21-5) is even more preferable, and the group represented by General Formula (21-1) is particularly preferable.

More specific examples include —COO—CH$_2$—, —COO—(CH$_2$)$_2$—, —COO—(CH$_2$)$_3$—, —COO—(CH$_2$)$_4$—, —COO—(CH$_2$)$_5$—, —COO—(CH$_2$)$_6$—, —COO—CH$_2$—O—CH$_2$—, —COO—(CH$_2$)$_2$—O—(CH$_2$)$_2$—, —COO—(CH$_2$)$_3$—O—(CH$_2$)$_3$—, —COO—CH$_2$—COO—CH$_2$—, —COO—(CH$_2$)$_2$—COO—(CH$_2$)$_2$—, COO(CH$_2$)$_3$—COO—(CH$_2$)$_3$—, —COO—CH$_2$—NHCONH—CH$_2$—, —COO—(CH$_2$)$_2$—NHCONH—(CH$_2$)$_2$—,
—COO—(CH$_2$)$_3$—NHCONH—(CH$_2$)$_3$—, —COO—CH$_2$—O—CONH—CH$_2$—, —COO—(CH$_2$)$_2$—O—CONH—(CH$_2$)$_2$—, —COO—(CH$_2$)$_3$—O—CONH—(CH$_2$)$_3$—,
—COO—(CH$_2$)$_2$—OCO—CH$_2$—COO—(CH$_2$)$_2$—,
—COO—(CH$_2$)$_2$—OCO—(CH$_2$)$_2$—COO—(CH$_2$)$_2$—,
—COO—(CH$_2$)$_2$—OCO—(CH$_2$)$_3$—COO—(CH$_2$)$_2$—.

Among the groups, —COO—CH$_2$—, —COO—(CH$_2$)$_2$—, —COO—(CH$_2$)$_3$—, —COO—(CH$_2$)$_4$—, —COO—(CH$_2$)$_5$—, —COO—(CH$_2$)$_6$— are preferable, —COO—CH$_2$—, —COO—(CH$_2$)$_2$—, —COO—(CH$_2$)$_3$—, —COO—(CH$_2$)$_4$— are more preferable, and —COO—(CH$_2$)$_2$— is particularly preferable.

Dye in General Formula (1) is a dye residue represented by General Formula (III), and Ar$_3$ in General Formula (III) is a naphthalene ring, for A$_1$ in General Formula (1), among the above-described more preferable examples of A$_1$, the group represented by General Formula (21-1) or (21-3) is more preferable, and the group represented by General Formula (21-1) is particularly preferable. More specific examples include: —NHCONH—CH$_2$—, —NHCONH—(CH$_2$)$_2$—, —NHCONH—(CH$_2$)$_3$—, —NHCONH—(CH$_2$)$_4$—, —NHCONH—(CH$_2$)$_5$—, —NHCONH—(CH$_2$)$_6$—, —NHCO—CH$_2$—O—CH$_2$—, —NHCO—(CH$_2$)$_2$—O—(CH$_2$)$_2$—, —NHCO—(CH$_2$)$_3$—O—(CH$_2$)$_3$—, —NHCO—CH$_2$—COO—CH$_2$—, —NHCO—(CH$_2$)$_2$—COO—(CH$_2$)$_3$—, —NHCO—(CH$_2$)$_2$—COO—(CH$_2$)$_3$—, —NHCO—CH$_2$—NHCONH—CH$_2$—, —NHCO—(CH$_2$)$_2$—NHCONH—(CH$_2$)$_2$—, —NHCO—(CH$_2$)$_3$—NHCONH—(CH$_2$)$_3$—, —NHCO—CH$_2$—O—CONH—CH$_2$—, —NHCO—(CH$_2$)$_2$—O—CONH—(CH$_2$)$_2$—, —NHCO—(CH$_2$)$_3$—O—CONH—(CH$_2$)$_3$—. Among the groups, —NHCONH—CH$_2$—, —NHCONH—(CH$_2$)$_2$—, —NHCONH—(CH$_2$)$_3$—, —NHCONH—(CH$_2$)$_4$—, —NHCONH(—CH$_2$)$_5$—, —NHCONH—(CH$_2$)$_6$— are preferable, —NHCONH—CH$_2$—, —NHCONH—(CH$_2$)$_2$—, —NHCONH—(CH$_2$)$_3$—, —NHCONH—(CH$_2$)$_4$— are more preferable, and —NHCONH—(CH$_2$)$_2$— is particularly preferable.

When Dye in General Formula (1) is a dye residue represented by General Formula (IV), For A$_1$ in General Formula (1), among the above-described preferable examples of A$_1$, an alkylene group having a linear carbon atom having 1 to 6 carbon atoms and the group represented by General Formula (21-1), (21-2), or (21-4) are even more preferable, and the group represented by General Formula (21-1) is particularly preferable. More specific examples include: a methylene group, an ethylene group, a trimethylene group, a tetramethylene group, a pentamethylene group, a hexamethylene group, —COO—CH$_2$—, —COO—(CH$_2$)$_2$—, —COO—(CH$_2$)$_3$—, —COO—(CH$_2$)$_4$—, —COO—(CH$_2$)$_5$—, —COO—(CH$_2$)$_6$—, —CH$_2$—COO—CH$_2$—, —CH$_2$—COO—(CH$_2$)$_2$—, —CH$_2$—COO—(CH$_2$)$_3$—,
—(CH$_2$)$_2$—COO—CH$_2$—, —(CH$_2$)$_2$—COO—(CH$_2$)$_2$—, —(CH$_2$)$_2$—COO—(CH$_2$)$_3$—, —(CH$_2$)$_3$—COO—CH$_2$—, —(CH$_2$)$_3$—COO—(CH$_2$)$_2$—, —(CH$_2$)$_3$—COO—(CH$_2$)$_3$—, —CH$_2$—OCO—CH$_2$—COO—(CH$_2$)$_2$—, —CH$_2$—OCO—(CH$_2$)$_2$—COO—(CH$_2$)$_2$—, —CH$_2$—OCO—(CH$_2$)$_3$—COO—(CH$_2$)$_2$—, —(CH$_2$)$_2$—OCO—CH$_2$—COO—(CH$_2$)$_2$—, —(CH$_2$)$_2$—OCO—(CH$_2$)$_2$—COO—(CH$_2$)$_2$—, —(CH$_2$)$_2$—OCO—(CH$_2$)$_3$—COO—(CH$_2$)$_2$—. Among the alkylene groups, a methylene group, an ethylene group, a trimethylene group, a tetramethylene group, —COO—CH$_2$—, —COO—(CH$_2$)$_2$—, —COO—(CH$_2$)$_3$—, —COO—(CH$_2$)$_4$—, —COO—(CH$_2$)$_5$—, —COO—(CH$_2$)$_6$—, —CH$_2$—COO—CH$_2$—, —CH$_2$—COO—(CH$_2$)$_2$—, —CH$_2$—COO—(CH$_2$)$_3$—, —(CH$_2$)$_2$—OCO—CH$_2$—COO—(CH$_2$)$_2$—, —(CH$_2$)$_2$—OCO—(CH$_2$)$_2$—COO—(CH$_2$)$_2$—, —(CH$_2$)$_2$—OCO—(CH$_2$)$_3$—COO—(CH$_2$)$_2$— are preferable, —COO—CH$_2$—, —COO—(CH$_2$)$_2$—, —COO—(CH$_2$)$_3$—, —COO—(CH$_2$)$_4$— are more preferable, and —COO—(CH$_2$)$_2$— is particularly preferable.

When Dye in General Formula (1) is a dye residue represented by General Formula (V), preferable examples of A$_1$ in General Formula (1) are the same as A$_1$ in the above-described "when Dye in General Formula (1) is a dye residue represented by General Formula (IV)".

When Dye in General Formula (1) is a dye residue represented by General Formula (VI), for A$_1$ in General Formula (1), among the above-described more preferable examples of A$_1$, an alkylene group having 1 to 12 carbon atoms is even more preferable, and a linear alkylene group having 1 to 6 carbon atoms is particularly preferable. More specifically, a methylene group, an ethylene group, a trimethylene group, a tetramethylene group, a pentamethylene group, and a hexamethylene group are preferable, a methylene group, an ethylene group, a trimethylene group, and a tetramethylene group are more preferable, and an ethylene group is particularly preferable.

In a case where Dye in General Formula (1) is a dye residue represented by General Formula (VII), A$_1$ in General Formula (1) is more preferably, among the more preferable examples of the above-described A$_1$, the group represented by General Formula (21-2) or (21-4), and particularly preferably the group represented by General Formula (21-4). More specific examples include: —CH$_2$—O—CH$_2$—, —CH$_2$—O—(CH$_2$)$_2$—, —CH$_2$—O—(CH$_2$)$_3$—, —(CH$_2$)$_2$—O—CH$_2$—, —(CH$_2$)$_2$—O—(CH$_2$)$_2$—, —(CH$_2$) 2-O—(CH$_2$)$_3$—, —(CH$_2$)$_3$—O—CH$_2$—, —(CH$_2$) 3-O—(CH$_2$)$_2$—, —(CH$_2$) 3-O—(CH$_2$)$_3$—, —CH$_2$—COO—CH$_2$—, —CH$_2$—COO—(CH$_2$)$_2$—, —CH$_2$—COO—(CH$_2$)$_3$—, —(CH$_2$)$_2$—COO—CH$_2$—, —(CH$_2$)$_2$—COO—(CH$_2$)$_2$—, —(CH$_2$)$_2$—COO—(CH$_2$)$_3$—,
—(CH$_2$)$_3$—COO—CH$_2$—, —(CH$_2$)$_3$—COO—(CH$_2$)$_2$—, —(CH$_2$)$_3$—COO—(CH$_2$)$_3$—, —CH$_2$—CONH—CH$_2$—, —CH$_2$—CONH—(CH$_2$)$_2$—, —CH$_2$—CONH—(CH$_2$)$_3$—, —(CH$_2$)$_2$—CONH—CH$_2$—, —(CH$_2$)$_2$—CONH—(CH$_2$)$_2$—, —(CH$_2$)$_2$—CONH—(CH$_2$)$_3$—, —(CH$_2$)$_3$—CONH—CH$_2$—, —(CH$_2$)$_3$—CONH—(CH$_2$)$_2$—, —(CH$_2$)$_3$—CONH—(CH$_2$)$_3$—, —CH$_2$—OCO—CH$_2$—COO—(CH$_2$)$_2$—, —CH$_2$—OCO—(CH$_2$)$_2$—COO—(CH$_2$)$_2$—, —CH$_2$—OCO—(CH$_2$)$_3$—COO—(CH$_2$)$_2$—, —CH$_2$—OCO—(CH$_2$)$_4$—COO—(CH$_2$)$_2$—, —CH$_2$—OCO—(CH$_2$)$_5$—COO—(CH$_2$)$_2$—, —CH$_2$—OCO—(CH$_2$)$_6$—COO—(CH$_2$)$_2$—, —CH$_2$—OCO—(CH$_2$)$_7$—COO—(CH$_2$)$_2$—, —CH$_2$—OCO—C$_6$H$_4$—COO—(CH$_2$)$_2$—, —(CH$_2$)$_2$—OCO—CH$_2$—COO—(CH$_2$)$_2$—, —(CH$_2$)$_2$—OCO—(CH$_2$)$_2$—COO—(CH$_2$)$_2$—, —(CH$_2$)$_2$—OCO—(CH$_2$)$_3$—COO—(CH$_2$)$_2$—, —(CH$_2$)$_2$—OCO—(CH$_2$) 4-COO—(CH$_2$)$_2$—, —(CH$_2$)$_2$—OCO—(CH$_2$)$_5$—COO—(CH$_2$)$_2$—, —(CH$_2$)$_2$—OCO—(CH$_2$)$_6$—COO—(CH$_2$)$_2$—, —(CH$_2$)$_2$—OCO—(CH$_2$)$_7$—COO—(CH$_2$)$_2$—, —(CH$_2$)$_2$—OCO—C$_6$H$_4$—COO—(CH$_2$)$_2$—.

Among the groups, —CH$_2$—COO—CH$_2$—, —CH$_2$—COO—(CH$_2$)$_2$—, —CH$_2$—COO—(CH$_2$)$_3$—, —CH$_2$—

OCO—CH$_2$—COO—(CH$_2$)$_2$—, —CH$_2$—OCO—(CH$_2$)$_2$—COO—(CH$_2$)$_2$—, —CH$_2$—OCO—(CH$_2$)$_3$—COO—(CH$_2$)$_2$—, —CH$_2$—OCO—(CH$_2$)$_4$—COO—(CH$_2$)$_2$—, —CH$_2$—OCO—(CH$_2$)$_5$—COO—(CH$_2$)$_2$—, —CH$_2$—OCO—(CH$_2$)$_6$—COO—(CH$_2$)$_2$—, —CH$_2$—OCO—(CH$_2$)$_7$—COO—(CH$_2$)$_2$—, —CH$_2$—OCO—C$_6$H$_4$—COO—(CH$_2$)$_2$— are preferable, —CH$_2$—OCO—CH$_2$—COO—(CH$_2$)$_2$—, —CH$_2$—OCO—(CH$_2$)$_2$—COO—(CH$_2$)$_2$—, —CH$_2$—OCO—(CH$_2$)$_3$—COO—(CH$_2$)$_2$— are more preferable, and —CH$_2$—OCO—(CH$_2$)$_2$—COO—(CH$_2$)$_2$— is particularly preferable.

For a method for producing the compound represented by General Formula (1) of the present invention, a known method may be used. For example, in a case where Dye in General Formula (1) is a dye residue represented by General Formula (I) or (II), the production methods described in International Publication WO 2014-126167, International Publication WO 2015-147285, International Publication WO 2016-98889, and others may be used; in a case where Dye in General Formula (1) is a dye residue represented by General Formula (III), the production methods described in International Publication WO 2015-98999, International Publication WO 2015-182680, and others may be used; and in a case where Dye in General Formula (1) is a dye residue represented by General Formula (IV) or (V), the production methods described International Publication WO 2015-133578 may be used.

The production method in a case where Dye in General Formula (1) is the dye residue represented by General Formula (VI) will be described later in [Compound represented by General Formula (2)]; and the production method in a case where Dye in General Formula (1) is the dye residue represented by General Formula (VII) will be described in detail later in [Compound represented by General Formula (3)].

[Compound Represented by General Formula (2)]

The compound of the present invention is the compound represented by General Formula (2) below:

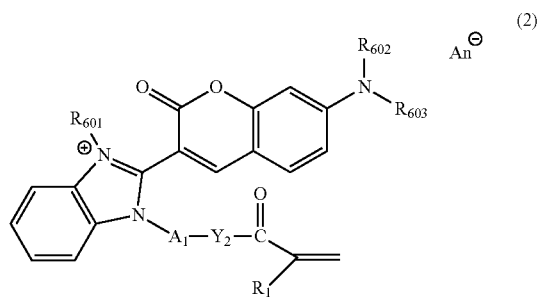

{where R$_1$ represents a hydrogen atom or a methyl group,

R$_{601}$ represents an alkyl group having 1 to 6 carbon atoms,

R$_{602}$ and R$_{603}$ each independently represent an alkyl group having 1 to 30 carbon atoms, Y$_2$ represents —O— or —NR$_{10}$—, where R$_{10}$ represents a hydrogen atom or an alkyl group having 1 to 12 carbon atoms, An$^-$ represents an anion, A$_1$ represents —O—, —OCO—, —COO—, —NHCO—, —CONH—, —NHCONH—, an arylene group, and the group represented by General Formula (2-1) below:

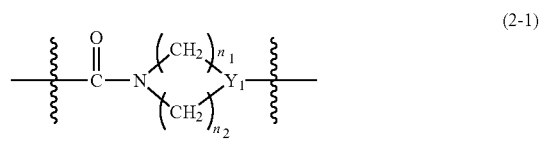

[where Y$_1$ represents a nitrogen atom or the group represented by Formula (2-2) below:

n$_1$ represents an integer from 0 to 2, and n$_2$ represents an integer from 2 to 4, where n$_1$+n$_2$ is 3 or 4];

an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1), and also has a hydroxy group as a substituent;

an alkylene group having 1 to 21 carbon atoms which has a hydroxy group as a substituent; or an alkylene group having 1 to 21 carbon atoms}.

The compound of the present invention represented by the above General Formula (2) is a compound of Basic Yellow 40 type in which Dye (dye residue) in General Formula (1) is the above General Formula (VI). The compound has a yellow hue and can be suitably used as a polymerizable dye excellent in thermal resistance, water resistance, light resistance and the like.

The description of R$_1$, R$_{601}$, R$_{602}$, R$_{603}$, Y$_2$, An$^-$, A$_1$, General Formulas (2-1) and (2-2) in General Formula (2) and the combination of the preferable functional groups and the like have been described above, and thus descriptions thereof are omitted.

The compound of the present invention represented by General Formula (2) can be produced, for example, by a series of methods shown in the following reactions [I] to [III]. That is, first, a compound represented by General Formula (101) below is subjected to mesylation or tosylation to obtain the compound represented by General Formula (102) below (reaction [I]). Next, the obtained compound represented by General Formula (102) is reacted with the compound represented by General Formula (103) below to obtain the compound represented by General Formula (104) (reaction [II]). Thereafter, the obtained compound represented by General Formula (104) is reacted with the compound represented by General Formula (105) below, and then may be subjected to a salt formation reaction (reaction [III]):

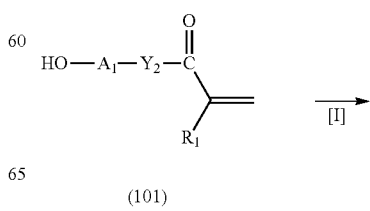

(101)

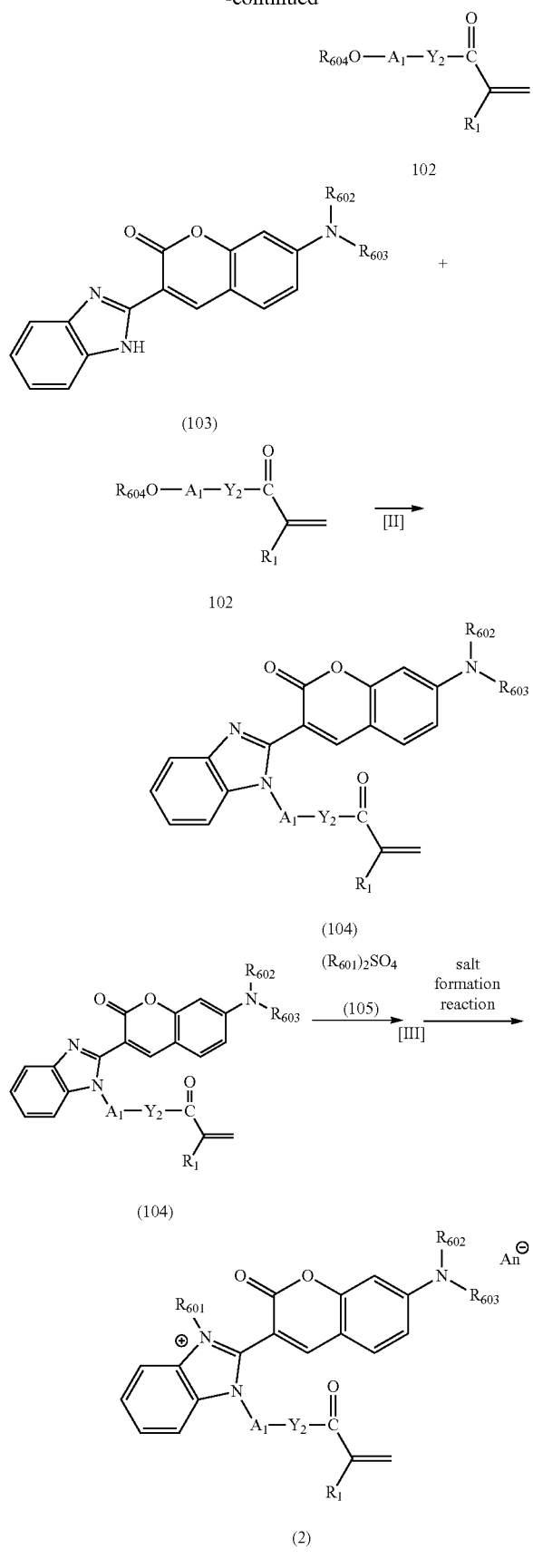

{where $R_1$, $R_{601}$ to $R_{603}$, $Y_2$, $An^-$, and $A_1$ are the same as described above, and $R_{604}$ represent a methylsulfonyl group (mesyl group) or a p-toluenesulfonyl group (tosyl group)}.

For $R_{60}4$ General Formula (102), a mesyl group is preferable.

In the reaction [I], the mesylation or tosylation of the compound represented by General Formula (101) is carried out in a solvent in the presence of a base, usually at −10 to 80° C., preferably at 0 to 50° C. for 1 to 24 hours, and preferably for 3 to 10 hours.

In a case where the mesylation is performed in the reaction [I], for example, the compound represented by General Formula (101) may be reacted with methanesulfonyl chloride. At this time, the amount of the methanesulfonyl chloride to be used is usually from 1 to 2 equivalents, and preferably from 1 to 1.5 equivalents with respect to the number of moles of the compound represented by General Formula (101).

In a case where tosylation is performed in the reaction [I], for example, the compound represented by General Formula (101) may be reacted with p-toluenesulfonyl chloride. At this time, the amount of the p-toluenesulfonyl chloride to be used is usually from 1 to 2 equivalents, and preferably from 1 to 1.5 equivalents with respect to the number of moles of the compound represented by General Formula (101).

Examples of the above base include amines such as triethylamine for mesylation, and pyridine for tosylation. The amount of the base to be used is usually from 1 to 2 equivalents, and preferably from 1 to 1.5 equivalents with respect to the number of moles of the compound represented by General Formula (101).

Examples of the solvent include organic solvents such as methanol, ethanol, isopropyl alcohol, tetrahydrofuran, dioxane, N,N-dimethylformamide, dichloromethane, dichloroethane, and ethyl acetate. Among the solvents, dichloromethane is preferable. The solvents may be used alone or in combination of two or more. The amount of the solvent to be used is usually from 0.1 to 100 ml, preferably from 1 to 50 ml with respect to 1 mmol of the compound represented by General Formula (101).

Specific examples of the compound represented by General Formula (101) include hydroxymethyl methacrylate, 2-hydroxyethyl methacrylate, 3-hydroxypropyl methacrylate, 4-hydroxybutyl methacrylate, 5-hydroxypentyl methacrylate, and 6-hydroxyhexyl methacrylate. Among the compounds, hydroxymethyl methacrylate, 2-hydroxyethyl methacrylate, 3-hydroxypropyl methacrylate, and 4-hydroxybutyl methacrylate are preferable, 2-hydroxyethyl methacrylate is more preferable. The compound represented by General Formula (101) may be a commercially available compound or a compound appropriately synthesized by a known method.

In the reaction [II], the compound represented by General Formula (102) and the compound represented by General Formula (103) are reacted in a solvent in the presence of a catalyst, usually at 0 to 80° C., preferably at 10 to 50° C. for 1 to 24 hours, and preferably for 2 to 10 hours.

Specific examples of the compound represented by General Formula (103) include 3-(2-benzimidazolyl)-7-(dimethylamino) coumarin, 3-(2-benzimidazolyl)-7-(diethylamino) coumarin, 3-(2-benzimidazolyl)-7-(di-n-propylamino) coumarin, 3-(2-benzimidazolyl)-7-(diisopropylamino) coumarin, 3-(2-benzimidazolyl)-7-(di-n-butylamino) coumarin, 3-(2-benzimidazolyl)-7-(diisobutylamino) coumarin, 3-(2-benzimidazolyl)-7-(di-sec-butylamino) coumarin, 3-(2-benzimidazolyl)-7-(di-tert-butylamino)coumarin, 3-(2-benzimidazolyl)-7-(di-n-pentylamino)coumarin, 3-(2- benzimidazolyl)-7-(di-isopentylamino)coumarin, and 3-(2-benzimidazolyl)-7-(di-n-hexylamino)coumarin. Among the compounds, 3-(2-benzimidazolyl)-7-(diethylamino)coumarin (coumarin 7) is preferable. For the compound represented by General Formula (103), a commercially available compound or a compound appropriately synthesized by a known method may be used.

The amount of the compound represented by General Formula (102) to be used is usually from 1 to 5 equivalents, and preferably from 2 to 3 equivalents with respect to the number of moles of the compound represented by General Formula (103).

Examples of the catalyst include alkali metal carbonates such as sodium carbonate, potassium carbonate, and cesium carbonate. The amount of the catalyst to be used is usually from 1 to 5 equivalents, and preferably from 2 to 3 equivalents with respect to the number of moles of the compound represented by General Formula (103).

Examples of the solvent include organic solvents such as methanol, ethanol, isopropyl alcohol, tetrahydrofuran, dioxane, N, N-dimethylformamide, dichloromethane, dichloroethane, and ethyl acetate. Among the solvents, N, N-dimethylformamide is preferable. The solvents may be used alone or in combination of two or more. The amount of the solvent to be used is usually from 0.1 to 100 ml, and preferably from 1 to 50 ml with respect to 1 mmol of the compound represented by General Formula (103).

In the reaction [III], the compound represented by General Formula (104) and the compound represented by General Formula (105) are mixed in a solvent at usually 0 to 80° C., preferably 10 to 50° C. for usually 1 to 24 hours, preferably 6 to 18 hours, then, a salt of an anion represented by $An^-$ and water are added, and the mixture is reacted at 0 to 80° C., preferably 10 to 50° C. for usually 10 minutes to 12 hours, and preferably for 20 minutes to 6 hours.

Specific examples of the compound represented by General Formula (105) include dimethyl sulfate, diethyl sulfate, di-n-propyl sulfate, diisopropyl sulfate, di-n-butyl sulfate, diisobutyl sulfate, and di-sec-butyl sulfate, and di-tert-butyl sulfate. Among the compounds, dimethyl sulfate and diethyl sulfate are preferable, and dimethyl sulfate is more preferable. For the compound represented by General Formula (105), a commercially available compound or a compound appropriately synthesized by a known method may be used.

The amount of the compound represented by General Formula (105) to be used is usually from 1 to 5 equivalents, and preferably 2 to 3 equivalents with respect to the number of moles of the compound represented by General Formula (104).

Examples of the solvent include organic solvents such as methanol, ethanol, isopropyl alcohol, tetrahydrofuran, dioxane, N, N-dimethylformamide, dichloromethane, dichloroethane, and ethyl acetate. Among the solvents, dichloromethane is preferable. The solvents may be used alone or in combination of two or more. The amount of the solvent to be used is usually from 0.1 to 100 ml, and preferably from 1 to 50 ml with respect to 1 mmol of the compound represented by General Formula (104).

Examples of the salt of the anion represented by $An^-$ include an alkali metal salt of the anion represented by $An^-$ or an inorganic acid.

Examples of the alkali metal salt of the anion represented by $An^-$ include a salt formed of an anion represented by $An^-$ and an alkali metal such as sodium, potassium, and lithium. Among the salts, a salt including an anion represented by $An^-$ and potassium or lithium is preferable. The amount of the alkali metal salt of the anion represented by $An^-$ to be used is usually from 1 to 5 equivalents, and preferably from 1.5 to 2 equivalents with respect to the number of moles of the compound represented by General Formula (104).

Examples of the inorganic acid include hydrochloric acid, hydrogen bromide, hydrogen iodide, hypochlorous acid, chlorous acid, chloric acid, perchloric acid, hexafluorophosphoric acid, and hexafluoroantimonic acid. Among the inorganic acids, hydrochloric acid, perchloric acid, hexafluorophosphoric acid, and hexafluoroantimonic acid are preferable. The amount of the inorganic acid to be used is usually from 1 to 50 equivalents, and preferably from 1 to 10 equivalents with respect to the number of moles of the compound represented by General Formula (104).

The amount of water to be used is usually from 0.1 to 100 ml, and preferably from 1 to 50 ml with respect to 1 mmol of the compound represented by General Formula (104).

The pressure during the reaction in the reactions [I] to [III] is not particularly limited as long as a series of reactions is carried out without delay, and may be, for example, normal pressure.

As to the reactions [I] to [III], the reactants and products obtained after the reactions may be isolated, as necessary, by general post-treatment operations and purification operations usually performed in this field. Specifically, for example, a reaction product and a product obtained by performing filtration, washing, extraction, concentration under reduced pressure, recrystallization, distillation, column chromatography and the like may be isolated.

[Compound Represented by General Formula (3)]

The compound of the present invention is represented by General Formula (3) below:

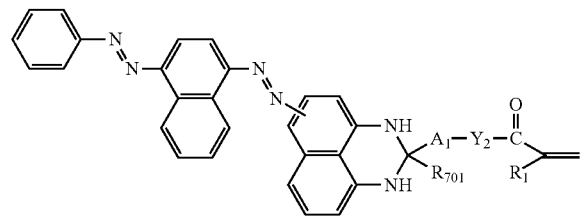

(3)

{where $R_1$ represents a hydrogen atom or a methyl group, $R_{701}$ represents an alkyl group having 1 to 30 carbon atoms, $Y_2$ represents —O— or —$NR_{10}$—, where $R_{10}$ represents a hydrogen atom or an alkyl group having 1 to 12 carbon atoms, $A_1$ represents an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and a group represented by General Formula (2-1) below:

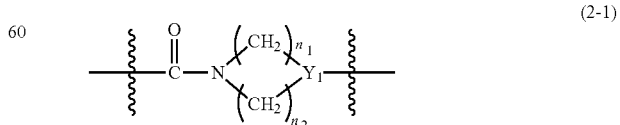

(2-1)

[where $Y_1$ represents a nitrogen atom or the group represented by General Formula (2-2) below:

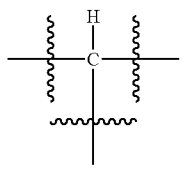

(2-2)

$n_1$ represents an integer from 0 to 2, and $n_2$ represents an integer from 2 to 4, where $n_1+n_2$ is 3 or 4];
an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1), and also has a hydroxy group as a substituent;
an alkylene group having 1 to 21 carbon atoms which has a hydroxy group as a substituent; or an alkylene group having 1 to 21 carbon atoms}.

The compound of the present invention represented by the above General Formula (3) is a Solvent Black 3 type compound in which Dye (dye residue) in the above General Formula (1) is the above General Formula (VII), and has a black hue. It can be suitably used as a polymerizable dye having excellent thermal resistance, water resistance, light resistance and the like.

The description of $R_1$, $R_{701}$, $Y_2$, $A_1$ in General Formula (3), General Formulas (2-1) and (2-2), and the combination of the preferable functional groups and the like are as described above, so the descriptions thereof are omitted.

For a method for producing the compound represented by the above General Formula (3) of the present invention, for example, a diazo coupling reaction may be carried out between the compound represented by General Formula (111) below and 4-phenylazo-1-naphthylamine. (Reaction [IV]):

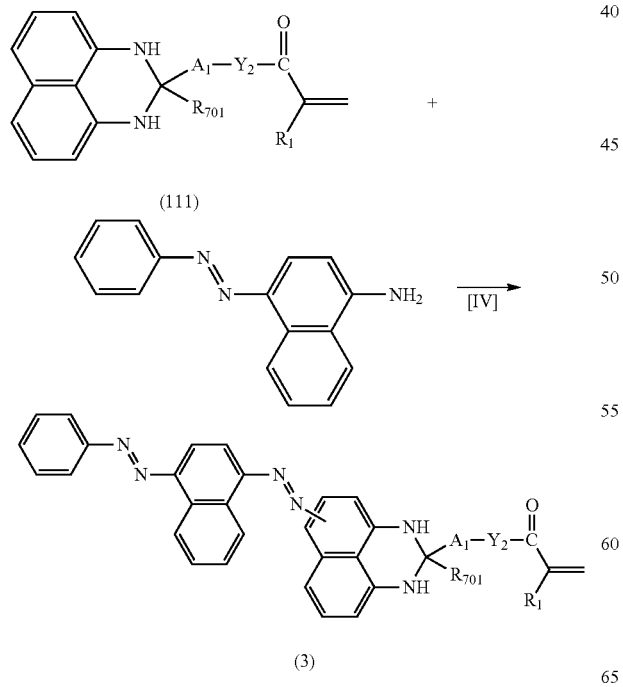

(where $R_1$, $R_{701}$, $Y_2$, and $A_1$ are the same as above).

The reaction [IV] may be performed in accordance with a known diazo coupling reaction method. Specifically, 4-phenylazo-1-naphthylamine is reacted with hydrochloric acid and sodium nitrite in water at 5° C. or lower (under ice water cooling), usually for 10 minutes to 12 hours, preferably for 30 minutes to 6 hours to obtain a diazo solution, and then the compound represented by General Formula (111) and the diazo solution are mixed to react in a solvent at 5° C. or lower (under ice water cooling) for usually 1 to 24 hours, preferably 2 to 10 hours.

The amount of the 4-phenylazo-1-naphthylamine to be used is usually from 1 to 2 equivalents, and preferably from 1 to 1.5 equivalents with respect to the number of moles of the compound represented by General Formula (111).

The amount of the above-described hydrochloric acid to be used is usually from 2 to 5 equivalents, and preferably from 2.5 to 4 equivalents with respect to the number of moles of 4-phenylazo-1-naphthylamine.

The amount of sodium nitrite to be used is usually from 1 to 2 equivalents, and preferably from 1 to 1.5 equivalents with respect to the number of moles of 4-phenylazo-1-naphthylamine.

The amount of water to be used is usually from 0.1 to 100 ml, preferably from 1 to 50 ml, with respect to 1 mmol of 4-phenylazo-1-naphthylamine.

Examples of the solvent include organic solvents such as methanol, ethanol, isopropyl alcohol, tetrahydrofuran, dioxane, N,N-dimethylformamide, dichloromethane, dichloroethane, and ethyl acetate. Among the solvents, tetrahydrofuran is preferable. The solvents may be used alone or in combination of two or more. The amount of the solvent to be used is usually 0.1 to 100 ml, and preferably 1 to 50 ml, with respect to 1 mmol of the compound represented by General Formula (111).

In a case where, for example, among the compounds represented by General Formula (111), $A_1$ is General Formula (21-4) (the compound represented by General Formula (115) below), the compound represented by General Formula (111) can be produced by a series of methods shown in the following reactions [V] and [VI]. That is, firstly, 1,8-naphthalenediamine is reacted with the compound represented by General Formula (112) below to obtain the compound represented by General Formula (113) below (reaction [V]). Next, the obtained compound represented by General Formula (113) may be reacted with the compound represented by General Formula (114) below (reaction [VI]):

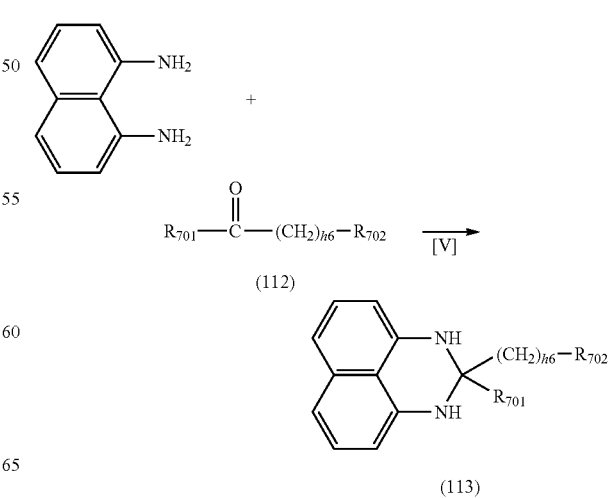

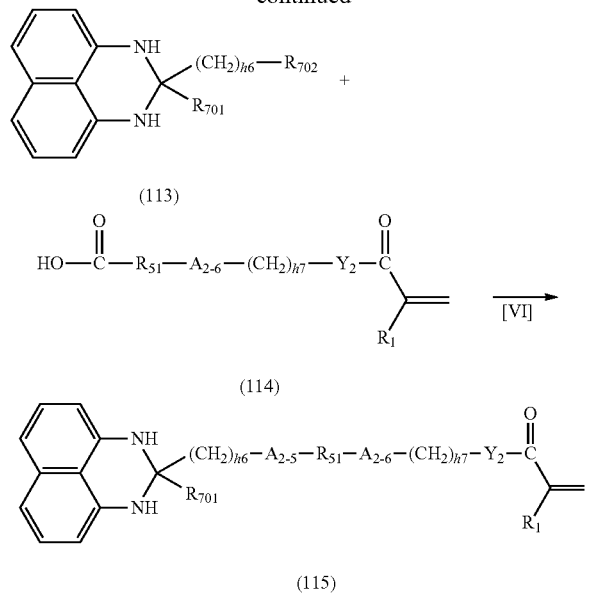

(where $R_1$, $R_{51}$, $R_{701}$, $Y_2$, $A_{2-5}$, $A_{2-6}$, $h_6$, and $h_7$ are the same as above, and $R_{702}$ represents a hydroxy group or an amino group).

When $R_{702}$ in General Formula (112) is a hydroxy group, $A_{2-5}$ represents —OCO—, and when $R_{702}$ is an amino group, $A_{2-5}$ represents —NHCO—. For $R_{702}$ in General Formula (112), it is preferably a hydroxy group.

In the reaction [V], 1,8-naphthalenediamine and the compound represented by General Formula (112) below are reacted usually at 10 to 100° C., preferably 60 to 100° C., usually for 1 to 24 hours, preferably for 3 to 10 hours.

Specific examples of the compound represented by General Formula (112) include: $CH_3$—CO—$CH_2$—OH, $CH_3$—CO—$(CH_2)_2$—OH, $CH_3$—CO—$(CH_2)_3$—OH, $CH_3$—$CH_2$—CO—$CH_2$—OH, $CH_3$—$CH_2$—CO—$(CH_2)_2$—OH, $CH_3$—$CH_2$—CO—$(CH_2)_3$—OH, $CH_3$—$(CH_2)_2$—CO—$CH_2$—OH, $CH_3$—$(CH_2)_2$—CO—$(CH_2)_2$—OH, $CH_3$—$(CH_2)_2$—CO—$(CH_2)_3$—OH, $CH(CH_3)_2$—CO—$CH_2$—OH, $CH(CH_3)_2$—CO—$(CH_2)_2$—OH, $CH(CH_3)_2$—CO—$(CH_2)_3$—OH, $CH_3$—$(CH_2)_3$—CO—$CH_2$—OH, $CH_3$—$(CH_2)_3$—CO—$(CH_2)_2$—OH, $CH_3$—$(CH_2)_3$—CO—$(CH_2)_3$—OH, $CH(CH_3)_2$—$CH_2$—CO—$CH_2$—OH, $CH(CH_3)_2$—$CH_2$—CO—$(CH_2)_2$—OH, $CH(CH_3)_2$—$CH_2$—CO—$(CH_2)_3$—OH, $CH_3$—$CH_2$—$CH(CH_3)$—CO—$CH_2$—OH, $CH_3$—$CH_2$—$CH(CH_3)$—CO—$(CH_2)_2$—OH, $CH_3$—$CH_2$—$CH(CH_3)$—CO—$(CH_2)_3$—OH, $C(CH_3)_3$—CO—$CH_2$—OH, $C(CH_3)_3$—CO—$(CH_2)_2$—OH, $C(CH_3)_3$—CO—$(CH_2)_3$—OH, $CH_3$—CO—$CH_2$—$NH_2$, $CH_3$—CO—$(CH_2)_2$—$NH_2$, $CH_3$—CO—$(CH_2)_3$—$NH_2$, $CH_3$—$CH_2$—CO—$CH_2$—$NH_2$, $CH_3$—$CH_2$—CO—$(CH_2)_2$—$NH_2$, $CH_3$—$CH_2$—CO—$(CH_2)_3$—$NH_2$, $CH_3$—$(CH_2)_2$—CO—$CH_2$—$NH_2$, $CH_3$—$(CH_2)_2$—CO—$(CH_2)_2$—$NH_2$, $CH_3$—$(CH_2)_2$—CO—$(CH_2)_3$—$NH_2$, $CH(CH_3)_2$—CO—$CH_2$—$NH_2$, $CH(CH_3)_2$—CO—$(CH_2)_2$—$NH_2$, $CH(CH_3)_2$—CO—$(CH_2)_3$—$NH_2$, $CH_3$—$(CH_2)_3$—CO—$CH_2$—$NH_2$, $CH_3$—$(CH_2)_3$—CO—$(CH_2)_2$—$NH_2$, $CH_3$—$(CH_2)_3$—CO—$(CH_2)_3$—$NH_2$, $CH(CH_3)_2$—$CH_2$—CO—$CH_2$—$NH_2$, $CH(CH_3)_2$—$CH_2$—CO—$(CH_2)_2$—$NH_2$, $CH(CH_3)_2$—$CH_2$—CO—$(CH_2)_3$—$NH_2$, $CH_3$—$CH_2$—$CH(CH_3)$—CO—$CH_2$—$NH_2$, $CH_3$—$CH_2$—$CH(CH_3)$—CO—$(CH_2)_2$—$NH_2$, $CH_3$—$CH_2$—$CH(CH_3)$—CO—$(CH_2)_3$—$NH_2$, $C(CH_3)_3$—CO—$CH_2$—$NH_2$, $C(CH_3)_3$—CO—$(CH_2)_2$—$NH_2$, $C(CH_3)_3$—CO—$(CH_2)_3$—$NH_2$.

Among the compounds, $CH_3$—CO—$CH_2$—OH, $CH_3$—CO—$(CH_2)_2$—OH, $CH_3$—CO—$(CH_2)_3$—OH, $CH_3$—$CH_2$—CO—$CH_2$—OH, $CH_3$—$CH_2$—CO—$(CH_2)_2$—OH, $CH_3$—$CH_2$—CO—$(CH_2)_3$—OH, $CH_3$—CO—$CH_2$—$NH_2$, $CH_3$—CO—$(CH_2)_2$—$NH_2$, $CH_3$—CO—$(CH_2)_3$—$NH_2$, $CH_3$—$CH_2$—CO—$CH_2$—$NH_2$, $CH_3$—$CH_2$—CO—$(CH_2)_2$—$NH_2$, $CH_3$—$CH_2$—CO—$(CH_2)_3$—$NH_2$ are referable, $CH_3$—CO—$CH_2$—OH, $CH_3$—CO—$(CH_2)_2$—OH, $CH_3$—$CH_2$—CO—$CH_2$—OH, $CH_3$—$CH_2$—CO—$(CH_2)_2$—OH are more preferable, and $CH_3$—CO—$CH_2$—OH(hydroxyacetone) is particularly preferable. The compound represented by General Formula (112) may be a commercially available product or a compound appropriately synthesized by a known method.

The amount of the compound represented by General Formula (112) to be used is usually from 1 to 2 equivalents, and preferably from 1 to 1.5 equivalents with respect to the number of moles of 1,8-naphthalenediamine.

In the reaction [VI], the compound represented by General Formula (113) and the compound represented by General Formula (114) are reacted in a solvent in the presence of a dehydrative condensation agent, usually at 0 to 80° C., preferably at 10 to 50° C. for usually 1 to 48 hours, and preferably for 6 to 24 hours.

Examples of the combination of $R_1$, $R_{51}$, $Y_2$, $A_{2-6}$ and $h_7$ in General Formula (114) include combinations described in the following table:

| $R_{51}$ | $A_{2-6}$ | $h_7$ | $Y_2$ | $R_1$ |
|---|---|---|---|---|
| Methylene group | —COO— | 1 to 3 | —O— | Hydrogen |
| Ethylene group | —COO— | 1 to 3 | or | atom or |
| Trimethylene group | —COO— | 1 to 3 | —NH— | Methyl |
| Tetramethylene group | —COO— | 1 to 3 | | group |
| Pentamaethylene group | —COO— | 1 to 3 | | |
| Hexamethylene group | —COO— | 1 to 3 | | |
| n-Heptylene group | —COO— | 1 to 3 | | |
| Phenylene group | —COO— | 1 to 3 | | |
| Methylene group | —CONH— | 1 to 3 | —O— | Hydrogen |
| Ethylene group | —CONH— | 1 to 3 | or | atom or |
| Trimethylene group | —CONH— | 1 to 3 | —NH— | Methyl |
| Tetramethylene group | —CONH— | 1 to 3 | | group |
| Pentamaethylene group | —CONH— | 1 to 3 | | |
| Hexamethylene group | —CONH— | 1 to 3 | | |
| n-Heptylene group | —CONH— | 1 to 3 | | |
| Phenylene group | —CONH— | 1 to 3 | | |

Among the above-described combinations, combinations 1 to 32 shown in the following table are preferable, combinations 1 to 16 are more preferable, combinations 1 to 3 and 9 to 11 are more preferable, and combination 10 is particularly preferable:

| Combination | $R_{51}$ | $A_{2-6}$ | $h_7$ | $Y_2$ | $R_1$ |
|---|---|---|---|---|---|
| 1 | Methylene group | —COO— | 2 | —O— | Hydrogen atom |
| 2 | Ethylene group | —COO— | 2 | —O— | Hydrogen atom |
| 3 | Trimethylene group | —COO— | 2 | —O— | Hydrogen atom |

-continued

| Combination | $R_{51}$ | $A_{2\text{-}6}$ | $h_7$ | $Y_2$ | $R_1$ |
|---|---|---|---|---|---|
| 4 | Tetramethylene group | —COO— | 2 | —O— | Hydrogen atom |
| 5 | Pentamaethylene group | —COO— | 2 | —O— | Hydrogen atom |
| 6 | Hexamethylene group | —COO— | 2 | —O— | Hydrogen atom |
| 7 | n-Heptylene group | —COO— | 2 | —O— | Hydrogen atom |
| 8 | Phenylene group | —COO— | 2 | —O— | Hydrogen atom |
| 9 | Methylene group | —COO— | 2 | —O— | Methyl group |
| 10 | Ethylene group | —COO— | 2 | —O— | Methyl group |
| 11 | Trimethylene group | —COO— | 2 | —O— | Methyl group |
| 12 | Tetramethylene group | —COO— | 2 | —O— | Methyl group |
| 13 | Pentamaethylene group | —COO— | 2 | —O— | Methyl group |
| 14 | Hexamethylene group | —COO— | 2 | —O— | Methyl group |
| 15 | n-Heptylene group | —COO— | 2 | —O— | Methyl group |
| 16 | Phenylene group | —COO— | 2 | —O— | Methyl group |
| 17 | Methylene group | —CONH— | 2 | —O— | Hydrogen atom |
| 18 | Ethylene group | —CONH— | 2 | —O— | Hydrogen atom |
| 19 | Trimethylene group | —CONH— | 2 | —O— | Hydrogen atom |
| 20 | Tetramethylene group | —CONH— | 2 | —O— | Hydrogen atom |
| 21 | Pentamaethylene group | —CONH— | 2 | —O— | Hydrogen atom |
| 22 | Hexamethylene group | —CONH— | 2 | —O— | Hydrogen atom |
| 23 | n-Heptylene group | —CONH— | 2 | —O— | Hydrogen atom |
| 24 | Phenylene group | —CONH— | 2 | —O— | Hydrogen atom |
| 25 | Methylene group | —CONH— | 2 | —O— | Methyl group |
| 26 | Ethylene group | —CONH— | 2 | —O— | Methyl group |
| 27 | Trimethylene group | —CONH— | 2 | —O— | Methyl group |
| 28 | Tetramethylene group | —CONH— | 2 | —O— | Methyl group |
| 29 | Pentamaethylene group | —CONH— | 2 | —O— | Methyl group |
| 30 | Hexamethylene group | —CONH— | 2 | —O— | Methyl group |
| 31 | n-Heptylene group | —CONH— | 2 | —O— | Methyl group |
| 32 | Phenylene group | —CONH— | 2 | —O— | Methyl group |

The compound represented by General Formula (114) may be a commercially available compound or a compound appropriately synthesized by a known method.

The amount of the compound represented by General Formula (114) to be used is usually from 1 to 2 equivalents, and preferably from 1 to 1.5 equivalents with respect to the number of moles of the compound represented by General Formula (113).

The dehydration condensation agent may be anything that is usually used as a dehydration condensation agent, and examples thereof include inorganic dehydration agents such as diphosphorus pentoxide and anhydrous zinc chloride; carbodiimides such as dicyclohexylcarbodiimide, diisopropylcarbodiimide, 1-ethyl-3-(3-dimethylaminopropyl)carbodiimide hydrochloride; polyphosphoric acid, acetic anhydride, sulfuric acid, carbonyldiimidazole, and p-toluenesulfonic acid. Among the dehydration condensation agenets, carbodiimides are preferable, and 1-ethyl-3-(3-dimethylaminopropyl) carbodiimide hydrochloride is more preferable. The amount of the dehydration condensation agent to be used is usually from 1 to 20 equivalents, and preferably 1 to 10 equivalents, with respect to the number of moles of the compound represented by General Formula (113). In the reaction [VI], a catalyst such as dimethylaminopyridine may be used in order to improve the efficiency of the dehydration condensing agent. The amount of the catalyst to be used is usually from 0.1 to 10 equivalents to the number of moles of the compound represented by General Formula (113).

Examples of the solvent include ethers such as diethyl ether, diisopropyl ether, ethyl methyl ether, tetrahydrofuran, 1,4-dioxane, and dimethoxyethane; ketones such as acetone, dimethyl ketone, methyl ethyl ketone, diethyl ketone, 2-hexanone, tert-butyl methyl ketone, cyclopentanone, and cyclohexanone; halogenated hydrocarbons such as chloromethane, chloroform, dichloromethane, dichloroethane, trichloroethane, carbon tetrachloride and chlorobenzene; hydrocarbons such as n-hexane, benzene, toluene, and xylene; esters such as ethyl acetate, butyl acetate and methyl propionate; nitriles such as acetonitrile; and amides such as N,N-dimethylformamide. Among the solvents, esters are preferable, and ethyl acetate is more preferable. The solvents may be used alone or in combination of two or more. The amount of the solvent to be used is usually from 0.1 to 100 ml, and preferably from 1 to 50 ml, with respect to 1 mmol of the compound represented by General Formula (113).

In the reactions [IV] to [VI], the pressure during the reactions is not particularly limited as long as a series of reactions is carried out without delay, and may be performed, for example, at normal pressure.

In the reactions [IV] to [VI], the reactants and products obtained after the reactions may be isolated, if necessary, by general post-treatment operations and purification operations usually performed in this field. Specifically, for example, a reaction product and a product obtained by performing filtration, washing, extraction, concentration under reduced pressure, recrystallization, distillation, column chromatography and the like may be isolated.

[Aqueous dispersion of colored particles]

The aqueous dispersion of colored particles of the present invention is composed of a polymer having at least a unit of a monomer derived from the dye having a polymerizable unsaturated group, and examples thereof include an aqueous dispersion of colored particles (polymer) composed of a unit of a monomer (polymerizable dye) derived from the compound represented by the above General Formula (1) and a polymerizable monomer. The unit of the monomer (polymerizable dye) derived from the compound represented by General Formula (1) is preferably one in which Dye in General Formula (1) described in detail above is a dye residue represented by General Formulas (I), (III), (IV), (VI), or (VII). $R_1$, $Y_2$ and $A_1$ in General Formula (1) are each a functional group described in detail above.

More preferably, the unit of the monomer (polymerizable dye) derived from the compound represented by General Formula (1) is the one described above in detail, in which Dye in General Formula (1) is a dye residue represented by General Formula (II), (III), (V), (VI), or (VII). Particularly preferably, the unit of the monomer (polymerizable dye) derived from the compound represented by General Formula (1) is a compound represented by General Formula (2) or (3) described in detail above.

The polymerizable monomer to be used may be any monomer as long as the monomer has a function of causing a polymerization or cross-linking reaction by an initiating species such as a radical generated from a polymerization initiator and curing a composition containing the polymerizable monomers. The polymerizable monomer that can be used is not particularly limited as long as it is a compound that causes a polymerization reaction and cures, and can be used regardless of the type of monomer, oligomer, or polymer. In particular, various known polymerizable monomers known as radical polymerizable monomers, which cause a polymerization reaction by an initiation species generated from a polymerization initiator or the like added as desired, are preferable. For example, a polymerizable compound having at least one ethylenically unsaturated double bond is preferable.

Examples of the polymerizable monomer include (meth) acrylate compounds, vinyl ether compounds, compounds having a (meth)acrylate group and a vinyl ether group, allyl compounds, N-vinyl compounds, and unsaturated carboxylic acids.

The polymerizable monomer may be used singly or as a mixture of two or more for the purpose of adjusting the reaction rate, particle properties, physical properties for use in ink and the like. The polymerizable monomer may be a monofunctional monomer or a bifunctional or higher polyfunctional monomer.

To have further improved water resistance and light resistance, the aqueous dispersions of colored particles is preferably an aqueous dispersion of colored particles (polymer) composed of a monomer (polymerizable dye) derived from the compound represented by the above General Formula (1), a carboxyl group-containing vinyl monomer, and an ester monomer of acrylic acid or methacrylic acid and a linear or cyclic alcohol having 2 to 18 carbon atoms.

The carboxyl group-containing vinyl monomer that can be used is not particularly limited as long as the monomer is a vinyl monomer containing a carboxyl group, and examples thereof include at least one of 2-methacryloyloxyethyl succinate, 2-methacryloyloxyethyl maleate, 2-methacryloyloxyethyl phthalate, and 2-methacryloyloxyethyl hexahydrophthalate. Among the monomers, 2-methacryloyloxyethyl phthalate is more preferable.

The ester monomer of acrylic acid or methacrylic acid and having a linear or cyclic alcohol having 2 to 18 carbon atoms which can be used is an ester of acrylic acid or methacrylic acid and having a linear or cyclic alcohol having 2 to 18 carbon atoms. Specific preferable examples include at least one of ethyl (meth)acrylate, propyl (meth)acrylate, isopropyl (meth)acrylate, n-butyl (meth)acrylate, isobutyl (meth) acrylate, t-butyl (meth)acrylate, (meth)acrylic hexyl acrylate, cyclohexyl (meth)acrylate, octyl (meth)acrylate, 2-ethylhexyl (meth)acrylate, lauryl (meth)acrylate, palmityl (meth)acrylate, stearyl (meth)acrylate, and behenyl (meth) acrylate. The "(meth)acrylic acid" represents "acrylic acid and/or methacrylic acid". It is particularly preferable to use n-butyl (meth)acrylate, lauryl methacrylate, and cyclohexyl methacrylate, which further improve the effects of the present invention.

In the present invention, the aqueous dispersion of colored particles is produced by dissolving a monomer (polymerizable dye) derived from the compound represented by General Formula (1) or the like in the polymerizable monomer, and polymerizing the polymer using a polymerization initiator or the like.

For example, in the production using the carboxyl group-containing vinyl monomer and the ester monomer, an aqueous dispersion of colored particles can be produced by, for example, dissolving a monomer (polymerizable dye) derived from the compound represented by the above General Formula (1) or the like in a mixed monomer containing a carboxyl group-containing vinyl monomer and an ester monomer of acrylic acid or methacrylic acid and having a linear or cyclic alcohol having 2 to 18 carbon atoms, followed by emulsion polymerization using ammonium persulfate, potassium persulfate, hydrogen peroxide or the like as a polymerization initiator, or a polymerization initiator further using a reducing agent, and further using a polymerizable surfactant as necessary.

The polymerizable surfactant that can be used as required is not particularly limited as long as it is a polymerizable surfactant usually used for a polymerization reaction such as the emulsion polymerization. Examples of the polymerizable surfactant include at least one of the polymerizable surfactant include anionic or nonionic polymerizable surfactants such as Adekaria Soap NE-10, NE-20, NE-30, NE-40, and SE-10N manufactured by Adeka Corporation, Latemul S-180, S-180A, and S-120A manufactured by Kao Corporation, and Eleminor JS-20 manufactured by Sanyo Chemical Industries, Ltd. The amount of the polymerizable surfactant to be used is preferably from 0 to 50% by mass, and more preferably from 0.1 to 50% by mass, based on the total amount of the monomers.

In a preferable embodiment, by dissolving a monomer (polymerizable dye) derived from the compound represented by the above General Formula (1) or the like in the above-described polymerizable monomer, and performing emulsion polymerization, or by dissolving and dyeing a monomer (polymerizable dye) derived from the compound represented by the above General Formula (1) or the like at least after polymerization of the carboxyl group-containing vinyl monomer and the ester monomer, a dispersion of the colored particles in which the colored particles having a resin solid content of 20 to 50% by mass are dispersed in water is obtained.

In the obtained aqueous dispersion of colored particles, the colored particles are formed by polymerizing a polymerizable monomer and a unit of a monomer (polymerizable dye) derived from the compound represented by General Formula (1) [covalent bond (polymer C— And polymerizable dye —C-polymerizable dye)] to form a single unit (polymer C-"-C-"-polymerizable dye). Therefore, an aqueous dispersion of colored particles with less discoloration due to heating, excellent heat resistance, and even better water resistance, light resistance, and the like is obtained. Further, by selecting each color such as a unit of a monomer (polymerizable dye) derived from the compound represented by the above General Formula (1) to be used, there is an advantage that near-infinite color alignment and pinpoint toning can be performed. Therefore, the aqueous dispersion of colored particles can be suitably used as a colorant for writing instrument inks, inkjet inks, painting materials, aqueous coatings, and the like.

The average particle diameter of the above-described colored particles varies depending on the use, but is preferably from 30 to 200 nm from the viewpoint of storage stability, clogging of a pen feed for writing instruments, and clogging of nozzles for inkjet inks. The average particle diameter of the colored particles is adjusted by suitable combining the type and amount of the polymerizable monomer such as the above-described carboxyl group-containing vinyl monomer, an ester monomer of acrylic acid or methacrylic acid and a linear or cyclic alcohol having 2 to 18 carbon atoms, and polymerization conditions (temperature, pressure, etc.).

The "average particle diameter" defined in the present invention means a histogram average particle diameter (D50) based on a scattered light intensity distribution measured by a particle diameter distribution analyzer [FPAR1000 (manufactured by Otsuka Electronics Co., Ltd.)].

The weight average molecular weight of the colored particles is preferably from 300000 to 3000000, and more preferably from 500000 to 2000000. When it is within this range, thermal resistance, light resistance, and storage stability are achieved.

The weight average molecular weight is measured by GPC, and the value is a value in terms of polystyrene.

(Writing Instrument Ink Composition)

The writing instrument ink composition of the present invention includes the aqueous dispersion of colored particles having the above-described constitution.

As a preferable writing instrument ink composition, the writing instrument ink composition including the aqueous dispersion of colored particles having the above-described constitution, a water-soluble organic solvent, and water is desirable.

Examples of the water-soluble organic solvents that can be used include at least one of alkylene glycols such as ethylene glycol, triethylene glycol, tetraethylene glycol, propylene glycol, dipropylene glycol, 1,2-propanediol, 1,3-propanediol, 1,2-butanediol, 2,3-butanediol, 1,3-butanediol, 1,4-butanediol, 1,2-pentanediol, 1,5-pentanediol, 2,5-hexanediol, 3-methyl-1,3-butanediol, 2-methylpentane-2,4-diol, 3-methylpentane-1,3,5-triol, and 1,2,3-hexanetriol; polyalkylene glycols such as polyethylene glycol and polypropylene glycol; glycerol such as glycerol, diglycerol, and triglycerol; lower alkyl ethers of glycols such as ethylene glycol monomethyl ether, ethylene glycol monoethyl ether, diethylene glycol monomethyl ether, diethylene glycol monoethyl ether, diethylene glycol mono-n-butyl ether, N-methyl-2-pyrrolidone, and 1,3-dimethyl-2-imidaridinone.

In addition, water-soluble solvents such as alcohols such as methyl alcohol, ethyl alcohol, isopropyl alcohol, n-butyl alcohol, tert-butyl alcohol, isobutyl alcohol, hexyl alcohol, octyl alcohol, nonyl alcohol, decyl alcohol, benzyl alcohol, and amides such as dimethylformamide and diethylacetamide, and ketones such as acetone may also be mixed.

The content of the water-soluble organic solvents varies depending on the type of writing instrument such as a felt-tip pen, a marking pen, and a ball-point pen, and is desirably from 1 to 40% by mass based on the total amount of the ink composition.

The content of water (for example, tap water, purified water, ion-exchanged water, distilled water, or pure water) is preferably from 30 to 90% by mass, and more preferably from 40 to 60% by mass, based on the total amount of the ink composition.

The content of the colored particles varies depending on the type of the writing instrument, the outflow mechanism (pen feed, ball-point pen), and the like, but is preferably from 1 to 30% by mass in terms of solid content based on the total amount of the writing instrument ink composition.

In the writing instrument ink composition of the present invention, the preservative or the fungicide, the pH modifier, the defoamer, and the like can be appropriately selected and used, as necessary, to the extent that the effect of the present invention is not impaired.

Examples of the pH modifier include at least one of ammonia, urea, monoethanolamine, diethanolamine, triethanolamine, aminomethylpropanol, alkali metal salts of carbonic acid and phosphoric acid such as sodium tripolyphosate and sodium carbonate, and alkali metal hydroxides such as sodium hydroxide.

Examples of the preservative or fungicide include at least one of phenol, omadine sodium, sodium pentachlorophenol, 1,2-benzisothiazolin-3-one, 2,3,5,6-tetrachloro-4-(methylphonyl)pyridine, alkali metal salts of benzoic acid, sorbic acid, and dehydroacetic acid, and benzimidazole compounds.

Examples of lubricant include at least one of phosphoric acid esters, polyalkylene glycol derivatives such as polyoxyethylene lauryl ether, fatty acid alkali salts, nonionic surfactants, fluorinated surfactants such as perfluoroalkyl phosphate esters, polyether modified silicones such as polyethylene glycol adduct of dimethylpolysiloxane, and the like.

With the writing instrument ink composition of the present invention configured in this way, the writing instrument ink composition suitable for a writing instrument such as a pen, marking pen, ball-point pen, can be obtained because the writing instrument ink composition configured in this way has excellent thermal resistance, water resistance, light resistance, and the like, and has excellent function as a colorant for ink for writing instruments such as feathering resistance, permeation resistance, and the like.

(Inkjet ink composition)

The inkjet ink composition according to the present invention includes the aqueous dispersion of colored particles having the above-described constitution.

As a preferable inkjet ink composition, the preferable inkjet ink compositions including the aqueous dispersion of colored particles having the above-described constitution and a solvent is preferable.

The preparation of the inkjet ink may be achieved by adding a solvent to the dispersion of colored particles having the above-described constitution, followed by stirring. As necessary, a resin, a dispersant and the like may be added.

The solvent used in the inkjet ink is not particularly limited, but specifically, water (purified water, ion-exchanged water, distilled water, pure water, and the like, hereinafter, simply referred to as "water"), and water-soluble organic solvents may be used as mixed solvents.

Examples the water-soluble organic solvent that can be used include: alkyl alcohols having 1 to 4 carbon atoms such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols having an alkylene group containing from 2 to 6 carbon atoms, such as ethylene glycol, propylene glycol, butylene glycol, triethylene glycol, 1,2,6-hexanetriol, thiodiglycol, hexylene glycol, and diethylene glycol; glycerin; lower alkyl ethers of polyhydric alcohols such as ethylene glycol monomethyl (or ethyl) ether, diethylene glycol methyl (or ethyl) ether, and triethylene glycol monomethyl (or ethyl) ether; N-methyl-2-pyrrolidone, 2-pyrrolidone, and 1,3-dimethyl-2-imidazolidinone. Among the many water-soluble organic solvents, polyhydric alcohols such as diethylene glycol and lower alkyl ethers of polyhydric alcohols such as triethylene glycol monomethyl (or ethyl) ether are preferable.

The content of the water-soluble organic solvent is preferably in the range from 3 to 50% by mass, and more preferably from 3 to 30% by mass based on the total amount of the ink composition.

The resin used for the inkjet ink is not particularly limited as long as it is dissolved or dispersed in the above-described solvent blended in the ink. Specific examples include acrylic resins, polyester resins, phenol resins, polyamides, polyvinyl butyrals, cellulose acetate butyrates, nitrocellulose resins, polyurethanes, and vinyl chloride-vinyl acetate copolymers. The resins may be used alone or in combination of two or more. The type of resin may be selected according to the type of medium.

In the inkjet ink composition of the present invention, the above-described aqueous dispersion of colored particles may be used as the aqueous dispersion of colored particles is, or may be blended with the above-mentioned solvent and, if necessary, a resin and a dispersant. Further, various additives commonly used in the art may be included in the composition within a range not to impair the object of the present invention. For example, a nozzle clogging preventing agent, an antioxidant, a conductivity modifier, a viscosity modifier, a surfactant, an oxygen absorber, and the like may be appropriately added. The types are not particularly limited, and the additives used in the art may be used. Further, the dispersion of colored resin particles may be diluted with a non-aqueous solvent.

The content of the colored particles varies depending on the printing method and the like, but is preferably from 1 to 30% by mass in terms of the solid content based on the total amount of the inkjet ink composition.

The appropriate range of the viscosity of the inkjet ink varies depending on the nozzle diameter of the discharge head of the inkjet recording system, the discharge environment, and the like, but is preferably from 1 to 20 mPa-s at 25° C. in a normal case.

The printing method using the inkjet ink composition of the present invention is not particularly limited, and may be any method such as a piezo method, an electrostatic method, and a thermal method. In a case where an inkjet printer is used, it is preferable that the inkjet ink composition according to the invention is ejected from an inkjet head based on a digital signal, and the ejected ink droplets are attached to a recording medium.

The recording medium is not particularly limited, and plain paper, glossy paper, copy paper, special paper, cloth, film, OHP sheet, and the like may be used.

The inkjet ink composition of the present invention thus configured has excellent thermal resistance, water resistance, light resistance, and the like, as well as functions as a colorant of the inkjet ink such as feathering resistance and permeation resistance. Therefore, an inkjet ink composition suitable for printing of any method such as piezo method, electrostatic method, and thermal method, and printing of plain paper, glossy paper, special paper, cloth (clothing such as T-shirt), film, and OHP sheet is obtained.

(Painting Material Composition)

The painting material composition of the present invention include the aqueous dispersion of colored particles having the above-described constitution. The painting material composition of the present invention is intended for at least a water-soluble drawing material such as a watercolor paint and a poster color, and a solid drawing material such as a crayon and a pass.

A water-soluble drawing material such as a watercolor paint or a poster color desirably contains at least the aqueous dispersion of colored particles, a water-soluble resin, and a resin emulsion having the above-described constitution. Water is used as the main solvent of the water-soluble drawing material.

In addition, a solid drawing material such as a crayon or a pass desirably contains at least the aqueous dispersion of colored particles, a wax, an extender, and a substrate having the above-described constitution.

The content of the colored particles varies depending on the type of the painting material and the like, but is preferably from 5 to 40% by mass in terms of the solid content based on the total amount of the painting material composition.

Examples of the water-soluble resin used when the drawing material is a fluid water-soluble drawing material such as paint include natural resins such as gum arabic, tragacanth, dextrin, and glue; synthetic resins such as polyvinyl alcohol; semi-synthetic resins such as carboxymethyl cellulose, hydroxyethyl cellulose, and hydroxypropyl cellulose; and alkali-soluble acrylic resins such as ammonium polymethacrylate, ammonium polyacrylate, and alkali salts of acrylate methacrylates. The water-soluble resins may be used alone or in combination of two or more.

Examples of the resin emulsion include ester emulsions of methyl methacrylate, methyl acrylate, ethyl acrylate, ethyl methacrylate, isopropyl acrylate, isopropyl methacrylate, butyl acrylate, and butyl methacrylate, emulsions of copolymers combining the acrylates and methacrylates, and styrene-acrylate copolymer emulsions.

The amount of the water-soluble resins and/or resin emulsions included is preferably from 5 to 30% by mass based on the total amount of the painting material composition in terms of the solid content of the image, from the viewpoint that a sufficient binding effect and drawing characteristics are not impaired.

Examples of the wax used for solid drawing materials such as crayons and passes include the waxes having the function as a binder and used to form solid drawing materials, such as animal waxes such as beeswax, whale wax, and insect white wax; plant waxes such as candelilla wax, carnauba wax, wood wax, and urushi wax; mineral waxes such as montan wax and ozokerite; natural waxes such as petroleum waxes such as paraffin wax and microcrystalline wax; synthetic waxes such as Fischer-Tropsch wax, low molecular weight polyethylene and derivatives thereof, each derivative of montan wax, paraffin wax, and microcrystalline wax, cetyl alcohol, stearic acid, polyethylene glycol stearate, and castor wax; hardened castor oil; and hardened palm oil The waxes may be used alone or in combination of two or more, and the content thereof is preferably 50% by mass or less based on the total amount of the painting material composition.

Examples of the extender include talc, kaolin, mica, boron nitride, calcium carbonate, and potassium titanate whisker. The content of the extenders is preferably from 5 to 50% by mass based on the total amount of the painting material composition.

Examples of the matrix include resins such as ethylene-vinyl acetate copolymer, polyethylene, and polypropylene. The content of the extenders is preferably from 5 to 50% by mass with respect to the total amount of the painting material composition.

Further, solid drawing materials such as crayons and passes may contain appropriate amounts of lubricating components such as terpene resins and modified products thereof, maleic acid resin derivatives, coumarone/indene resins and derivatives thereof, rosin esters, tackifiers such as ester gums, jojoba oil, liquid paraffin, squalene, and squalene. A water-soluble high-boiling solvent is used as a drying agent for water-soluble drawing materials, an antifreezing agent or the like, and specific examples include glycols such as ethylene glycol, diethylene glycol, triethylene glycol, propylene glycol, dipropylene glycol, polyethylene glycol, 1,3-butylene glycol, thiodiethylene glycol, 1,5-pentanediol, and glycerin; ethylene glycol monomethyl ether; diethylene glycol monomethyl Ether, 2-pyrrolidone, N-methyl-2-pyrrolidone, and triethanolamine. The water-soluble high-boiling solvents may be used alone or in combination of two or more in appropriate amounts.

Further, as necessary, both the water-soluble drawing material and the solid drawing material may include other known inorganic or organic colorants other than the above-described colored particles, such as carbon black, titanium oxide, iron black, ultramarine blue, petal, zinc oxide, phthalocyanine blue, phthalocyanine green, watching red, Carmine 6B, and Hansa Yellow. The colorants may be used alone or in combination of two or more. In addition, extender pigments such as kaolin, talc, calcium carbonate, silica, and barium sulfate, resins such as polyvinyl chloride, thickeners, preservatives, fungicides, defoamers, and surfactants may be added.

In a case where the painting material composition of the present invention is a water-soluble drawing material, it can be easily obtained by mixing and dispersing the above-described components with a known dispersing machine such as a three-roll mill, a horizontal ball mill, or a horizontal bead mill. Further, in a case where the painting material composition is a solid drawing material, the painting material composition can be obtained by heating and stirring and mixing each of the above-described components, and kneading with a kneader such as a kneader or a roll mill if necessary, pouring this into a mold in a molten state, or injection/press-fitting or extruding, and solidifying by cooling.

The painting material composition of the present invention configured as described above is excellent in thermal resistance, water resistance, light resistance, and the like, and has a remarkable function as a colorant of the painting material composition such as feathering resistance and permeation resistance. Therefore, a painting material composition suitable for a water-soluble drawing material such as a watercolor paint and a poster color, and a solid drawing material such as a crayon and a pass is obtained.

(Aqueous Coating Composition)

The aqueous coating composition of the present invention includes the aqueous dispersion of colored particles having the above-described constitution.

The aqueous coating composition of the present invention may include aqueous dispersions of colored particles of one or more colors as colored particles. By including colored particles of two or more colors, a pattern having a complex feeling of depth can be formed when a coating film is formed, which is desirable.

The content of the colored particles varies depending on the type of the application target, the application method, and the like, but is preferably from 5 to 40% by mass in terms of solid content, based on the total amount of the aqueous coating composition.

Further, the aqueous coating composition may include an aqueous resin.

The aqueous resin that may be used is not particularly limited. For example, a resin having a form such as water solubility, dispersion, emulsion, and microgel may be used.

Specific examples include acrylic resins, alkyd resins, polyester resins, polyurethane resins, acrylic urethane resins, block isocyanates, fluorine resins, epoxy resins, epoxy acrylate resins, phenol resins, melamine resins, vinyl resins, polyamide resins, and cellulose resins.

Further, the aqueous resin used in the aqueous coating composition of the present invention also includes a compound capable of forming a resin by polymerization or crosslinking, that is, a monomer or oligomer.

The content of the aqueous resins is preferably from 5 to 50% by mass in terms of solid content based on the total amount of the aqueous coating composition.

In the aqueous coating composition of the present invention, besides the aqueous resin, if necessary, a general-purpose colorant other than the colored particles may be used in a complementary color to the aqueous coating composition.

In the aqueous coating composition of the present invention, in addition to the above-described components, water as a solvent and the following optional components may be contained in appropriate amounts. The water content is the balance excluding the components.

The aqueous coating composition of the present invention may include optional components as necessary, as long as the effects of the present invention are not impaired. Examples of the optional component include a lame agent, a pearl agent, a preservative, a fragrance, a plasticizer, a defoamer, a filler, an antioxidant, an ultraviolet absorber, a curing agent, a catalyst, a solvent, a surfactant, and a water-soluble polymer, a flame retardant, an antistatic agent, a heat stabilizer, a pH modifier, and additives added for antifreeze, wetting, pigment dispersion, emulsification, anti-skinning, leveling, drying acceleration, etc.

There is no particular limitation on the use of the aqueous coating composition thus obtained, and the composition may be applied to various objects such as mortar, concrete, ceramic materials, plastic, metal, wood, and paper. The application amount of the aqueous coating composition at the time of application is not particularly limited, but is usually preferably from 300 to 600 g/m$^2$. In addition, the application method is not particularly limited, and the application may be performed by a known application method such as a brush, a trowel, a roller, a spray, and the like, and the coating may be dried at room temperature or while heating.

The emulsion coating and dispersion medium used in the present invention and the aqueous coating composition of the present invention may include appropriate amounts of known additives within a range that does not impair the effects of the present invention, such as a thickener, a dispersant, a defoamer, a preservative, and a leveling agent.

As described above, the aqueous coating composition of the present invention is remarkably excellent in the function as a colorant of the aqueous coating composition such as thermal resistance, water resistance, and light resistance. Therefore, an aqueous coating composition having excellent functions such as not only a color tone but also a shading feeling and a coating having an intricate depth feeling and having an excellent design property can be obtained.

EXAMPLES

Next, the present invention will be described in more detail with respect to Production Examples, Examples and Comparative Examples, but the present invention is not limited to the following Examples.

Production Examples 1 to 17: Preparation of Aqueous Dispersion of Colored Particle: Including Acquisition and Production of Dye Aqueous dispersions of colored particles were produced according to the following Preparation Examples 1 to 17 and the composition shown in Table 1 below.

The dyes 1 to 9 used in Production Examples 1 to 17 used the following dyes (polymerizable dyes), and the dyes 10 and 11 used commercially available dyes.

<Dye 1>

According to the method described in Synthesis Example 4 of International Publication WO 2014-126167, the compound represented by the following formula [General Formula (I), polymerizable dye (Basic Red 1 type)] was obtained:

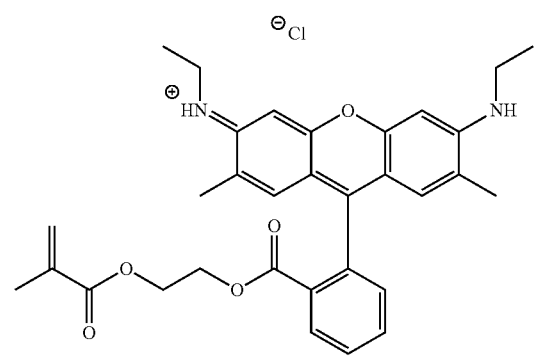

<Dye 2>

According to the method described in International Publication WO 2014-126167, the compound represented by the following formula [General Formula (I), polymerizable dye (Basic Violet 11:1 type)] was obtained:

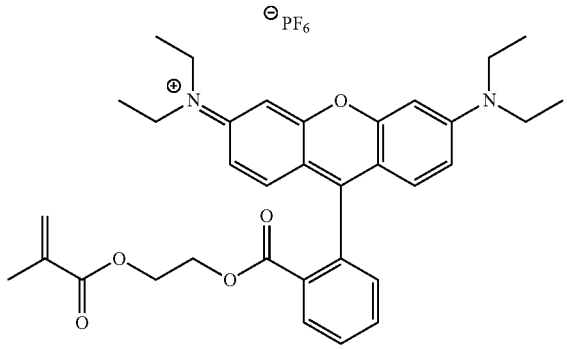

<Dye 3>

According to the method described in Example 1 of International Publication WO2014-126167, the compound represented by the following formula [General Formula (I), polymerizable dye (Basic Violet 11:1 type)] was obtained:

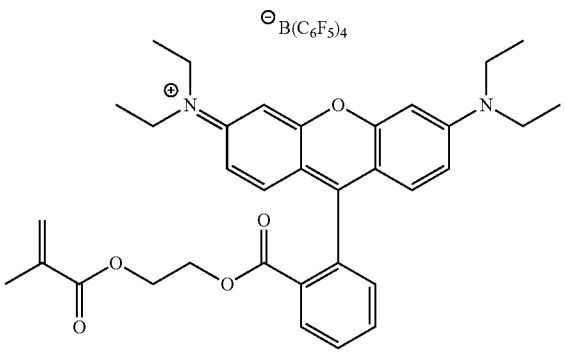

<Dye 4>

According to the method described in Example 1 of International Publication WO2015-98999, the compound represented by the following formula: [General Formula (III), polymerizable dye (Basic Blue 7 type)] was obtained

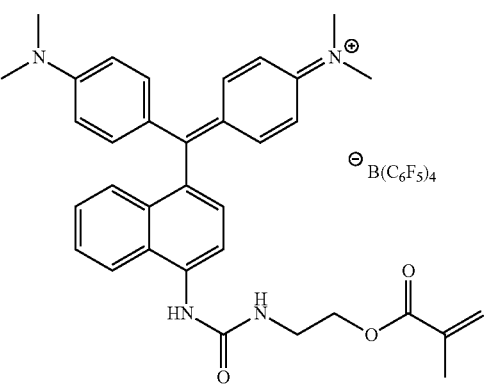

<Dye 5>

According to the method described in Example 1 of International Publication WO2015-182680, the compound represented by the following formula [General Formula (III), polymerizable dye (Basic Green 1 type)] was obtained:

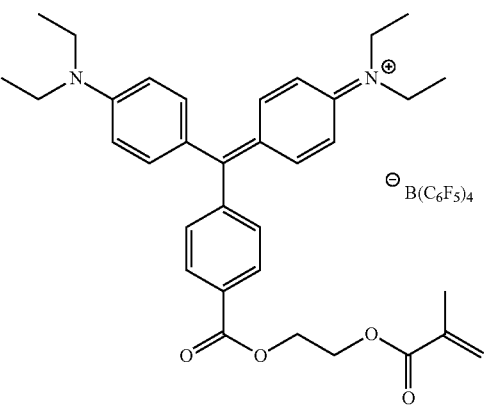

<Dye 6>

According to the method described in Example 3 of International Publication WO2015-133578, the compound represented by the following formula [General Formula (IV), polymerizable dye (Basic Yellow 13 type)] was obtained:

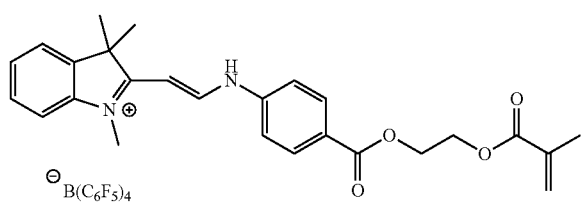

<Dye 7>

According to the following production method, the compound represented by the following formula [General Formula (2), General Formula (VI), polymerizable dye (Basic Yellow 40 type)] was obtained:

(Production Method)

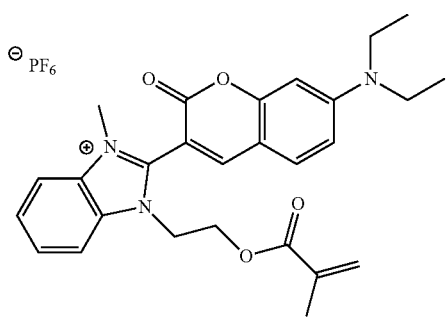 [SMILES: "PF6" ; C=C(C)C(=O)OCCn1c(-c2cc3ccc(N(CC)CC)cc3oc2=O)[n+](C)c2ccccc21]

(1) Synthesis of Mesylate (Compound 2)

10.0 g (77.0 mmol) of 2-hydroxyethyl methacrylate (compound 1: manufactured by Wako Pure Chemical Industries, Ltd.) and 50 ml of dichloromethane, and the mixture was cooled to 0° C. 8.60 g (85.0 mmol) of triethylamine (Et₃N) (manufactured by Wako Pure Chemical Industries, Ltd.), and 9.73 g (85.0 mmol) of methanesulfonyl chloride (MsCl) (manufactured by Wako Pure Chemical Industries, Ltd.) were placed in a round bottom flask equipped with a stirrer, and stirred at room temperature for 4.5 hours. The organic layer was washed with water and concentrated under reduced pressure to obtain 16.0 g (yield 100%) of a colorless liquid mesylate compound (compound 2).

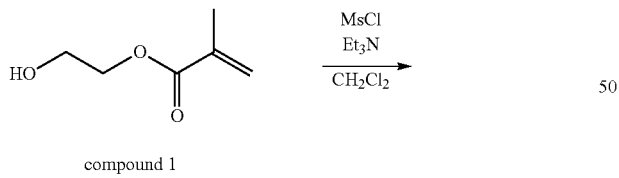

(2) Synthesis of Monomer (Compound 4)

31.2 g (150 mmol) of the mesylate compound (compound 2) obtained according to the method (1) and 20.0 g of coumarin 7 (compound 3: Tokyo Chemical Industry Co., Ltd.) 60.0 mmol), 39.1 g (120 mmol) of cesium carbonate (manufactured by Wako Pure Chemical Industries, Ltd.), and 250 ml of N,N-dimethylformamide (DMF) were placed in a round bottom flask equipped with a stirrer, and stirred at 40° C. for 5 hours. The obtained product was diluted with ethyl acetate, washed with water, and concentrated under reduced pressure to obtain a red solid. Ethyl acetate was added to the red solid, and the mixture was stirred for 1 hour, filtered, dried, thus obtaining 9.90 g of a methacryloyl group-containing yellow solid monomer (compound 4) (yield 37%).

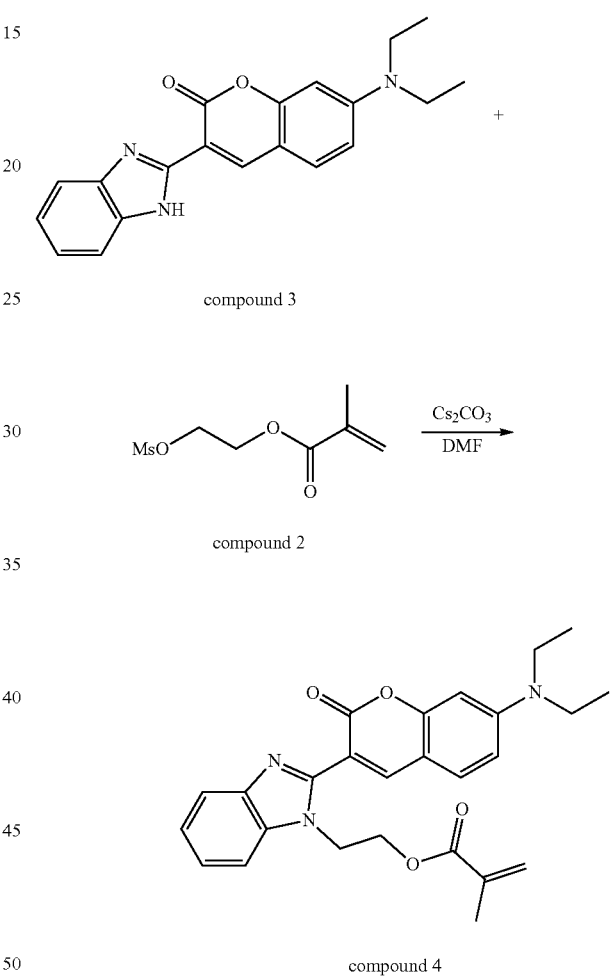

(3) Synthesis of Monomer (Dye 7)

15.3 g (34.3 mmol) of the monomer (compound 4) obtained according to the method (2) and 17.3 g (137 mmol) of dimethyl sulfate (manufactured by Wako Pure Chemical Industries, Ltd.) were placed in a round bottom flask equipped with a stirrer, and dichloromethane (100 ml) were added, followed by stirring at room temperature for 13 hours. 200 ml of water and 12.6 g (68.5 mmol) of potassium hexafluorophosphate were added, and the mixture was stirred at room temperature for 0.5 hour. After removing the aqueous layer, methanol was added to the red solid obtained by concentration under reduced pressure, and the mixture was stirred for 1 hour, filtered and dried to obtain 10.8 g of a yellow solid monomer (dye 7) (yield: 52%).

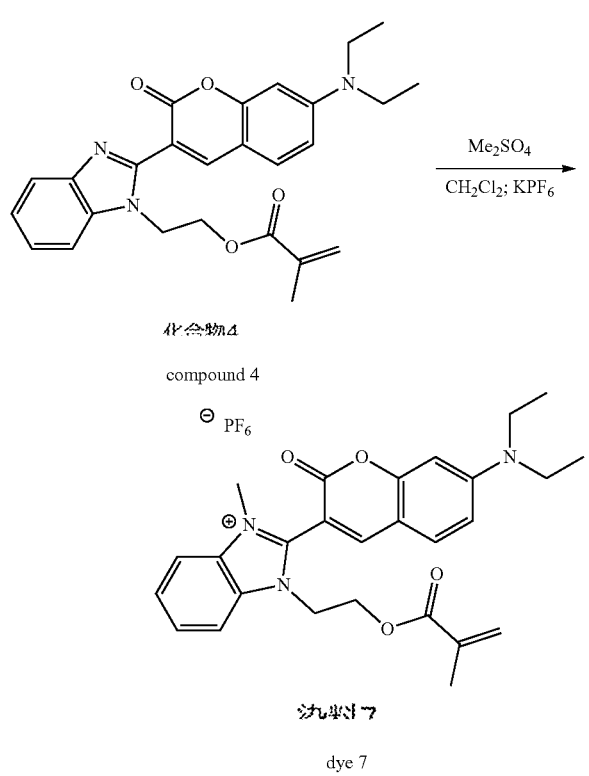

compound 4 dye 7

<Dye 8>

According to the following production method, the compound represented by the following formula [General Formula (3), General Formula (VII), polymerizable dye (Solvent Black 3 type)] was obtained:
(Production Method)

diamine (compound 5: manufactured by Wako Pure Chemical Industries, Ltd.) was added. After stirring at 100° C. for 5 hours, the temperature was returned to room temperature, and 13.8 g of a mixture containing a naphthalenediamine derivative (compound 7) as a brown solid was obtained.

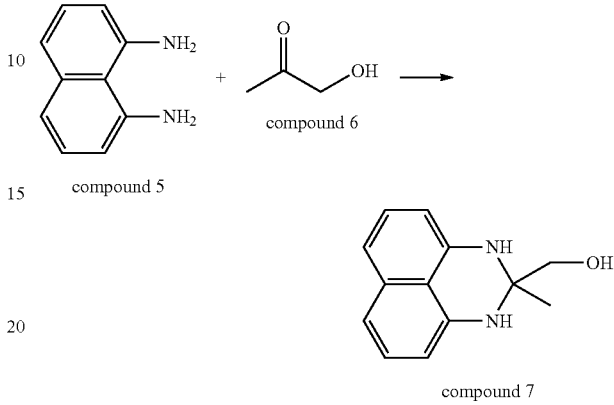

compound 5 compound 6 compound 7

(2) Introduction of Polymerizable Group

In a round bottom flask equipped with a stirrer, 33.9 g (158 mmol) of the naphthalenediamine derivative (compound 7) obtained according to the above-described synthesis method (1) was dissolved in 200 ml of ethyl acetate. To the solution, 43.7 g (190 mmol) of 2-methacryloyloxyethyl succinate (compound 8: manufactured by Shin-Nakamura Chemical Co., Ltd., trade name: NK Ester SA) and 4-dimethylaminopyridine (Wako Pure Chemical Industries, Ltd.) 1.9 g (15.8 mmol), and 51.5 g (269 mmol) of 1-ethyl-3-(3-dimethylaminopropyl) carbodiimide hydrochloride (WSC)

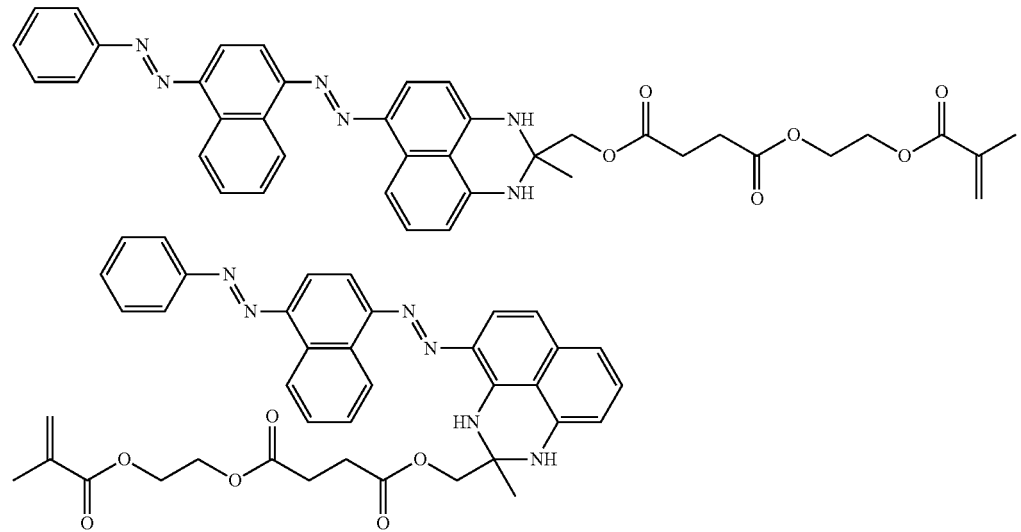

(1) Synthesis of Naphthalenediamine Derivative (Compound 7)

5.15 g (69.5 mmol) of hydroxyacetone (compound 6: manufactured by Wako Pure Chemical Industries, Ltd.) was placed in a round bottom flask equipped with a stirrer, heated to 50° C., and then 10.0 g (63.2 mmol) of 1,8-naphthalene- (Wako Pure Chemical Industries, Ltd.) were added, and stirred at room temperature for 18 hours. The organic layer was washed with water and concentrated under reduced pressure to obtain 75.6 g of a mixture mainly containing a naphthalenediamine derivative (compound 9) in the form of a brown oil.

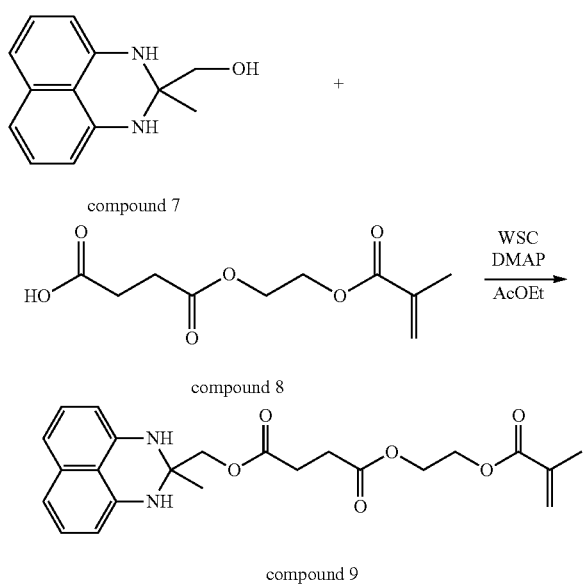

compound 7 compound 8 compound 9

(3) Diazo Coupling Reaction

A dispersion of 23.2 g (93.8 mmol) of 4-phenylazo-1-naphthylamine (compound 10: manufactured by Tokyo Chemical Industry Co., Ltd.) in 420 ml of water was placed in a round bottom flask equipped with a stirrer, and cooled under ice water cooling. did. An aqueous solution of 23.1 ml of concentrated hydrochloric acid and 6.80 g (98.6 mmol) of sodium nitrite was added, and the mixture was stirred for 1 hour under ice water cooling to obtain a diazo liquid. In a separate container, 420 ml of tetrahydrofuran was added to 40.0 g (93.8 mmol) of the naphthalenediamine derivative (compound 9) obtained in the above-described (2), the mixture was dissolved, and the above-described diazo solution was added thereto and stirred for 3 hours under ice water cooling. The pH was adjusted to 9 by adding a 25% aqueous sodium hydroxide solution, and the mixture was extracted with 300 ml of ethyl acetate. The extract was washed with saturated saline and ion-exchanged water in this order, and then concentrated under reduced pressure to obtain 58.6 g (yield: 91%) of a black solid monomer mixture (dye 8).

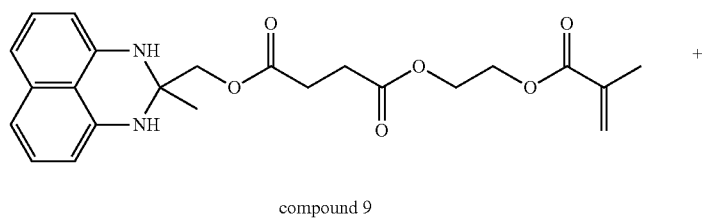

compound 9

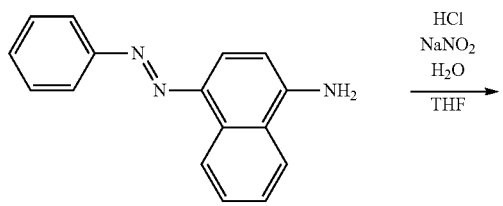

compound 10

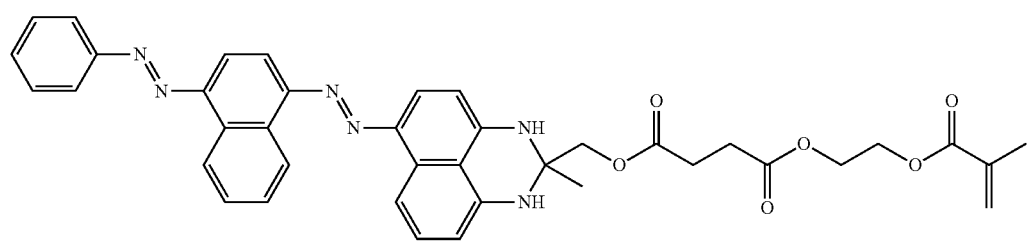

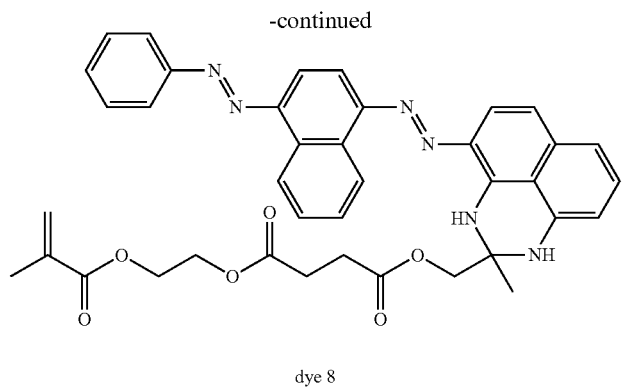

dye 8

<Dye 9>

The compound represented by the following formula [General Formula (I), polymerizable dye (Basic Violet 11:1)] was obtained according to the method described in International Publication WO 2014-126167:

<Dye 10: Commercial Product 1>

A commercially available water-soluble dye (AIZEN CATHILON RED BLH 200%, C.I. basic Red 39, manufactured by Hodogaya Chemical Co., Ltd.) was used.

<Dye 11: Commercial Product 2>

A commercially available water-soluble dye (AIZEN CATHILON YELLOW GLH, C.I. Basic Yellow 14 manufactured by Hodogaya Chemical Co., Ltd.) was used.

Production Examples 1 to 17: Production of Aqueous Dispersion of Colored Particles Production Example 1

A 2-liter flask was equipped with a stirrer, a reflux condenser, a thermometer, a nitrogen gas inlet tube, and a 1000-ml separatory funnel for charging monomer, and was set in a hot water tank. Distilled water, polymerizable surfactant 1 (Adekaria Soap SE-10N manufactured by Adeka), and ammonium persulfate were charged into the flask according to the mixing ratio shown in Table 1 below, and the internal temperature was raised to 50° C. while introducing nitrogen gas.

On the other hand, according to the mixing ratio shown in Table 1 below, a mixed monomer composed of 2-methacryloyloxyethyl phthalate (acrylic ester PA, manufactured by Mitsubishi Rayon Co., Ltd.) and n-butyl methacrylate as another monomer was mixed with Dye 1 (B. Red 1 type) shown in Table 1 to prepare a mixed liquid. The prepared solution was added to the flask maintained at a temperature of about 50° C. from the separatory funnel over 3 hours with stirring to carry out emulsion polymerization. The polymerization was completed after further aging for 5 hours, thus obtaining an aqueous dispersion of colored particles (particle 1).

Production Examples 2 to 17

Each of the aqueous dispersions (particles 2 to 17) of resin fine particles was prepared by mixing the components (dyes 1 to 11, monomer components, polymerizable surfactants 1, ammonium persulfate, and water) according to the mixing ratio in Table 1, in the same manner as in the above-described Production Example 1.

The average particle diameter of each of the obtained resin particles (particles 1 to 17) was measured by the above-described measuring device (particle diameter distribution measuring device), and the weight average molecular weight and thermal resistance were measured by the following methods. The measured values are shown in Table 1 below.

(Method for Measuring Weight Average Molecular Weight)

The weight average molecular weight is measured by GPC, and the value is a value in terms of polystyrene.

(Method for Measuring Thermal Resistance)

After spin-coating on a 3-inch glass wafer (Eagle XG manufactured by Corning Incorporated), it was dried on a hot plate heated to 90° C. for 90 seconds to obtain a thin film having a thickness of 1 μm. The absorbance (Aa) at the maximum absorption wavelength of each of the obtained thin films was measured using a spectrophotometer (Spectrophotometer UV-2550 manufactured by Shimadzu Corporation). After that, the film was heated on a hot plate heated to 230° C. for 30 minutes, and then the absorbance (Ab) was measured again. From the values of Aa and Ab, the dye remaining rate (%) was determined from the following formula. Further, the obtained dye residual ratio was evaluated according to the following criteria.

Dye Residual Ratio (%)=($\lambda b/\lambda a$)×100

Evaluation Criteria
A: Dye residual ratio≥80%
B: 60%≤dye residual ratio<80%
C: 50%≤dye residual ratio<60%
D: Dye residual ratio<50%

Examples 1 to 15 and Comparative Examples 1 and 2: Preparation of Writing Instrument Ink Composition Using the aqueous dispersion of colored particles (particles 1 to 17) produced in Production Examples 1 to 17 above, the writing instrument ink compositions were prepared by an ordinary method according to the formula shown in Table 2 (100% by mass in total).

Using the writing instrument ink compositions of Examples 1 to 15 and Comparative Examples 1 and 2 obtained above, writing instruments (marking pens) having the following constitutions were prepared and used in the following evaluations.

A marking pen (manufactured by Mitsubishi Pencil Co., Ltd., trade name: PUS-138, pen tip: sintered core made of PET) was loaded with each of the above-described writing instrument ink compositions to prepare a marking pen.

Using the obtained marking pens, water resistance, light resistance, feathering resistance, and permeation were evaluated by the following evaluation methods.

Table 2 below shows the evaluation results of Examples 1 to 15 and Comparative Examples 1 and 2.

(Method for Evaluating Water Resistance)

Using a marking pen filled with each of the obtained ink compositions, drawing lines were written on writing paper. The writing paper was immersed in distilled water, the state after 24 hours was visually observed, and evaluated according to the following evaluation criteria:

Evaluation Criteria:
- A: No change in the drawing line.
- B: Slight feathering of the drawing line is observed.
- C: Significant changes are observed in drawing line density and state.

(Method for Evaluating Light Resistance)

Each of the obtained ink compositions was spread on Peach Kent paper using an eccentric applicator (10MIL, manufactured by UESHIMA SEISAKUSHO), and the light resistance was evaluated according to the following criteria. The composition was irradiated with a xenon fade meter X25F (FLR40SW/M/36, manufactured by Suga Test Instruments Co., Ltd.) for 50 hours, and the L value (brightness) before and after irradiation was measured with a color computer (SC-P, manufactured by Suga Test Instruments Co., Ltd.) and evaluated by "L value after irradiation/L value before irradiation". The measurement was performed under the following conditions: specular reflection light: excluded, light source visual field: D65/10.

Evaluation Criteria:
- A: from 1.0 to 1.1
- B: more than 1.1 to less than 1.2
- C: more than 1.2

(Method for Evaluating Feathering Resistance and Permeation Resistance)

Using the marking pens loaded with the ink compositions produced in Examples and Comparative Examples obtained above, a line of about 5 cm in length was drawn by hand on the Iwanami Japanese Dictionary, and sensory evaluation of the feathering resistance and permeation property was visually performed according to the following evaluation criteria.

Evaluation Criteria:
- A: no feathering or permeation
- B: feathering at the writing end portion
- C: feathering and permeation at the drawing end portion
- D: feathering and permeation on drawing line and at the writing end portion

TABLE 1

| | Particle, aqueous dispersion of colored particles | | | | | | | | |
|---|---|---|---|---|---|---|---|---|---|
| | 1 | 2 | 3 | 4 | 5 | 6 | 7 | 8 | 9 |
| Dye 1 [General Formula (I)] | 70 | | | | | | | | 40 |
| Dye 2 [General Formula (I)] | | 70 | | | | | | | |
| Dye 3 [General Formula (I)] | | | 70 | | | | | | |
| Dye 4 [General Formula (III)] | | | | 70 | | | | | |
| Dye 5 [General Formula (III)] | | | | | 70 | | | | |
| Dye 6 [General Formula (III)] | | | | | | 70 | | | |
| Dye 7 [General Formula (VI), General Formula (2)] | | | | | | | 70 | | |
| Dye 8 [General Formula (VII), General Formula (3)] | | | | | | | | 70 | |
| Dye 9 [General Formula (I)] | | | | | | | | | |
| Dye 10 (Commercially available product 1) | | | | | | | | | |
| Dye 11 (Commercially available product 2) | | | | | | | | | |
| 2-Methacryloyloxyethyl phthalate | 300 | 300 | 300 | 300 | 300 | 300 | 300 | 300 | |
| 2-Acryloyloxyethyl phthalate | | | | | | | | | 300 |
| 2-Methacryloyloxyethyl hexahydrophthalate | | | | | | | | | |
| 2-Acryloyloxyethyl hexahydrophthalate | | | | | | | | | |
| 2-Acryloyloxyethyl-2-hydroxyethyl hexahydrophthalate | | | | | | | | | |
| Methyl methacrylate | | | | | | | | | |
| Styrene | | | | | | | | | |
| Triallyl cyanurate | | | | | | | | | |
| Methacrylic acid | | | | | | | | | |
| n-Butyl methacrylate | 200 | 200 | 200 | 200 | 200 | 200 | 200 | 200 | 200 |
| 2-Methacryloyloxyethyl succinate | | | | | | | | | |
| Polymerizable surfactant 1 | 50 | 50 | 50 | 50 | 50 | 50 | 50 | 50 | 50 |
| Polymerizable surfactant 2 | | | | | | | | | |
| Ammonium persulfate | 3 | 3 | 3 | 3 | 3 | 3 | 3 | 3 | 3 |
| Water: distilled water | 500 | 500 | 500 | 500 | 500 | 500 | 500 | 500 | 500 |
| Average particle diameter (nm) | 51 | 69 | 72 | 88 | 86 | 77 | 61 | 85 | 76 |
| Weight average molecular weight (×10000) | 105 | 98 | 112 | 91 | 96 | 89 | 109 | 101 | 73 |
| Thermal resistance | A | A | A | A | A | A | A | A | A |

| | Particle, aqueous dispersion of colored particles | | | | | | | |
|---|---|---|---|---|---|---|---|---|
| | 10 | 11 | 12 | 13 | 14 | 15 | 16 | 17 |
| Dye 1 [General Formula (I)] | | | | | | | | |
| Dye 2 [General Formula (I)] | | | | | 40 | | | |
| Dye 3 [General Formula (I)] | | | | | | | | |

TABLE 1-continued

| | | | | | | | | |
|---|---|---|---|---|---|---|---|---|
| Dye 4 [General Formula (III)] | 40 | | | | | | | |
| Dye 5 [General Formula (III)] | | | | | | | | |
| Dye 6 [General Formula (III)] | | 40 | | | | | | |
| Dye 7 [General Formula (VI), General Formula (2)] | | | 40 | | | | | |
| Dye 8 [General Formula (VII), General Formula (3)] | | | | 40 | | | | |
| Dye 9 [General Formula (I)] | | | | | 70 | | | |
| Dye 10 (Commercially available product 1) | | | | | | 40 | | |
| Dye 11 (Commercially available product 2) | | | | | | | | 40 |
| 2-Methacryloyloxyethyl phthalate | | | | | | 300 | 300 | 300 |
| 2-Acryloyloxyethyl phthalate | | | | | | | | |
| 2-Methacryloyloxyethyl hexahydrophthalate | 300 | | | | | | | |
| 2-Acryloyloxyethyl hexahydrophthalate | | 300 | | | | | | |
| 2-Acryloyloxyethyl-2-hydroxyethyl hexahydrophthalate | | | 300 | | | | | |
| Methyl methacrylate | | | | 300 | 200 | | | |
| Styrene | | | | | 100 | | | |
| Triallyl cyanurate | | | | | 100 | | | |
| Methacrylic acid | | | | | 100 | | | |
| n-Butyl methacrylate | 200 | 200 | 200 | | | 200 | 200 | 200 |
| 2-Methacryloyloxyethyl succinate | | | | 200 | | | | |
| Polymerizable surfactant 1 | 50 | 50 | 50 | 50 | | 50 | 50 | 50 |
| Polymerizable surfactant 2 | | | | | 40 | | | |
| Ammonium persulfate | 3 | 3 | 3 | 3 | 3 | 3 | 3 | 3 |
| Water: distilled water | 500 | 500 | 500 | 500 | 500 | 500 | 500 | 500 |
| Average particle diameter (nm) | 81 | 63 | 91 | 89 | 78 | 54 | 82 | 96 |
| Weight average molecular weight (×10000) | 79 | 75 | 80 | 69 | 83 | 70 | 99 | 104 |
| Thermal resistance | A | A | A | B | B | A | D | D |

TABLE 2

| | Example | | | | | | | | | | | | | | | Comparative Example | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 1 | 2 |
| Particle 1 | 50 | | | | | | | | | | | | | | | | |
| Particle 2 | | 50 | | | | | | | | | | | | | | | |
| Particle 3 | | | 50 | | | | | | | | | | | | | | |
| Particle 4 | | | | 50 | | | | | | | | | | | | | |
| Particle 5 | | | | | 50 | | | | | | | | | | | | |
| Particle 6 | | | | | | 50 | | | | | | | | | | | |
| Particle 7 | | | | | | | 50 | | | | | | | | | | |
| Particle 8 | | | | | | | | 50 | | | | | | | | | |
| Particle 9 | | | | | | | | | 50 | | | | | | | | |
| Particle 10 | | | | | | | | | | 50 | | | | | | | |
| Particle 11 | | | | | | | | | | | 50 | | | | | | |
| Particle 12 | | | | | | | | | | | | 50 | | | | | |
| Particle 13 | | | | | | | | | | | | | 50 | | | | |
| Particle 14 | | | | | | | | | | | | | | 50 | | | |
| Particle 15 | | | | | | | | | | | | | | | 50 | | |
| Particle 16 | | | | | | | | | | | | | | | | 50 | |
| Particle 17 | | | | | | | | | | | | | | | | | 50 |
| Triethanolamine | 1 | 1 | 1 | 1 | 1 | 1 | 1 | 1 | 1 | 1 | 1 | 1 | 1 | 1 | 1 | 1 | 1 |
| Ethylene glycol | 5 | 5 | 5 | 5 | 5 | 5 | 5 | 5 | 5 | 5 | 5 | 5 | 5 | 5 | 5 | 5 | 5 |
| Water: deionized water | 44 | 44 | 44 | 44 | 44 | 44 | 44 | 44 | 44 | 44 | 44 | 44 | 44 | 44 | 44 | 44 | 44 |
| Waterproof | A | A | A | A | A | A | A | A | A | A | A | A | A | A | A | C | C |
| Light resistance | A | A | A | A | A | A | A | A | A | A | A | A | A | A | A | C | C |
| Feathering resistance · Permeation resistance | A | A | A | A | A | A | A | A | A | A | A | A | A | A | A | D | D |

Considering the above-described Tables 1 and 2, Examples 1 to 15, which are within the scope of the present invention, were confirmed to provide writing instrument ink compositions that can achieve a high level of thermal resistance, water resistance, light resistance, feathering resistance, and permeation resistance in comparison with Comparative Examples 1 and 2, which are outside the scope of the present invention.

Further examination suggests the following: in the colored particles in Examples 1 to 15 which are within the scope of the present invention, the polymerizable monomer and the unit of a monomer (polymerizable dye) derived from the compound represented by General Formula (1) or the like are integrated by polymerization [covalent bond], so the above-described effects are highly provided; on the other hand, in the colored particles of Comparative Examples 1 and 2, since the resin particles and the water-soluble dye (basic dye) are physically incorporated into the resin particles by ionic bonding, the dye is released due to a change in the external environment, and as a result, the water resistance and light resistance of the ink deteriorated, and the writing instrument ink had feathering and permeation.

Examples 16 to 18, Preparation of Inkjet Ink Composition

Using the aqueous dispersions of the colored particles (particles 1 to 3) produced in Production Examples 1 to 3 above, the compositions for inkjet ink were prepared by an ordinary method according to the formula shown in Table 3 below (total amount: 100% by mass).

TABLE 3

Total: 100% by mass

|  | Example | | |
|---|---|---|---|
|  | 16 | 17 | 18 |
| Particle 1 | 20 | | |
| Particle 2 | | 20 | |
| Particle 3 | | | 20 |
| Acetylene glycol surfactant *1 | 0.5 | 0.5 | 0.5 |
| Trimethylolpropane | 0.5 | | |
| Trimethylolethane | | 1 | |
| Pentaerythritol | 3 | 2 | 4 |
| Diethylene glycol | 15 | 15 | 15 |
| Water: deionized water | 61 | 61.5 | 60.5 |

*1: ACETYLENOL E100 manufactured by Kawaken Fine Chemicals Co., Ltd.

Each of the compositions for inkjet inks of Examples 16 to 18 obtained above was filled in a cartridge of an ink jet printer (PM-3000C, manufactured by Epson Corporation), and printed on a support made of copy paper. The inkjet ink compositions (red and purple) of Examples 16 to 18 were free from nozzle clogging in inkjet printers, and the evaluation of them for water resistance, light resistance, feathering resistance and permeation according to the above-described evaluation methods confirmed that they can be inkjet ink compositions capable of highly satisfying both thermal resistance, water resistance, light resistance, feathering resistance, and permeation resistance, similarly to the writing instrument ink compositions.

Examples 19 to 21, Preparation of Painting Material Composition (Aqueous Drawing Material Composition)

Using the aqueous dispersions of the colored particles (particles 4 to 6) produced in Production Examples 4 to 6 above, the aqueous drawing material compositions were prepared by an ordinary method according to the formula shown in Table 4 (total amount: 100% by mass).

TABLE 4

Total: 100% by mass

|  | Example | | |
|---|---|---|---|
|  | 19 | 20 | 21 |
| Particle 4 | 50 | | |
| Particle 5 | | 50 | |
| Particle 6 | | | 50 |
| Acrylic emulsion *1 | 25 | 25 | 25 |
| Hydroxymethyl cellulose | 0.7 | | |

TABLE 4-continued

Total: 100% by mass

|  | Example | | |
|---|---|---|---|
|  | 19 | 20 | 21 |
| Hydroxypropyl cellulose | | 0.3 | |
| Carboxymethyl cellulose | | | 0.5 |
| Triethanolamine | 3 | 3 | 3 |
| Silica | 5 | 3 | 7 |
| Ethylene glycol | 5 | 5 | 5 |
| Water: deionized water | 11.3 | 13.7 | 9.5 |

*1: PRIMAL ™ AC-260 manufactured by Dow

Each of the obtained aqueous drawing material compositions was used as a watercolor paint (blue, green, yellow); the hue was equivalent to a commercially available watercolor paint, and it was confirmed that the functions as a colorant of the painting material composition such as water resistance and light resistance are remarkably excellent.

Examples 22 to 24, Preparation of Painting Material Composition (Solid Drawing Material Composition)

Using the aqueous dispersions of the colored particles (particles 1, 7, 8) produced in Production Examples 1, 7, and 8, each solid drawing material composition was prepared by an ordinary method according to the composition shown in Table 5 (total amount: 100% by mass).

TABLE 5

Total: 100% by mass

|  | Example | | |
|---|---|---|---|
|  | 22 | 23 | 24 |
| Particle 1 | 20 | | |
| Particle 7 | | 20 | |
| Particle 8 | | | 20 |
| Ethylene vinyl acetate copolymer *1 | 30 | 30 | 30 |
| Urushi wax | 10 | 10 | 10 |
| Hydrogenated castor oil | 10 | 10 | 10 |
| Talc | 10 | 10 | 10 |
| Ester gum | 15 | 15 | 15 |
| Nujol | 5 | 5 | 5 |

*1: EV210 manufactured by DOW-MITSUI POLYCHEMICALS Co., Ltd.

Each of the obtained solid drawing material compositions was used as a crayon (red, yellow, and black); the hue was equivalent to that of a commercially available crayon, and it was confirmed that the composition is remarkably excellent in functions as a colorant of the painting material composition such as water resistance and light resistance.

Examples 25 to 27 Preparation of Aqueous Coating Composition

Using the aqueous dispersion of colored particles (particles 2 to 4) produced in Production Examples 2 to 4 above, the aqueous coating compositions were prepared by an ordinary method according to the formula shown in Table 6 below (total amount: 100% by mass).

TABLE 6

Total: 100% by mass

| | Example 25 | Example 26 | Example 27 |
|---|---|---|---|
| Particle 2 | 30 | | |
| Particle 3 | | 30 | |
| Particle 4 | | | 30 |
| Urethane emulsion *1 | 50 | 50 | 50 |
| EOPO Polymer *2 | 0.6 | 0.6 | 0.6 |
| Cellulose fiber *3 | 10 | 10 | 10 |
| Water: deionized water | 9.4 | 9.4 | 9.4 |

*1: SUPERFLEX 150HS manufactured by DKS Co., Ltd.
*2: EPAN 710 manufactured by DKS Co., Ltd.
*3: RHEOCRYSTA I-2SX manufactured by DKS Co., Ltd.

Each of the obtained aqueous coating compositions was applied to a galvanized steel sheet using a roller coater (commercially available product, all-purpose type, roller width 150 mm); it was confirmed that an aqueous coating composition having a vivid color tone (purple and blue) and shading, and having excellent functions such as forming a coating film having an intricate depth and excellent design properties can be obtained.

INDUSTRIAL APPLICABILITY

The aqueous dispersion of colored particles of the present invention is remarkably excellent in water resistance, light resistance and the like, and thus can be suitably used for colorants for writing instrument inks, inkjet inks, painting materials, aqueous coatings, and the like.

The invention claimed is:

1. An aqueous dispersion of colored particles comprising a polymer having at least a unit of a monomer derived from a dye having a polymerizable unsaturated group, wherein a weight average molecular weight of the colored particles is from 300,000 to 3,000,000, and
wherein the monomer is a compound represented by General Formula (2) below:

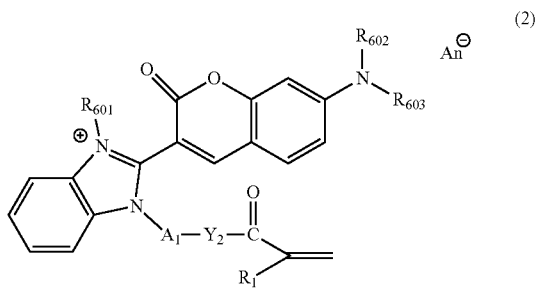

(2)

where $R_1$ represents a hydrogen atom or a methyl group, $R_{601}$ represents an alkyl group having 1 to 6 carbon atoms, $R_{602}$ and $R_{603}$ each independently represent an alkyl group having 1 to 30 carbon atoms,
$Y_2$ represents —O— or —$NR_{10}$—, where $R_{10}$ represents a hydrogen atom or an alkyl group having 1 to 12 carbon atoms,
An$^-$ represents an anion,
$A_1$ represents an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and a group represented by General Formula (2-1) below:

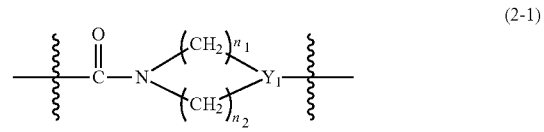

(2-1)

where $Y_1$ represents a nitrogen atom or a group represented by General Formula (2-2) below:

(2-2)

$n_1$ represents an integer from 0 to 2, and $n_2$ represents an integer from 2 to 4, where $n_1+n_2$ is 3 or 4;
an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1), and also has a hydroxy group as a substituent;
an alkylene group having 1 to 21 carbon atoms which has a hydroxy group as a substituent; or an alkylene group having 1 to 21 carbon atoms.

2. A writing instrument ink composition comprising the aqueous dispersion of colored particles described in claim 1.

3. An inkjet ink composition comprising the aqueous dispersion of colored particles described in claim 1.

4. A painting material composition comprising the aqueous dispersion of colored particles described in claim 1.

5. An aqueous coating composition comprising the aqueous dispersion of colored particles described in claim 1.

6. A marking pen loaded with the writing instrument ink composition described in claim 2.

7. An aqueous dispersion of colored particles comprising a polymer having at least a unit of a monomer derived from a dye having a polymerizable unsaturated group, wherein a weight average molecular weight of the colored particles is from 300,000 to 3,000,000, and
wherein the monomer is a compound represented by General Formula (3) below:

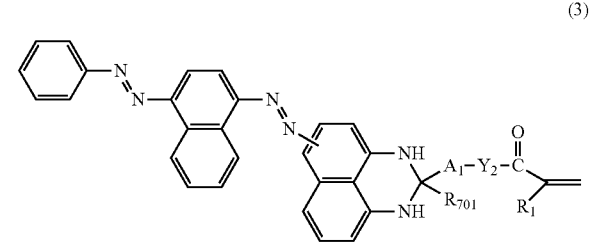

(3)

where $R_1$ represents a hydrogen atom or a methyl group, $R_{701}$ represents an alkyl group having 1 to 30 carbon atoms, $Y_2$ represents —O— or —$NR_{10}$—, where $R_{10}$ represents a hydrogen atom or an alkyl group having 1 to 12 carbon atoms, $A_1$ represents an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and a group represented by General Formula (2-1) below:

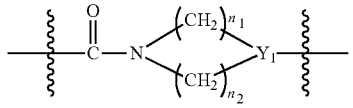

(2-1)

where $Y_1$ represents a nitrogen atom or a group represented by General Formula (2-2) below:

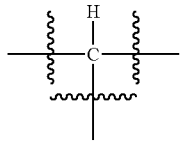

(2-2)

$n_1$ represents an integer from 0 to 2, and $n_2$ represents an integer from 2 to 4, where $n_1+n_2$ is 3 or 4;

an alkylene group having 1 to 21 carbon atoms which has in the chain thereof and/or at the terminal thereof at least one group selected from —O—, —OCO—, —COO—, —NHCO—, —CONH—, —NHCONH—, an arylene group, and the group represented by General Formula (2-1), and also has a hydroxy group as a substituent;

an alkylene group having 1 to 21 carbon atoms which has a hydroxy group as a substituent; or an alkylene group having 1 to 21 carbon atoms.

8. A writing instrument ink composition comprising the aqueous dispersion of colored particles described in claim 7.

9. An inkjet ink composition comprising the aqueous dispersion of colored particles described in claim 7.

10. A painting material composition comprising the aqueous dispersion of colored particles described in claim 7.

11. An aqueous coating composition comprising the aqueous dispersion of colored particles described in claim 7.

12. A marking pen loaded with the writing instrument ink composition described in claim 8.

* * * * *